(12) United States Patent
Alagianambi et al.

(10) Patent No.: US 11,119,985 B1
(45) Date of Patent: Sep. 14, 2021

(54) APPARATUSES, METHODS, AND COMPUTER PROGRAM PRODUCTS FOR THE PROGRAMMATIC DOCUMENTATION OF EXTRINSIC EVENT BASED DATA OBJECTS IN A COLLABORATIVE DOCUMENTATION SERVICE

(71) Applicants: ATLASSIAN PTY LTD., Sydney (AU); ATLASSIAN, INC., San Francisco, CA (US)

(72) Inventors: Thirumalaivelu Alagianambi, Milpitas, CA (US); Hilary Dubin, Los Angeles, CA (US); Puneet Arora, Sunnyvale, CA (US)

(73) Assignees: Atlassian Pty Ltd., Sydney (AU); Atlassian, Inc., San Francisco, CA (US)

( * ) Notice: Subject to any disclaimer, the term of this patent is extended or adjusted under 35 U.S.C. 154(b) by 0 days.

(21) Appl. No.: 17/249,972

(22) Filed: Mar. 19, 2021

(51) Int. Cl.
| | |
|---|---|
| *G06F 3/048* | (2013.01) |
| *G06F 16/176* | (2019.01) |
| *G06N 20/00* | (2019.01) |
| *G06Q 10/10* | (2012.01) |
| *G06F 21/31* | (2013.01) |
| *G06F 40/186* | (2020.01) |
| *G06F 40/42* | (2020.01) |

(Continued)

(52) U.S. Cl.
CPC ............ *G06F 16/176* (2019.01); *G06F 21/31* (2013.01); *G06F 40/186* (2020.01); *G06F 40/42* (2020.01); *G06N 20/00* (2019.01); *G06Q 10/1095* (2013.01); *H04L 12/1831* (2013.01); *G06F 9/542* (2013.01)

(58) Field of Classification Search
CPC ...... G06F 3/048; G06F 3/0481; G06F 3/0484; G06F 6/176; G06F 21/31; G06F 40/42; G06F 40/186; G06N 20/00; G06Q 10/10; H04L 12/18
See application file for complete search history.

(56) References Cited

U.S. PATENT DOCUMENTS

| | | | | |
|---|---|---|---|---|
| 6,158,903 | A * | 12/2000 | Schaeffer | G06Q 10/10 |
| | | | | 709/204 |
| 6,424,354 | B1 * | 7/2002 | Matheny | G06F 3/0481 |
| | | | | 345/619 |
| 10,664,466 | B2 * | 5/2020 | Tholfsen | G06F 3/04847 |

(Continued)

*Primary Examiner* — Xiomara L Bautista
(74) *Attorney, Agent, or Firm* — Alston & Bird LLP

(57) ABSTRACT

Methods, apparatuses, or computer program products are disclosed providing for the programmatic translation and ingestion of exported event data objects between an extrinsic event scheduling service and a collaborative documentation service via an extrinsic event consolidation system. The extrinsic event consolidation system provides for the generation of collaborative event documentation data structures based on exported event data objects comprising elements of an extrinsic event. The collaborative event documentation data structure may be used to generate exported event data objects to communicate elements of an extrinsic event to an extrinsic event scheduling service. Various processes are described for the translation of extrinsic event data objects between disparate services including multiple disparate extrinsic event scheduling services and disparate collaborative documentation services.

30 Claims, 18 Drawing Sheets

(51) Int. Cl.
*H04L 12/18* (2006.01)
*G06F 9/54* (2006.01)

(56) References Cited

U.S. PATENT DOCUMENTS

| | | | |
|---|---|---|---|
| 2015/0106748 A1* | 4/2015 | Monte | G06F 3/04883 |
| | | | 715/753 |
| 2017/0103066 A1* | 4/2017 | Kisin | H04L 67/06 |
| 2017/0235848 A1* | 8/2017 | Van Dusen | G06F 16/904 |
| | | | 705/12 |
| 2019/0236485 A1* | 8/2019 | Stanley, III | G06N 3/006 |
| 2020/0026710 A1* | 1/2020 | Przada | G06F 16/254 |
| 2020/0227178 A1* | 7/2020 | Lombardi | G16Y 10/75 |
| 2021/0049700 A1* | 2/2021 | Nguyen | G06N 7/005 |
| 2021/0081367 A1* | 3/2021 | Madisetti | G06F 16/176 |

* cited by examiner

APPARATUSES, METHODS, AND COMPUTER PROGRAM PRODUCTS FOR THE PROGRAMMATIC DOCUMENTATION OF EXTRINSIC EVENT BASED DATA OBJECTS IN A COLLABORATIVE DOCUMENTATION SERVICE

BACKGROUND

Various methods, apparatuses, and systems are configured to provide techniques for the communication of extrinsic event based data objects among users. Applicant has identified many deficiencies and problems associated with existing methods, apparatuses, and systems that provide for the exportation and/or ingestion of extrinsic event details and associated data objects between applications and services. Through applied effort, ingenuity, and innovation, these identified deficiencies and problems have been solved by developing solutions that are configured in accordance with the embodiments of the present disclosure, many examples of which are described in detail herein.

SUMMARY

According to some embodiments of the present disclosure, there is provided an apparatus for programmatically ingesting exported event data objects into a collaborative documentation service, the apparatus comprising at least one processor and at least one memory including program code that, with the at least one processor, cause the apparatus to receive an exported event data object from an extrinsic event scheduling service, the exported event data object comprising an exported event data object identifier, an origin user identifier, a target user identifier, an exported event description text element, a time data element, a date data element, and an exported event participant identifier set. The apparatus may be further caused to at least generate a collaborative event documentation data structure configured for the collaborative documentation service, wherein the collaborative event documentation data structure is associated with the exported event data object. The apparatus may be further caused to at least apply a collaborative documentation service mapping protocol for mapping the exported event data object identifier, the origin user identifier, the target user identifier, the exported event description text element, the time data element, the date data element, and the exported event participant identifier set to the collaborative event documentation data structure. The apparatus may be further caused to at least generate a collaborative event documentation interface based on the collaborative event documentation data structure, the collaborative event documentation interface comprising a graphical user interface element set comprising a header interface element, a date interface element, an exported event participant interface element, and an exported event description text interface element.

In some embodiments, the at least one memory including the program code that with the at least one processor, further cause the apparatus to at least receive, via a collaborative documentation service interface, a collaborative documentation service indication input from a client device. In some embodiments, the at least one memory including the program code that with the at least one processor, further cause the apparatus to at least generate, based on the collaborative documentation service indication input, an exported event data object ingestion request. In some embodiments, the at least one memory including the program code that with the at least one processor, further cause the apparatus to at least transmit, via an extrinsic event scheduling service application programming interface, the exported event data object ingestion request to the extrinsic event scheduling service.

In some embodiments of the apparatus, the graphical user interface element set further comprises one or more of a discussion interface element, a time interface element, an origin user interface element, or an interactive interface element.

In some embodiments, the at least one memory including the program code that with the at least one processor, further cause the apparatus to at least access, via a collaborative documentation service application programming interface, a collaborative documentation service data object repository associated with the collaborative documentation service, the collaborative documentation service data object repository comprising one or more participant account profile data objects. In some embodiments, the at least one memory including the program code that with the at least one processor, further cause the apparatus to at least determine, based on at least one or more exported event participant identifiers and the one or more participant account profile data objects, one or more participant account identifiers associated with the one or more exported event participant identifiers. In some embodiments, the at least one memory including the program code that with the at least one processor, further cause the apparatus to at least record, to the collaborative documentation service data object repository, the collaborative event documentation data structure, wherein the collaborative event documentation data structure is associated with the exported event data object identifier of the exported event data object. In some embodiments, the at least one memory including the program code that with the at least one processor, further cause the apparatus to at least transmit the collaborative event documentation interface comprising the collaborative event documentation data structure to one or more participant accounts associated with at least the one or more exported event participant identifiers or one or more participant account identifiers.

In some embodiments of the apparatus, the collaborative event documentation data structure is generated based on the exported event data object. In some embodiments of the apparatus, the collaborative event documentation data structure comprises one or more exported event description text elements of a plurality of exported event description text elements, the time data element, the date data element, and the one or more participant account identifiers.

In some embodiments of the apparatus, a respective exported event participant identifier of the extrinsic event scheduling service is associated with at least a respective participant account identifier of the collaborative documentation service.

In some embodiments, the at least one memory including the program code that with the at least one processor, further cause the apparatus to at least determine, from the collaborative documentation service data object repository, an account permissions configuration protocol that is common to each of the one or more participant accounts, wherein the account permissions configuration protocol is associated with a security level value. In some embodiments, the at least one memory including the program code that with the at least one processor, further cause the apparatus to at least generate, based on the account permissions configuration protocol, a collaboration page permissions configuration protocol, wherein the collaboration page permissions configuration protocol is associated with the security level value. In some embodiments, the at least one memory including the program code that with the at least one processor, further cause the apparatus to at least apply the collaboration page permissions configuration protocol to the collaborative event documentation data structure. In some embodiments of the apparatus, the collaboration page permissions configuration protocol allows at least the one or more participant accounts associated with the account permissions configuration protocol to access the collaborative event documentation data structure.

In some embodiments, the at least one memory including the program code that with the at least one processor, further cause the apparatus to at least parse the plurality of exported event description text elements into one or more word based data elements. In some embodiments, the at least one memory including the program code that with the at least one processor, further cause the apparatus to at least determine, based on at least the one or more word based data elements and a machine learning model, a collaboration page permissions configuration protocol associated with a security level value threshold. In some embodiments, the at least one memory including the program code that with the at least one processor, further cause the apparatus to at least apply the collaboration page permissions configuration protocol to the collaborative event documentation data structure. In some embodiments, the at least one memory including the program code that with the at least one processor, further cause the apparatus to at least determine a respective security level value for each of the one or more participant accounts. In some embodiments, the at least one memory including the program code that with the at least one processor, further cause the apparatus to at least detect that one or more respective security level values associated with a respective participant account is less than the security level value threshold. In some embodiments, the at least one memory including the program code that with the at least one processor, further cause the apparatus to at least update the respective security level value of the respective participant account by at least increasing the respective security level value to be equal to the security level value threshold.

In some embodiments, the at least one memory including the program code that with the at least one processor, further cause the apparatus to at least generate, based on the one or more participant account identifiers, an account list collaboration page permissions configuration protocol. In some embodiments, the at least one memory including the program code that with the at least one processor, further cause the apparatus to at least apply the account list collaboration page permissions configuration protocol to the collaborative event documentation data structure. In some embodiments of the apparatus, the account list collaboration page permissions configuration protocol allows the one or more participant accounts associated with the one or more participant account identifiers to access the collaborative event documentation data structure.

In some embodiments, the at least one memory including the program code that with the at least one processor, further cause the apparatus to at least parse the plurality of exported event description text elements into one or more word based data elements. In some embodiments, the at least one memory including the program code that with the at least one processor, further cause the apparatus to at least determine, based on the one or more word based data elements and the one or more participant account profile data objects, one or more suggested participant account identifiers. In some embodiments of the apparatus, the one or more participant account profile data objects are each associated with a respective position data element associated with an organizational hierarchy data structure. In some embodiments, the at least one memory including the program code that with the at least one processor, further cause the apparatus to at least output, via a display device and based on the one or more suggested participant account identifiers, a suggested participant account interface defining the one or more suggested participant account identifiers. In some embodiments, the at least one memory including the program code that with the at least one processor, further cause the apparatus to at least receive, via the suggested participant account interface, a suggested participant account selection indication.

In some embodiments, the at least one memory including the program code that with the at least one processor, further cause the apparatus to at least detect that at least one exported event participant identifier is not associated with at least one participant account profile data object. In some embodiments, the at least one memory including the program code that with the at least one processor, further cause the apparatus to at least in response to the detection that at least one exported event participant identifier is not associated with at least one participant account profile data object, generate an undefined participant error notification interface defining the at least one exported event participant identifier. In some embodiments, the at least one memory including the program code that with the at least one processor, further cause the apparatus to at least output, via a display device, the undefined participant error notification interface. In some embodiments, the at least one memory including the program code that with the at least one processor, further cause the apparatus to at least receive, via the undefined participant error notification interface, a participant account selection indication defining the at least one exported event participant identifier and at least one associated participant account identifier.

In some embodiments, the at least one memory including the program code that with the at least one processor, further cause the apparatus to at least parse the plurality of exported event description text elements into one or more word based data elements. In some embodiments, the at least one memory including the program code that with the at least one processor, further cause the apparatus to at least determine, based on at least the one or more word based data elements and a machine learning model, at least one suggested exported event template defining an exported event data structure. In some embodiments of the apparatus, the at least one suggested exported event template is automatically selected from one or more of a planning exported event template, a brainstorming exported event template, a team retrospective exported event template, a human resources exported event template, or a celebration exported event template. In some embodiments, the at least one memory including the program code that with the at least one processor, further cause the apparatus to at least output, via a display device, a suggested exported event template interface. In some embodiments, the at least one memory including the program code that with the at least one processor, further cause the apparatus to at least receive, via the suggested exported event template interface, an exported event template selection indication defining an exported event template identifier.

In some embodiments, the at least one memory including the program code that with the at least one processor, further cause the apparatus to at least detect a language based on at least the one or more word based data elements. In some embodiments, the at least one memory including the program code that with the at least one processor, further cause the apparatus to at least format the collaborative event documentation interface based on at least the language and the exported event template selection indication.

In some embodiments, the at least one memory including the program code that with the at least one processor, further cause the apparatus to at least detect a preferred language for each of the one or more participant account profile data objects defining at least a preferred language identifier. In some embodiments, the at least one memory including the program code that with the at least one processor, further cause the apparatus to at least generate a preferred language collaborative event documentation interface based on the collaborative event documentation interface and the preferred language detected for each of the one or more participant account profile data objects. In some embodiments, the at least one memory including the program code that with the at least one processor, further cause the apparatus to at least transmit the preferred language collaborative event documentation interface instead of the collaborative event documentation interface for each of the one or more participant account profile data objects defining at least the preferred language identifier. In some embodiments of the apparatus, the preferred language collaborative event documentation interface comprises the collaborative event documentation interface output in the preferred language of each respective participant account profile data object.

In some embodiments, the at least one memory including the program code that with the at least one processor, further cause the apparatus to at least parse the plurality of exported event description text elements into one or more word based data elements. In some embodiments, the at least one memory including the program code that with the at least one processor, further cause the apparatus to at least generate, based on at least the one or more word based data elements and a machine learning model, a meeting summary. In some embodiments of the apparatus, the meeting summary is associated with the collaborative event documentation interface.

According to some embodiments of the present disclosure, there is provided a computer program product for programmatically ingesting exported event data objects into a collaborative documentation service, the computer program product comprising at least a non-transitory computer readable storage medium having program code portions stored thereon with the program code portions comprising instructions being configured, upon execution, by at least a processor, to cause an apparatus comprising at least one processor and at least one memory to receive an exported event data object from an extrinsic event scheduling service, the exported event data object comprising an exported event data object identifier, an origin user identifier, a target user identifier, an exported event description text element, a time data element, a date data element, and an exported event participant identifier set. The computer program product may be further configured, upon execution, by at least the processor, to at least cause the apparatus to generate a collaborative event documentation data structure configured for the collaborative documentation service, wherein the collaborative event documentation data structure is associated with the exported event data object. The computer program product may be further configured, upon execution, by at least the processor, to at least cause the apparatus to apply a collaborative documentation service mapping protocol for mapping the exported event data object identifier, the origin user identifier, the target user identifier, the exported event description text element, the time data element, the date data element, and the exported event participant identifier set to the collaborative event documentation data structure. The computer program product may be further configured, upon execution, by at least the processor, to at least cause the apparatus to generate a collaborative event documentation interface based on the collaborative event documentation data structure, the collaborative event documentation interface comprising a graphical user interface element set comprising a header interface element, a date interface element, an exported event participant interface element, and an exported event description text interface element.

In some embodiments, the computer program product may be further configured, upon execution, by at least the processor, to at least cause the apparatus to receive, via a collaborative documentation service interface, a collaborative documentation service indication input from a client device. In some embodiments, the computer program product may be further configured, upon execution, by at least the processor, to at least cause the apparatus to generate, based on the collaborative documentation service indication input, an exported event data object ingestion request. In some embodiments, the computer program product may be further configured, upon execution, by at least the processor, to at least cause the apparatus to transmit, via an extrinsic event scheduling service application programming interface, the exported event data object ingestion request to the extrinsic event scheduling service.

In some embodiments of the computer program product, the graphical user interface element set further comprises one or more of a discussion interface element, a time interface element, an origin user interface element, or an interactive interface element.

In some embodiments, the computer program product may be further configured, upon execution, by at least the processor, to at least cause the apparatus to access, via a collaborative documentation service application programming interface, a collaborative documentation service data object repository associated with the collaborative documentation service, the collaborative documentation service data object repository comprising one or more participant account profile data objects. In some embodiments, the computer program product may be further configured, upon execution, by at least the processor, to at least cause the apparatus to determine, based on at least one or more exported event participant identifiers and the one or more participant account profile data objects, one or more participant account identifiers associated with the one or more exported event participant identifiers. In some embodiments, the computer program product may be further configured, upon execution, by at least the processor, to at least cause the apparatus to record, to the collaborative documentation service data object repository, the collaborative event documentation data structure, wherein the collaborative event documentation data structure is associated with the exported event data object identifier of the exported event data object. In some embodiments, the computer program product may be further configured, upon execution, by at least the processor, to at least cause the apparatus to transmit the collaborative event documentation interface comprising the collaborative event documentation data structure to one or more participant accounts associated with at least the one or more exported event participant identifiers or one or more participant account identifiers.

In some embodiments of the computer program product, the collaborative event documentation data structure is generated based on the exported event data object. In some embodiments of the computer program product, the collaborative event documentation data structure comprises one or more exported event description text elements of a plurality of exported event description text elements, the time data element, the date data element, and the one or more participant account identifiers.

In some embodiments of the computer program product, a respective exported event participant identifier of the extrinsic event scheduling service is associated with at least a respective participant account identifier of the collaborative documentation service.

In some embodiments, the computer program product may be further configured, upon execution, by at least the processor, to at least cause the apparatus to determine, from the collaborative documentation service data object repository, an account permissions configuration protocol that is common to each of the one or more participant accounts, wherein the account permissions configuration protocol is associated with a security level value. In some embodiments, the computer program product may be further configured, upon execution, by at least the processor, to at least cause the apparatus to generate, based on the account permissions configuration protocol, a collaboration page permissions configuration protocol, wherein the collaboration page permissions configuration protocol is associated with the security level value. In some embodiments, the computer program product may be further configured, upon execution, by at least the processor, to at least cause the apparatus to apply the collaboration page permissions configuration protocol to the collaborative event documentation data structure. In some embodiments of the computer program product, the collaboration page permissions configuration protocol allows at least the one or more participant accounts associated with the account permissions configuration protocol to access the collaborative event documentation data structure.

In some embodiments, the computer program product may be further configured, upon execution, by at least the processor, to at least cause the apparatus to parse the plurality of exported event description text elements into one or more word based data elements. In some embodiments, the computer program product may be further configured, upon execution, by at least the processor, to at least cause the apparatus to determine, based on at least the one or more word based data elements and a machine learning model, a collaboration page permissions configuration protocol associated with a security level value threshold. In some embodiments, the computer program product may be further configured, upon execution, by at least the processor, to at least cause the apparatus to apply the collaboration page permissions configuration protocol to the collaborative event documentation data structure. In some embodiments, the computer program product may be further configured, upon execution, by at least the processor, to at least cause the apparatus to determine a respective security level value for each of the one or more participant accounts. In some embodiments, the computer program product may be further configured, upon execution, by at least the processor, to at least cause the apparatus to detect that one or more respective security level values associated with a respective participant account is less than the security level value threshold. In some embodiments, the computer program product may be further configured, upon execution, by at least the processor, to at least cause the apparatus to update the respective security level value of the respective participant account by at least increasing the respective security level value to be equal to the security level value threshold.

In some embodiments, the computer program product may be further configured, upon execution, by at least the processor, to at least cause the apparatus to generate, based on the one or more participant account identifiers, an account list collaboration page permissions configuration protocol. In some embodiments, the computer program product may be further configured, upon execution, by at least the processor, to at least cause the apparatus to apply the account list collaboration page permissions configuration protocol to the collaborative event documentation data structure. In some embodiments of the computer program product, the account list collaboration page permissions configuration protocol allows the one or more participant accounts associated with the one or more participant account identifiers to access the collaborative event documentation data structure.

In some embodiments, the computer program product may be further configured, upon execution, by at least the processor, to at least cause the apparatus to parse the plurality of exported event description text elements into one or more word based data elements. In some embodiments, the computer program product may be further configured, upon execution, by at least the processor, to at least cause the apparatus to determine, based on the one or more word based data elements and the one or more participant account profile data objects, one or more suggested participant account identifiers. In some embodiments of the computer program product, the one or more participant account profile data objects are each associated with a respective position data element associated with an organizational hierarchy data structure. In some embodiments, the computer program product may be further configured, upon execution, by at least the processor, to at least cause the apparatus to output, via a display device and based on the one or more suggested participant account identifiers, a suggested participant account interface defining the one or more suggested participant account identifiers. In some embodiments, the computer program product may be further configured, upon execution, by at least the processor, to at least cause the apparatus to receive, via the suggested participant account interface, a suggested participant account selection indication.

In some embodiments, the computer program product may be further configured, upon execution, by at least the processor, to at least cause the apparatus to detect that at least one exported event participant identifier is not associated with at least one participant account profile data object. In some embodiments, the computer program product may be further configured, upon execution, by at least the processor, to at least cause the apparatus to, in response to the detection that at least one exported event participant identifier is not associated with at least one participant account profile data object, generate an undefined participant error notification interface defining the at least one exported event participant identifier. In some embodiments, the computer program product may be further configured, upon execution, by at least the processor, to at least cause the apparatus to output, via a display device, the undefined participant error notification interface. In some embodiments, the computer program product may be further configured, upon execution, by at least the processor, to at least cause the apparatus to receive, via the undefined participant error notification interface, a participant account selection indication defining the at least one exported event participant identifier and at least one associated participant account identifier.

In some embodiments, the computer program product may be further configured, upon execution, by at least the processor, to at least cause the apparatus to parse the plurality of exported event description text elements into one or more word based data elements. In some embodiments, the computer program product may be further configured, upon execution, by at least the processor, to at least cause the apparatus to determine, based on at least the one or more word based data elements and a machine learning model, at least one suggested exported event template defining an exported event data structure. In some embodiments of the computer program product, the at least one suggested exported event template is automatically selected from one or more of a planning exported event template, a brainstorming exported event template, a team retrospective exported event template, a human resources exported event template, or a celebration exported event template. In some embodiments, the computer program product may be further configured, upon execution, by at least the processor, to at least cause the apparatus to output, via a display device, a suggested exported event template interface. In some embodiments, the computer program product may be further configured, upon execution, by at least the processor, to at least cause the apparatus to receive, via the suggested exported event template interface, an exported event template selection indication defining an exported event template identifier.

In some embodiments, the computer program product may be further configured, upon execution, by at least the processor, to at least cause the apparatus to detect a language based on at least the one or more word based data elements. In some embodiments, the computer program product may be further configured, upon execution, by at least the processor, to at least cause the apparatus to format the collaborative event documentation interface based on at least the language and the exported event template selection indication.

In some embodiments, the computer program product may be further configured, upon execution, by at least the processor, to at least cause the apparatus to detect a preferred language for each of the one or more participant account profile data objects defining at least a preferred language identifier. In some embodiments, the computer program product may be further configured, upon execution, by at least the processor, to at least cause the apparatus to generate a preferred language collaborative event documentation interface based on the collaborative event documentation interface and the preferred language detected for each of the one or more participant account profile data objects. In some embodiments, the computer program product may be further configured, upon execution, by at least the processor, to at least cause the apparatus to transmit the preferred language collaborative event documentation interface instead of the collaborative event documentation interface for each of the one or more participant account profile data objects defining at least the preferred language identifier. In some embodiments of the computer program product, the preferred language collaborative event documentation interface comprises the collaborative event documentation interface output in the preferred language of each respective participant account profile data object.

In some embodiments, the computer program product may be further configured, upon execution, by at least the processor, to at least cause the apparatus to parse the plurality of exported event description text elements into one or more word based data elements. In some embodiments, the computer program product may be further configured, upon execution, by at least the processor, to at least cause the apparatus to generate, based on at least the one or more word based data elements and a machine learning model, a meeting summary. In some embodiments of the computer program product, the meeting summary is associated with the collaborative event documentation interface.

According to some embodiments of the present disclosure, there is provided a computer implemented method for programmatically ingesting exported event data objects into a collaborative documentation service, the computer implemented method comprises receiving an exported event data object from an extrinsic event scheduling service, the exported event data object comprising an exported event data object identifier, an origin user identifier, a target user identifier, an exported event description text element, a time data element, a date data element, and an exported event participant identifier set. The method may further comprise generating a collaborative event documentation data structure configured for the collaborative documentation service, wherein the collaborative event documentation data structure is associated with the exported event data object. The computer implemented method may further comprise applying a collaborative documentation service mapping protocol for mapping the exported event data object identifier, the origin user identifier, the target user identifier, the exported event description text element, the time data element, the date data element, and the exported event participant identifier set to the collaborative event documentation data structure. The computer implemented method may further comprise generating a collaborative event documentation interface based on the collaborative event documentation data structure, the collaborative event documentation interface comprising a graphical user interface element set comprising a header interface element, a date interface element, an exported event participant interface element, and an exported event description text interface element.

In some embodiments, the computer implemented method may further comprise receiving, via a collaborative documentation service interface, a collaborative documentation service indication input from a client device. In some embodiments, the computer implemented method may further comprise generating, based on the collaborative documentation service indication input, an exported event data object ingestion request. In some embodiments, the computer implemented method may further comprise transmitting, via an extrinsic event scheduling service application programming interface, the exported event data object ingestion request to the extrinsic event scheduling service.

In some embodiments of the computer implemented method, the graphical user interface element set further comprises one or more of a discussion interface element, a time interface element, an origin user interface element, or an interactive interface element.

In some embodiments, the computer implemented method may further comprise accessing, via a collaborative documentation service application programming interface, a collaborative documentation service data object repository associated with the collaborative documentation service, the collaborative documentation service data object repository comprising one or more participant account profile data objects. In some embodiments, the computer implemented method may further comprise determining, based on at least one or more exported event participant identifiers and the one or more participant account profile data objects, one or more participant account identifiers associated with the one or more exported event participant identifiers. In some embodiments, the computer implemented method may further comprise recording, to the collaborative documentation service data object repository, the collaborative event documentation data structure, wherein the collaborative event documentation data structure is associated with the exported event data object identifier of the exported event data object. In some embodiments, the computer implemented method may further comprise transmitting the collaborative event documentation interface comprising the collaborative event documentation data structure to one or more participant accounts associated with at least the one or more exported event participant identifiers or one or more participant account identifiers.

In some embodiments of the computer implemented method, the collaborative event documentation data structure is generated based on the exported event data object. In some embodiments of the computer implemented method, the collaborative event documentation data structure comprises one or more exported event description text elements of a plurality of exported event description text elements, the time data element, the date data element, and the one or more participant account identifiers.

In some embodiments of the computer implemented method, a respective exported event participant identifier of the extrinsic event scheduling service is associated with at least a respective participant account identifier of the collaborative documentation service.

In some embodiments, the computer implemented method may further comprise determining, from the collaborative documentation service data object repository, an account permissions configuration protocol that is common to each of the one or more participant accounts, wherein the account permissions configuration protocol is associated with a security level value. In some embodiments, the computer implemented method may further comprise generating, based on the account permissions configuration protocol, a collaboration page permissions configuration protocol, wherein the collaboration page permissions configuration protocol is associated with the security level value. In some embodiments, the computer implemented method may further comprise applying the collaboration page permissions configuration protocol to the collaborative event documentation data structure. In some embodiments of the computer implemented method, the collaboration page permissions configuration protocol allows at least the one or more participant accounts associated with the account permissions configuration protocol to access the collaborative event documentation data structure.

In some embodiments, the computer implemented method may further comprise parsing the plurality of exported event description text elements into one or more word based data elements. In some embodiments, the computer implemented method may further comprise determining, based on at least the one or more word based data elements and a machine learning model, a collaboration page permissions configuration protocol associated with a security level value threshold. In some embodiments, the computer implemented method may further comprise applying the collaboration page permissions configuration protocol to the collaborative event documentation data structure. In some embodiments, the computer implemented method may further comprise determining a respective security level value for each of the one or more participant accounts. In some embodiments, the computer implemented method may further comprise detecting that one or more respective security level values associated with a respective participant account is less than the security level value threshold. In some embodiments, the computer implemented method may further comprise updating the respective security level value of the respective participant account by at least increasing the respective security level value to be equal to the security level value threshold.

In some embodiments, the computer implemented method may further comprise generating, based on the one or more participant account identifiers, an account list collaboration page permissions configuration protocol. In some embodiments, the computer implemented method may further comprise applying the account list collaboration page permissions configuration protocol to the collaborative event documentation data structure. In some embodiments of the computer implemented method, the account list collaboration page permissions configuration protocol allows the one or more participant accounts associated with the one or more participant account identifiers to access the collaborative event documentation data structure.

In some embodiments, the computer implemented method may further comprise parsing the plurality of exported event description text elements into one or more word based data elements. In some embodiments, the computer implemented method may further comprise determining, based on the one or more word based data elements and the one or more participant account profile data objects, one or more suggested participant account identifiers. In some embodiments of the computer implemented method, the one or more participant account profile data objects are each associated with a respective position data element associated with an organizational hierarchy data structure. In some embodiments, the computer implemented method may further comprise outputting, via a display device and based on the one or more suggested participant account identifiers, a suggested participant account interface defining the one or more suggested participant account identifiers. In some embodiments, the computer implemented method may further comprise receiving, via the suggested participant account interface, a suggested participant account selection indication.

In some embodiments, the computer implemented method may further comprise detecting that at least one exported event participant identifier is not associated with at least one participant account profile data object. In some embodiments, the computer implemented method may further comprise in response to the detection that at least one exported event participant identifier is not associated with at least one participant account profile data object, generate an undefined participant error notification interface defining the at least one exported event participant identifier. In some embodiments, the computer implemented method may further comprise outputting, via a display device, the undefined participant error notification interface. In some embodiments, the computer implemented method may further comprise receiving, via the undefined participant error notification interface, a participant account selection indication defining the at least one exported event participant identifier and at least one associated participant account identifier.

In some embodiments, the computer implemented method may further comprise parsing the plurality of exported event description text elements into one or more word based data elements. In some embodiments, the computer implemented method may further comprise determining, based on at least the one or more word based data elements and a machine learning model, at least one suggested exported event template defining an exported event data structure. In some embodiments of the computer implemented method, the at least one suggested exported event template is automatically selected from one or more of a planning exported event template, a brainstorming exported event template, a team retrospective exported event template, a human resources exported event template, or a celebration exported event template. In some embodiments, the computer implemented method may further comprise outputting, via a display device, a suggested exported event template interface. In some embodiments, the computer implemented method may further comprise receiving, via the suggested exported event template interface, an exported event template selection indication defining an exported event template identifier.

In some embodiments, the computer implemented method may further comprise detecting a language based on at least the one or more word based data elements. In some embodiments, the computer implemented method may further comprise formatting the collaborative event documentation interface based on at least the language and the exported event template selection indication.

In some embodiments, the computer implemented method may further comprise detecting a preferred language for each of the one or more participant account profile data objects defining at least a preferred language identifier. In some embodiments, the computer implemented method may further comprise generating a preferred language collaborative event documentation interface based on the collaborative event documentation interface and the preferred language detected for each of the one or more participant account profile data objects. In some embodiments, the computer implemented method may further comprise transmitting the preferred language collaborative event documentation interface instead of the collaborative event documentation interface for each of the one or more participant account profile data objects defining at least the preferred language identifier. In some embodiments of the computer implemented method, the preferred language collaborative event documentation interface comprises the collaborative event documentation interface output in the preferred language of each respective participant account profile data object.

In some embodiments, the computer implemented method may further comprise parsing the plurality of exported event description text elements into one or more word based data elements. In some embodiments, the computer implemented method may further comprise generating, based on at least the one or more word based data elements and a machine learning model, a meeting summary. In some embodiments of the computer implemented method, the meeting summary is associated with the collaborative event documentation interface.

According to some embodiments of the present disclosure, there is provided an apparatus for programmatically ingesting collaborative event documentation interface inputs to provide exported event data objects to an extrinsic event scheduling service, the apparatus comprising at least one processor and at least one memory with the at least one memory including computer program code, that is configured to, with the at least one processor, cause the apparatus at least to receive, from a computing device via a collaborative event documentation interface, a collaborative documentation service indication input defining at least a text data element, a time data element, a date data element, and a participant account identifier associated with a participant account profile data object. The apparatus may be further caused to at least generate, based on the collaborative documentation service indication input, a collaborative event documentation data structure comprising the text data element, the time data element, the date data element, and the participant account identifier. The apparatus may be further caused to at least record, to a collaborative documentation service data object repository, the collaborative event documentation data structure. The apparatus may be further caused to at least generate, based on the collaborative event documentation data structure and a collaborative event documentation service mapping protocol, an exported event data object. The apparatus may be further caused to at least transmit, to an extrinsic event scheduling service, the exported event data object.

According to some embodiments of the present disclosure, there is provided a computer program product for programmatically ingesting collaborative event documentation interface inputs to provide exported event data objects to an extrinsic event scheduling service, the computer program product comprising at least a non-transitory computer readable storage medium having program code portions stored thereon with the program code portions comprising instructions being configured, upon execution, by at least a processor, to cause an apparatus comprising at least one processor and at least one memory to receive, from a computing device via a collaborative event documentation interface, a collaborative documentation service indication input defining at least a text data element, a time data element, a date data element, and a participant account identifier associated with a participant account profile data object. The computer program product may be further configured, upon execution, by at least the processor, to at least cause the apparatus to generate, based on the collaborative documentation service indication input, a collaborative event documentation data structure comprising the text data element, the time data element, the date data element, and the participant account identifier. The computer program product may be further configured, upon execution, by at least the processor, to at least cause the apparatus to record, to a collaborative documentation service data object repository, the collaborative event documentation data structure. The computer program product may be further configured, upon execution, by at least the processor, to at least cause the apparatus to generate, based on the collaborative event documentation data structure and a collaborative documentation service mapping protocol, an exported event data object. The computer program product may be further configured, upon execution, by at least the processor, to at least cause the apparatus to transmit, to an extrinsic event scheduling service, the exported event data object.

According to some embodiments of the present disclosure, there is provided a computer implemented method for programmatically ingesting collaborative event documentation interface inputs to provide exported event data objects to an extrinsic event scheduling service, the computer implemented method comprising receiving, from a computing device via a collaborative event documentation interface, a collaborative documentation service indication input defining at least a text data element, a time data element, a date data element, and a participant account identifier associated with a participant account profile data object. The computer implemented method may further comprise generating, based on the collaborative documentation service indication input, a collaborative event documentation data structure comprising the text data element, the time data element, the date data element, and the participant account identifier. The computer implemented method may further comprise recording, to a collaborative documentation service data object repository, the collaborative event documentation data structure. The computer implemented method may further comprise generating, based on the collaborative event documentation data structure and a collaborative documentation service mapping protocol, an exported event data object. The computer implemented method may further comprise transmitting, to an extrinsic event scheduling service, the exported event data object.

Various other aspects are also described in the following detailed description and in the attached claims.

BRIEF DESCRIPTION OF THE DRAWINGS

Figure 1:
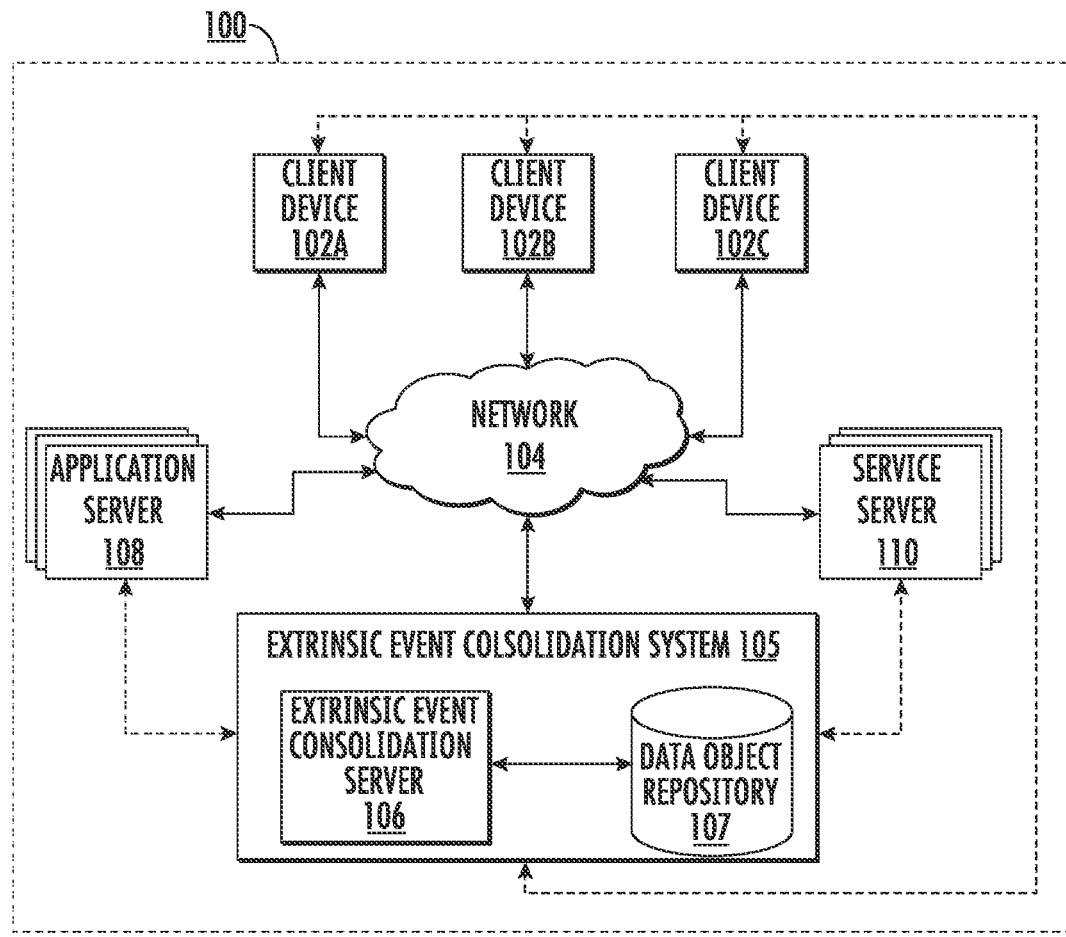

Having thus described some embodiments in general terms, references will now be made to the accompanying drawings, which are not drawn to scale, and wherein:

FIG. 1 is a block diagram of an example extrinsic event consolidation system within which at least some embodiments of the present disclosure may operate.

Figure 2:
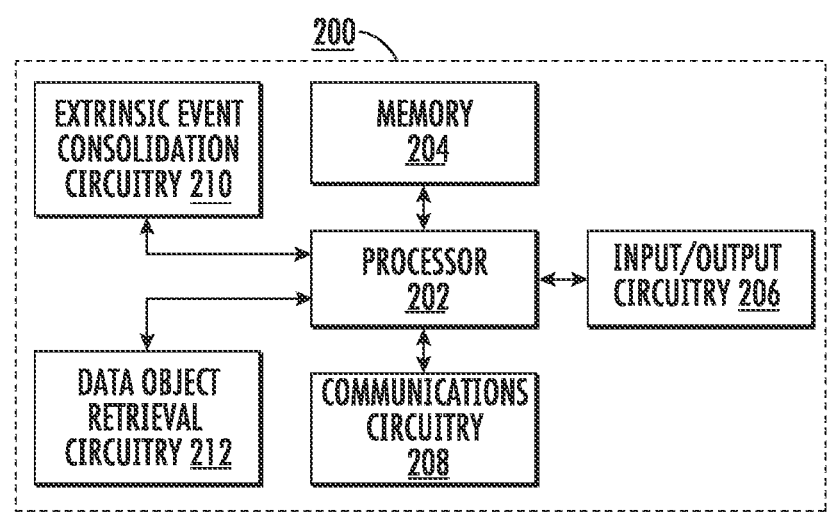

FIG. 2 is a block diagram of an example extrinsic event consolidation system apparatus configured in accordance with at least some embodiments of the present disclosure.

Figure 3:
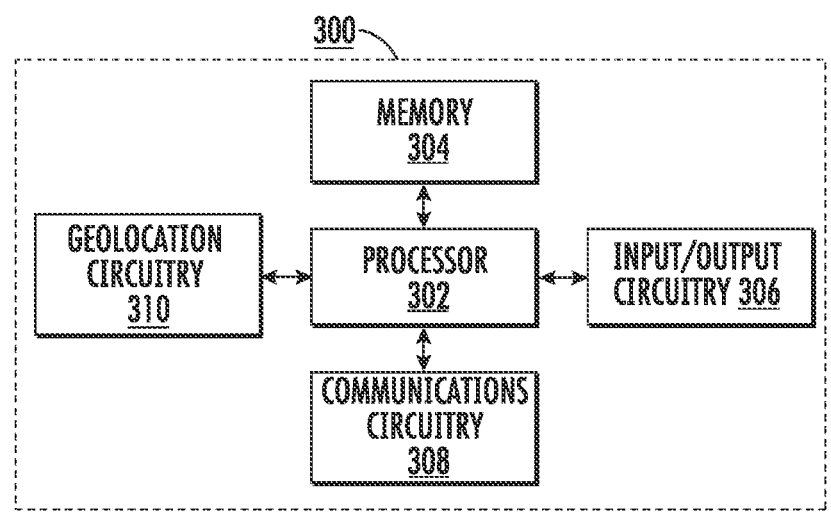

FIG. 3 is a block diagram of an example computing device configured in accordance with at least some embodiments of the present disclosure.

Figure 4:
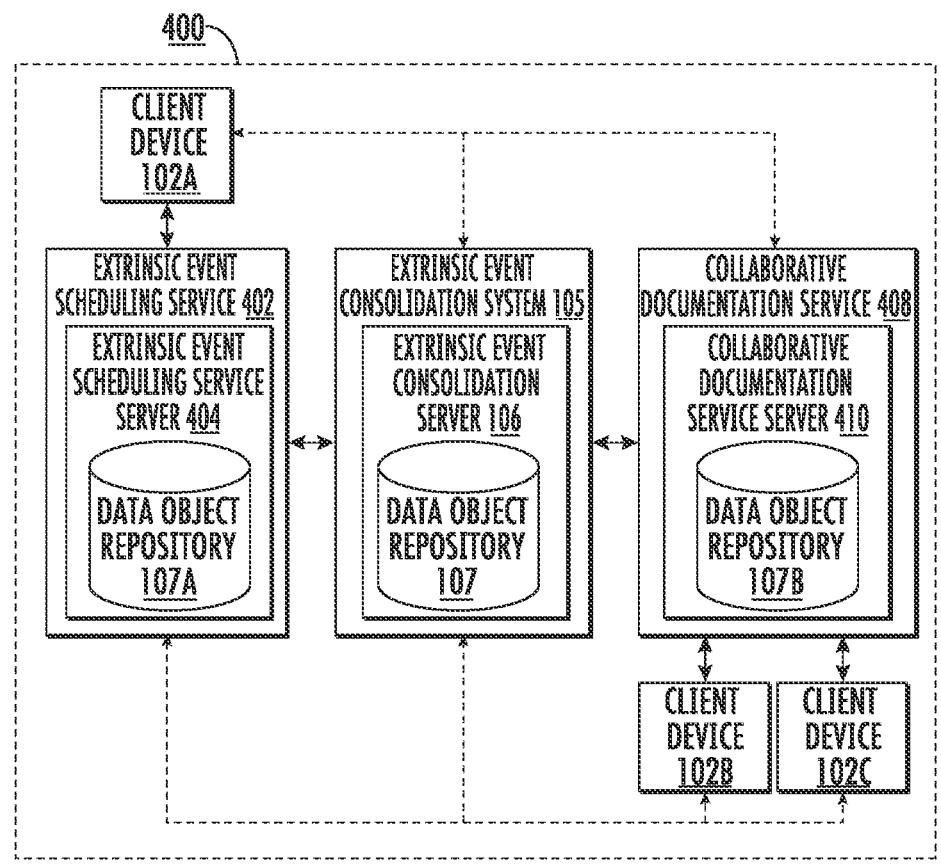

FIG. 4 is a block diagram of an example extrinsic event consolidation system within which at least some embodiments of the present disclosure may operate.

Figure 5:
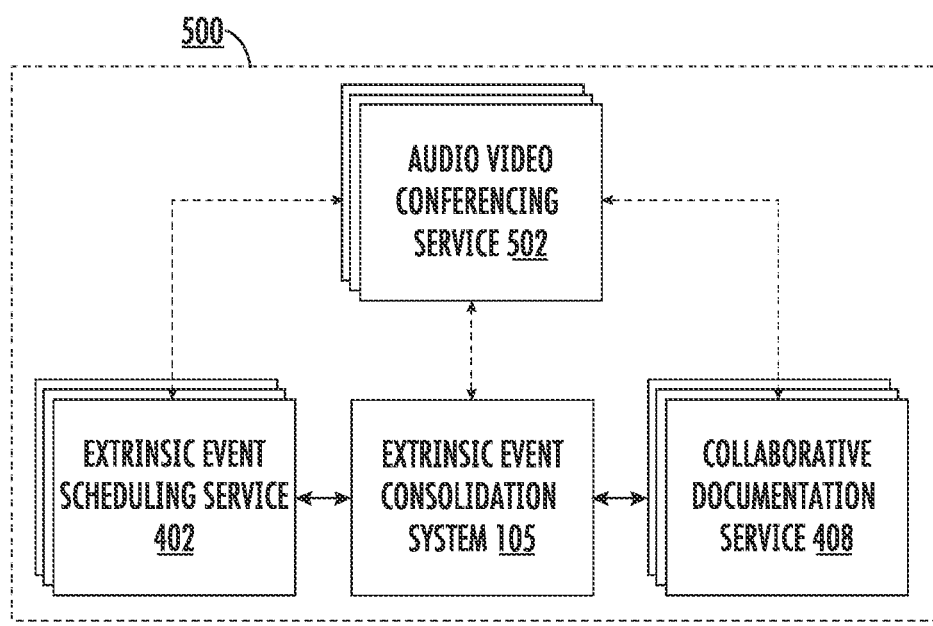

FIG. 5 is a block diagram of an example extrinsic event consolidation system within which at least some embodiments of the present disclosure may operate.

Figure 6:
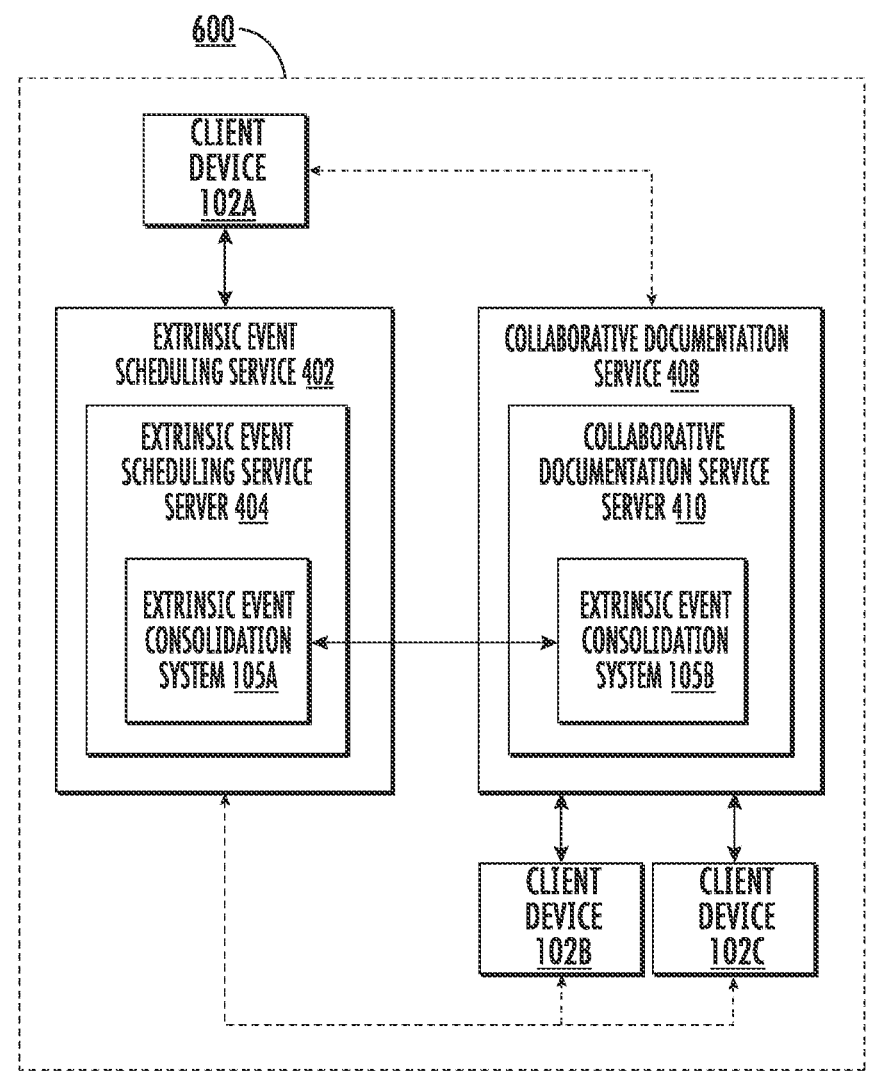

FIG. 6 is a block diagram of an example extrinsic event consolidation system within which at least some embodiments of the present disclosure may operate.

Figure 7:
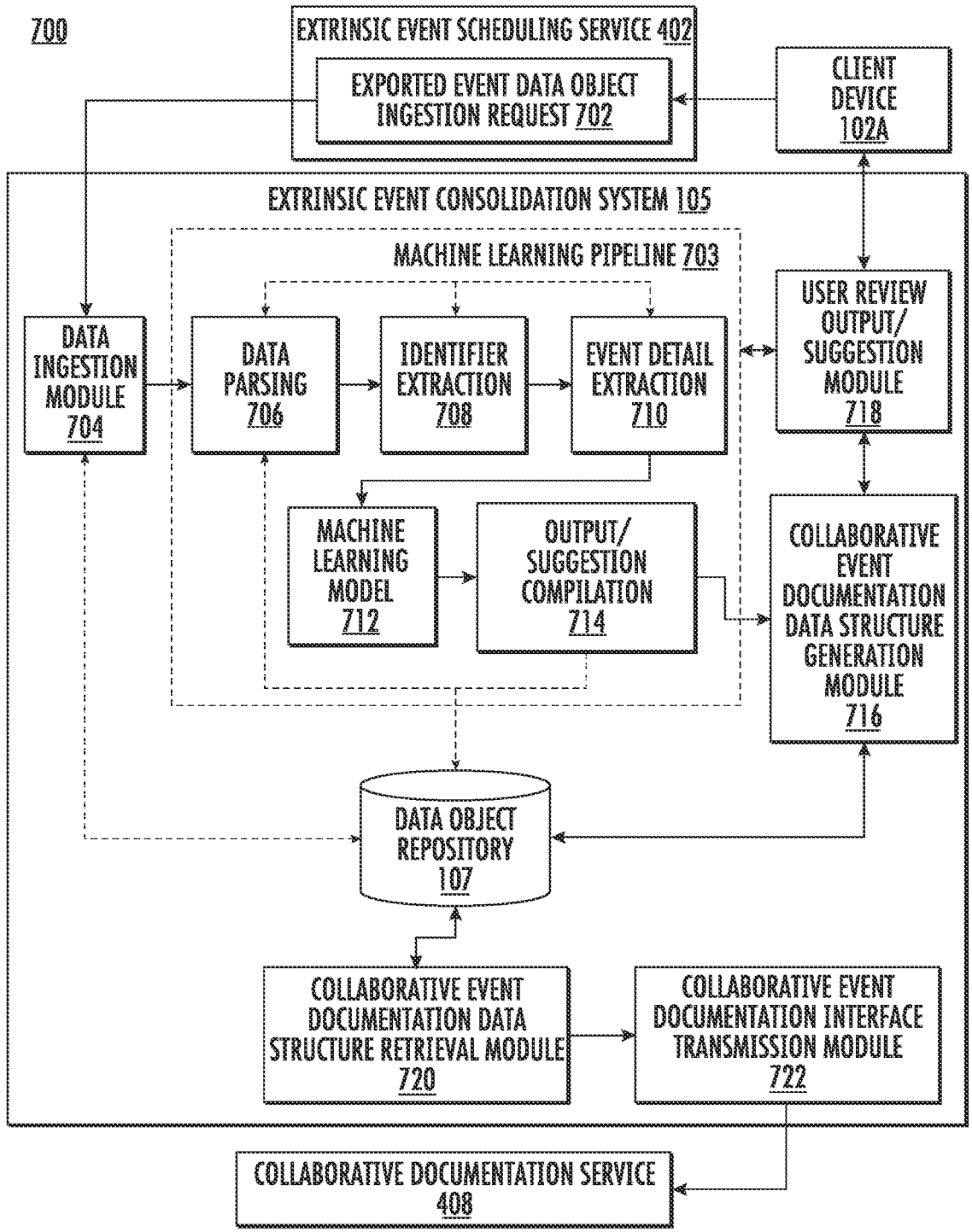

FIG. 7 is a flowchart of an extrinsic event consolidation system workflow in accordance with at least some embodiments of the present disclosure.

FIG. 8 illustrates an exemplary interface configured in accordance with at least some embodiments of the present disclosure.

Figure 9:
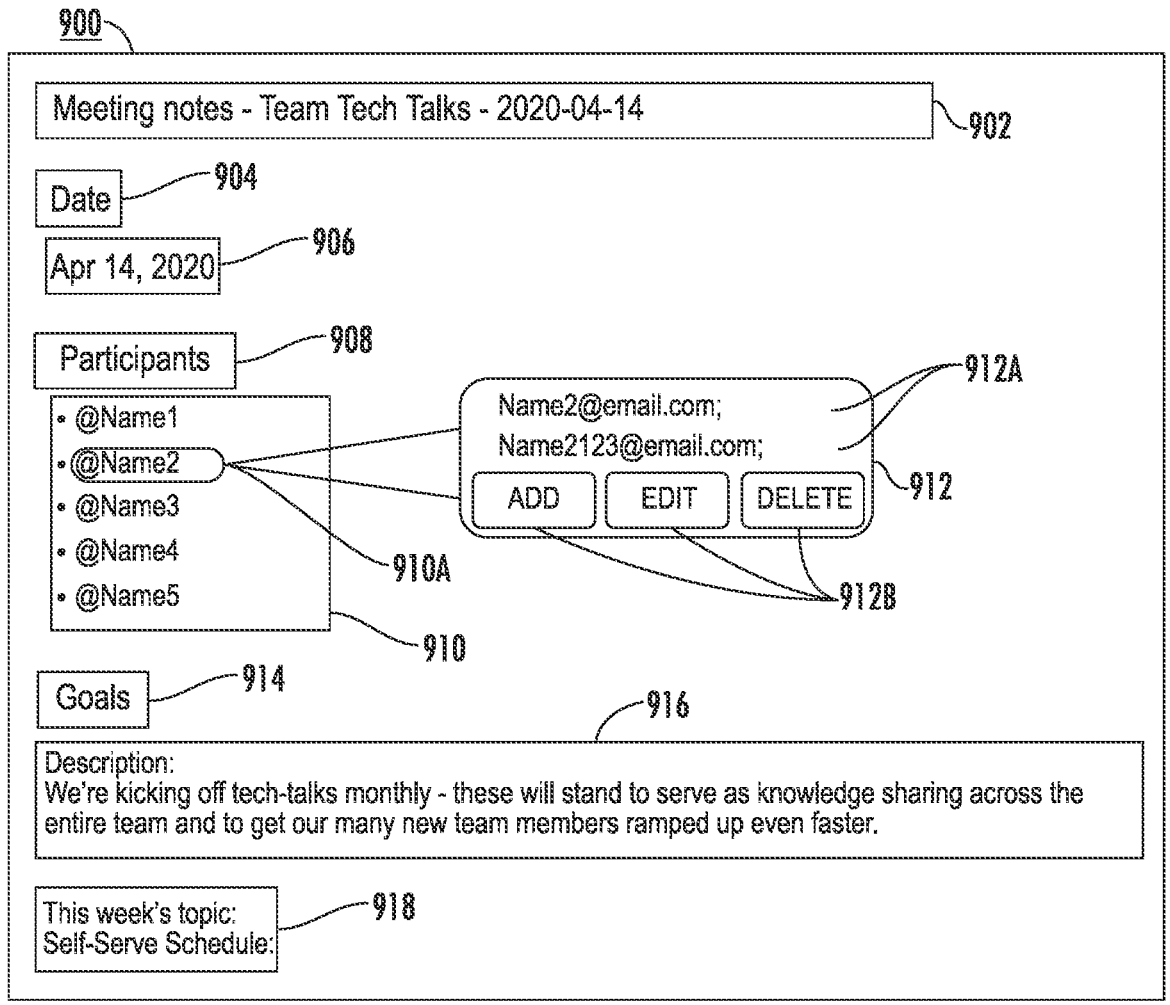

FIG. 9 illustrates an exemplary interface configured in accordance with at least some embodiments of the present disclosure.

Figure 10:
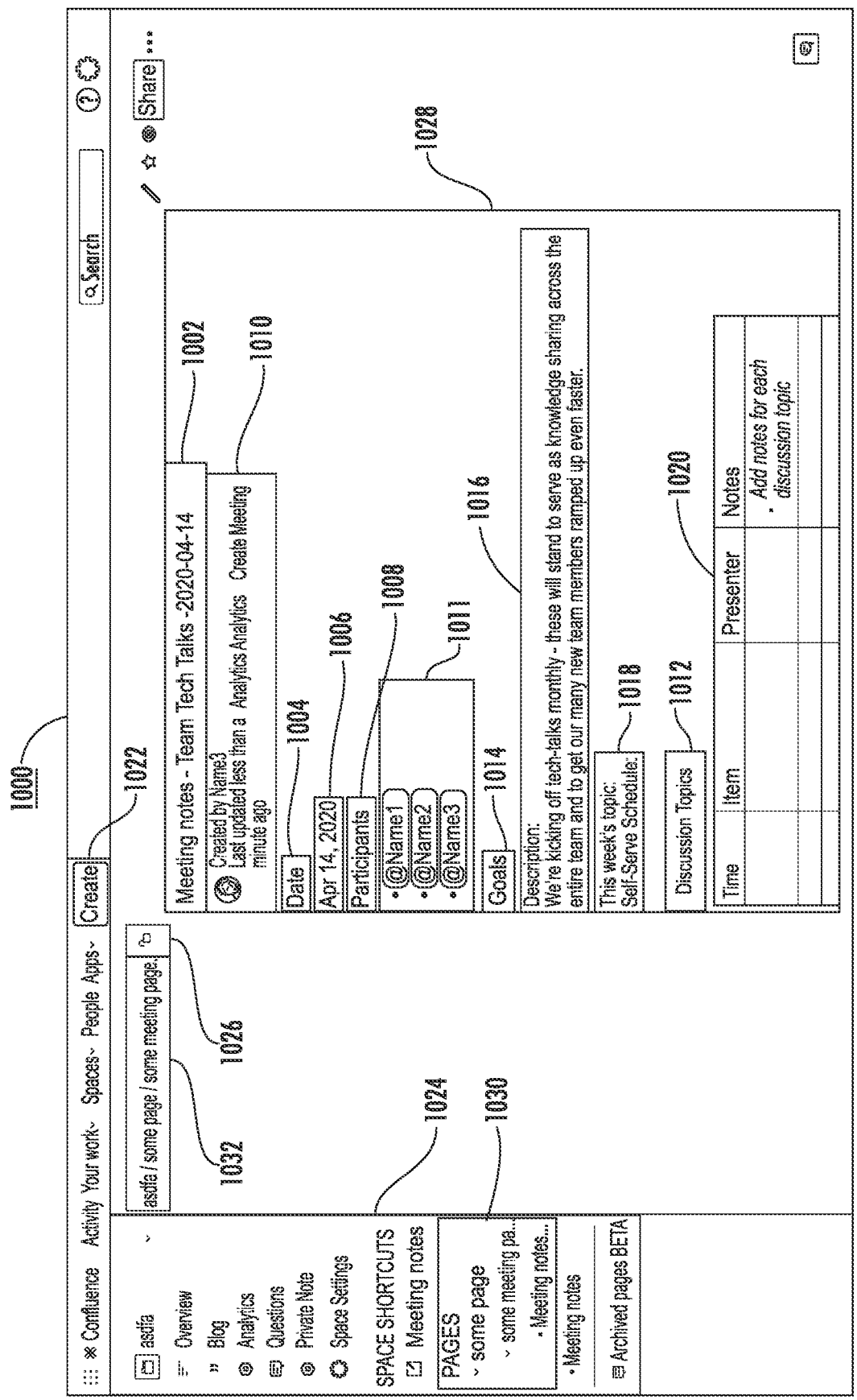

FIG. 10 illustrates an exemplary interface configured in accordance with at least some embodiments of the present disclosure.

Figure 11:
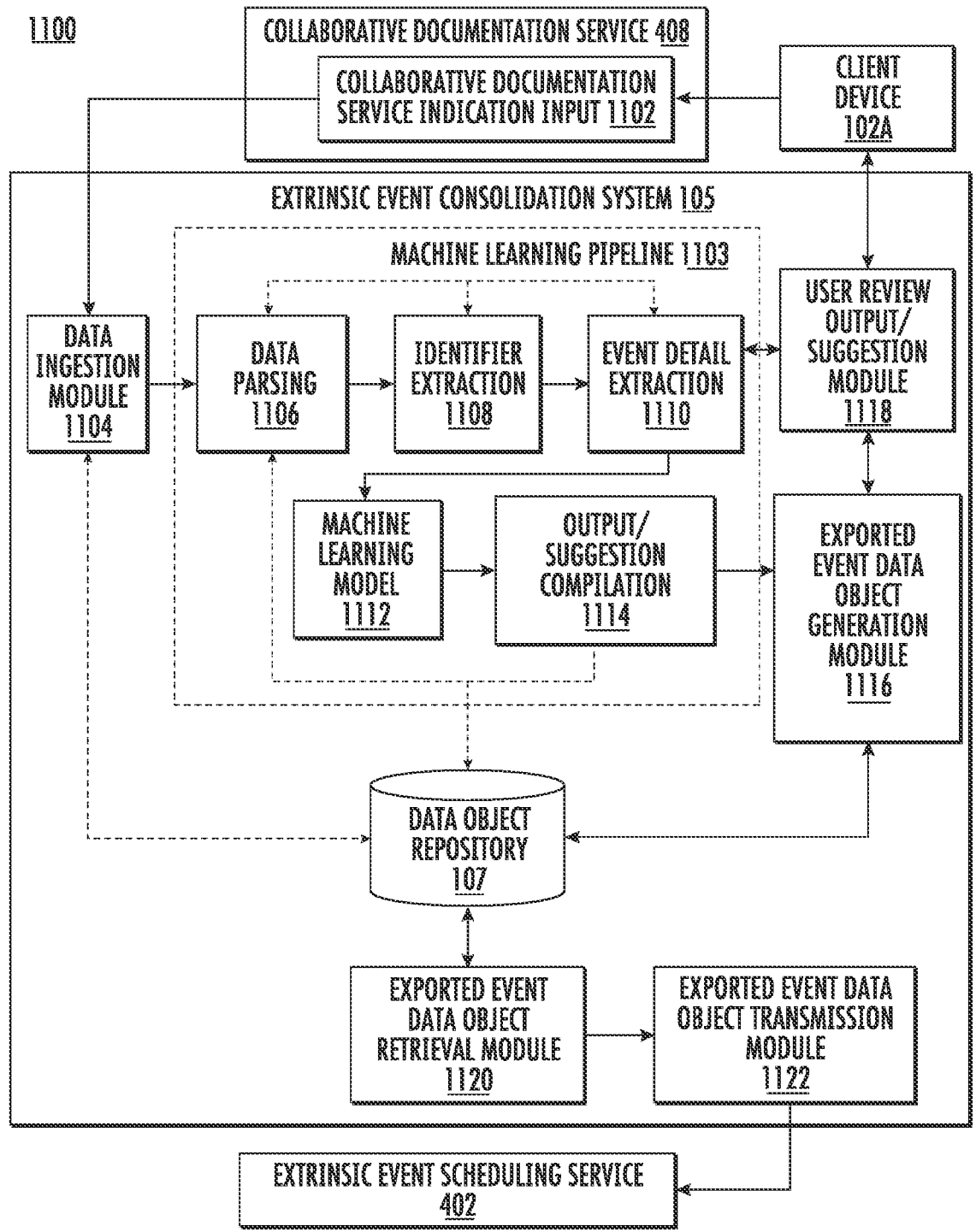

FIG. 11 is a flowchart of an extrinsic event consolidation system workflow in accordance with at least some embodiments of the present disclosure.

Figure 12:
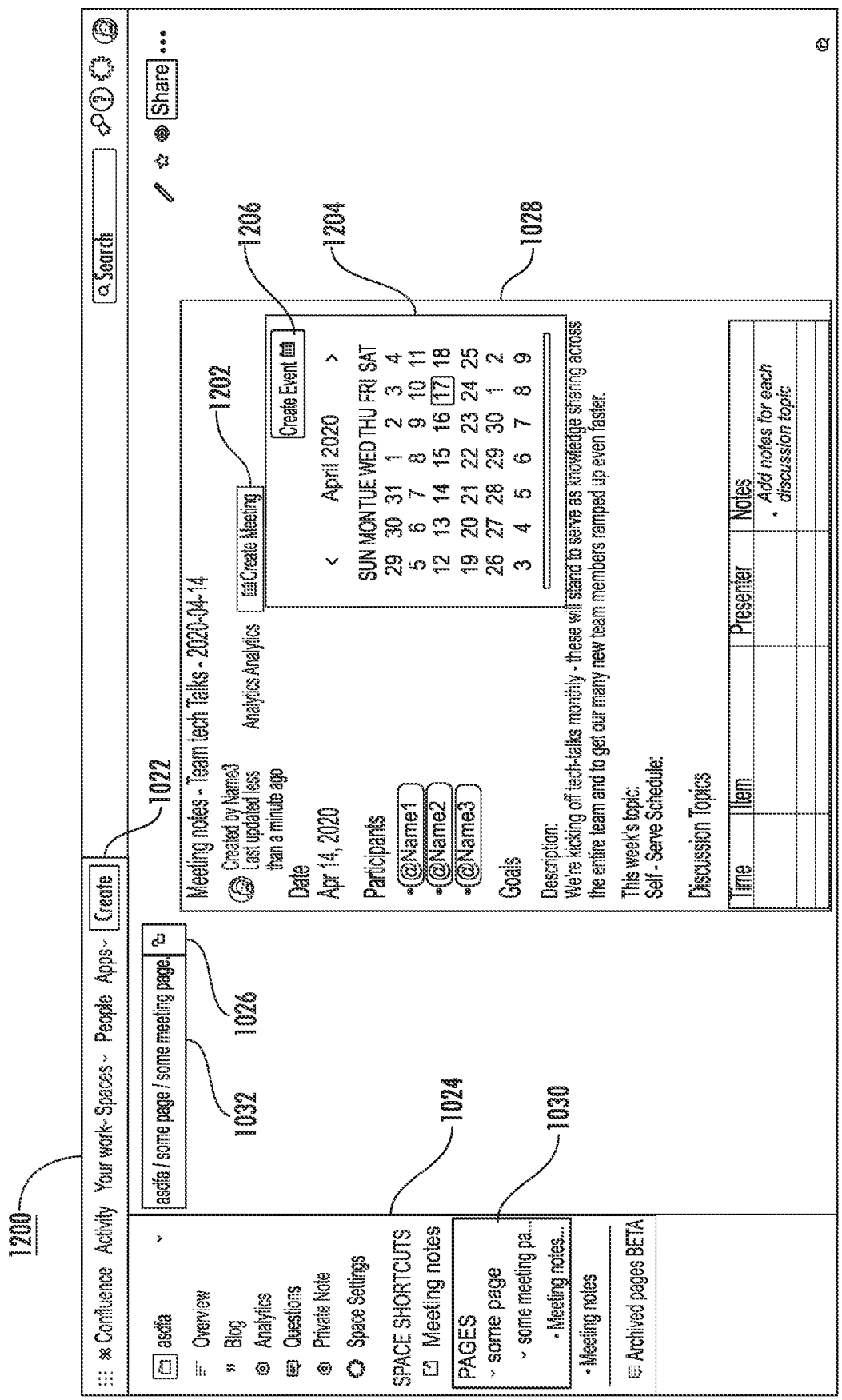

FIG. 12 illustrates an exemplary interface configured in accordance with at least some embodiments of the present disclosure.

FIG. 13 illustrates an exemplary interface configured in accordance with at least some embodiments of the present disclosure.

Figure 14:
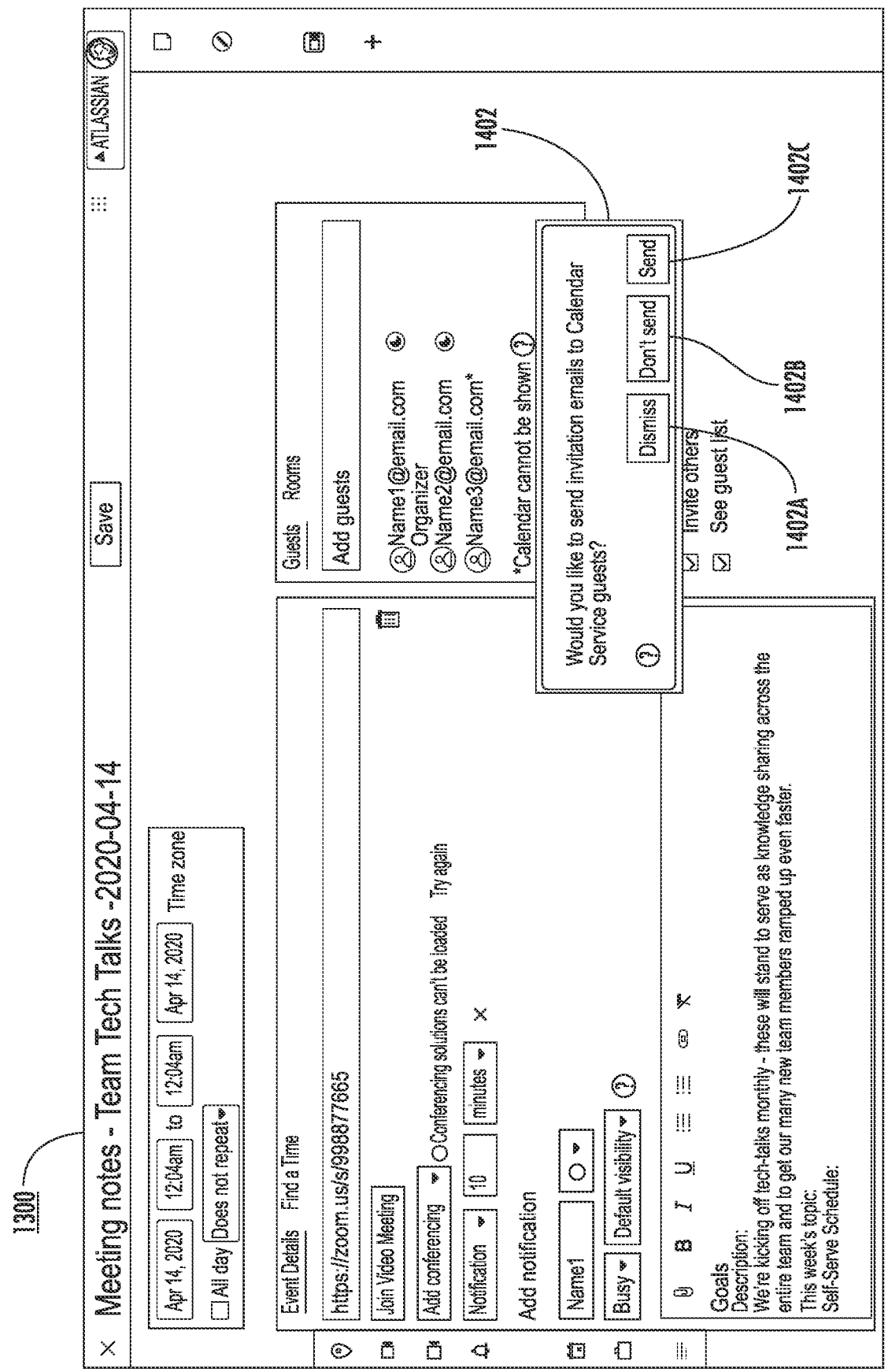

FIG. 14 illustrates an exemplary interface configured in accordance with at least some embodiments of the present disclosure.

Figure 15A:
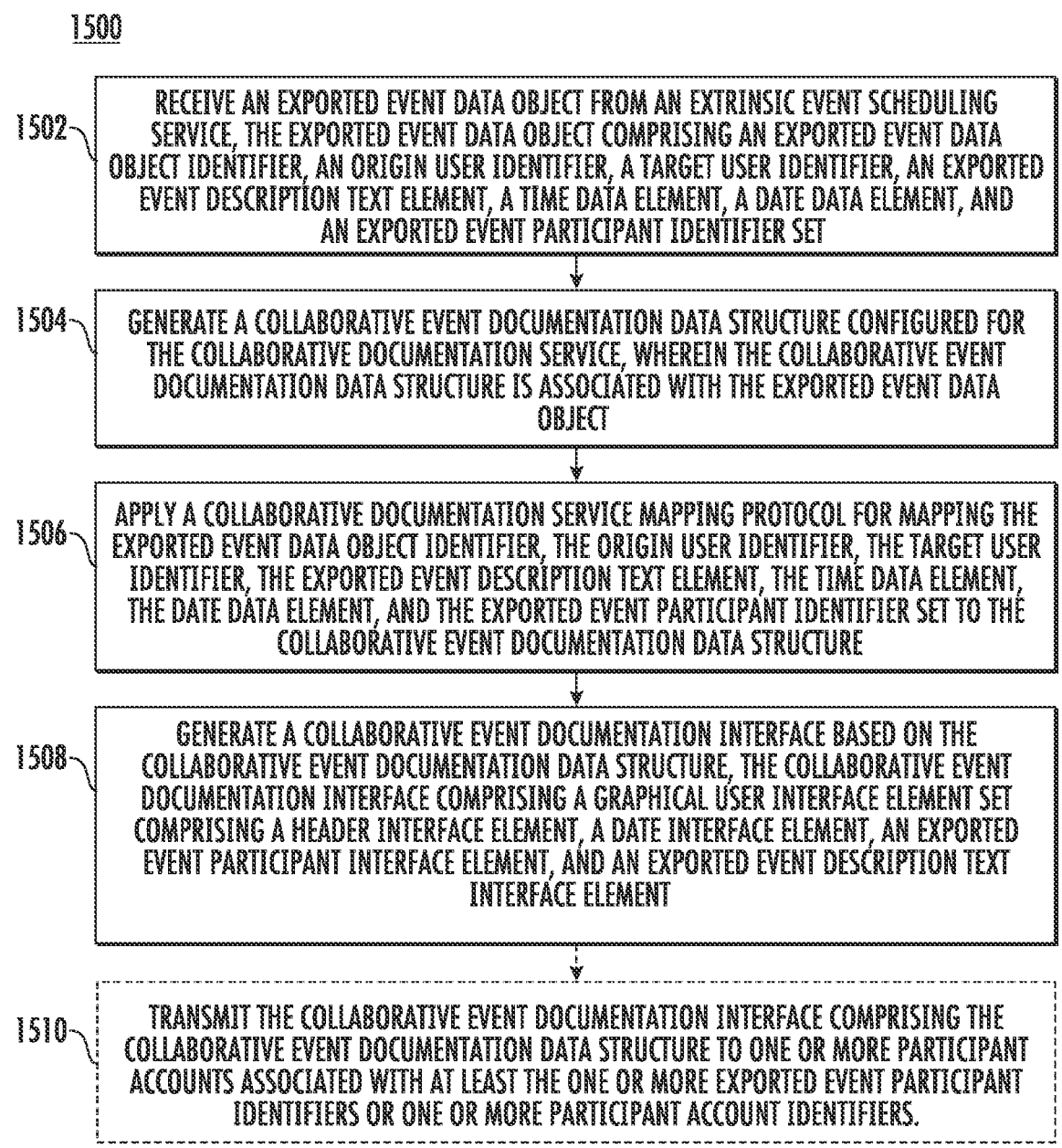
Figure 15B:
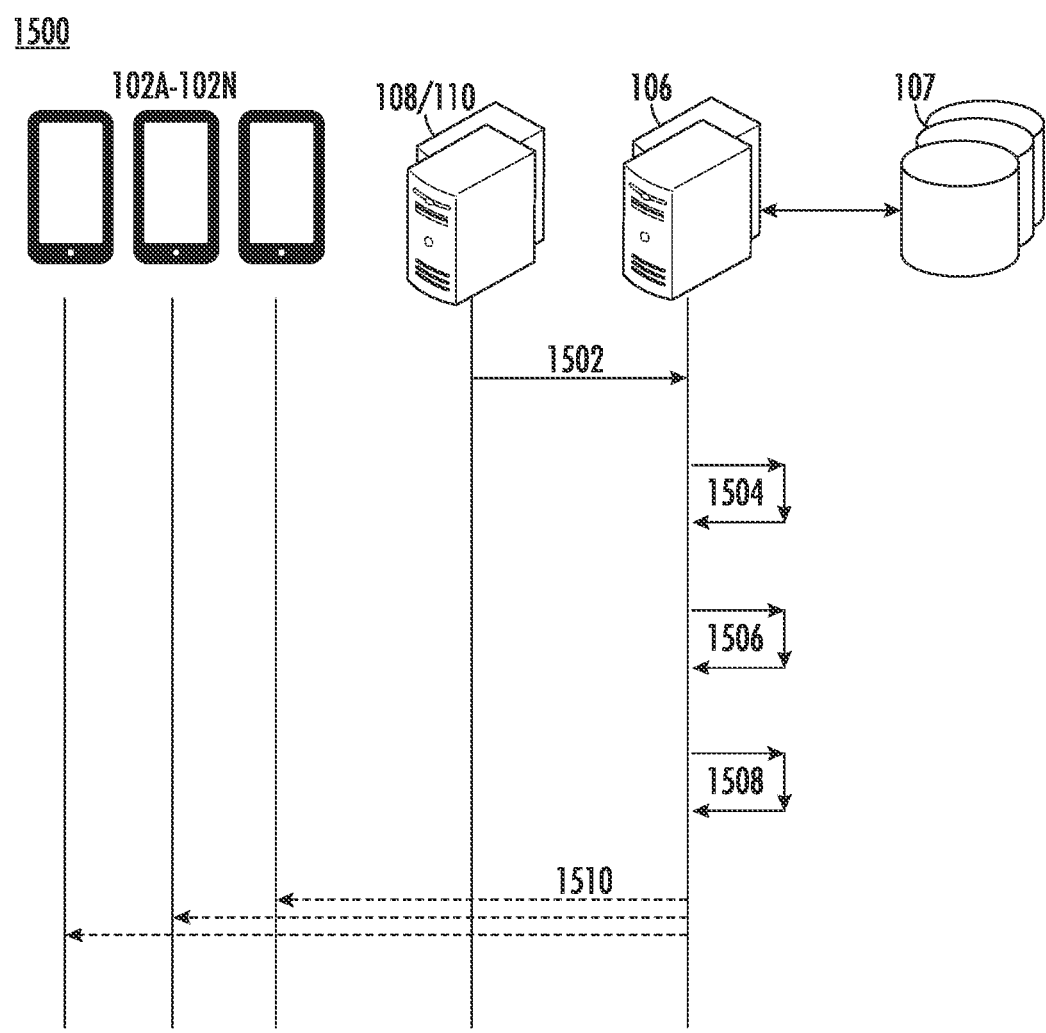

FIGS. 15A and 15B illustrate exemplary operations for the programmatic ingestion of exported event data objects into a collaborative documentation service, for use with embodiments of the present disclosure.

Figure 16A:
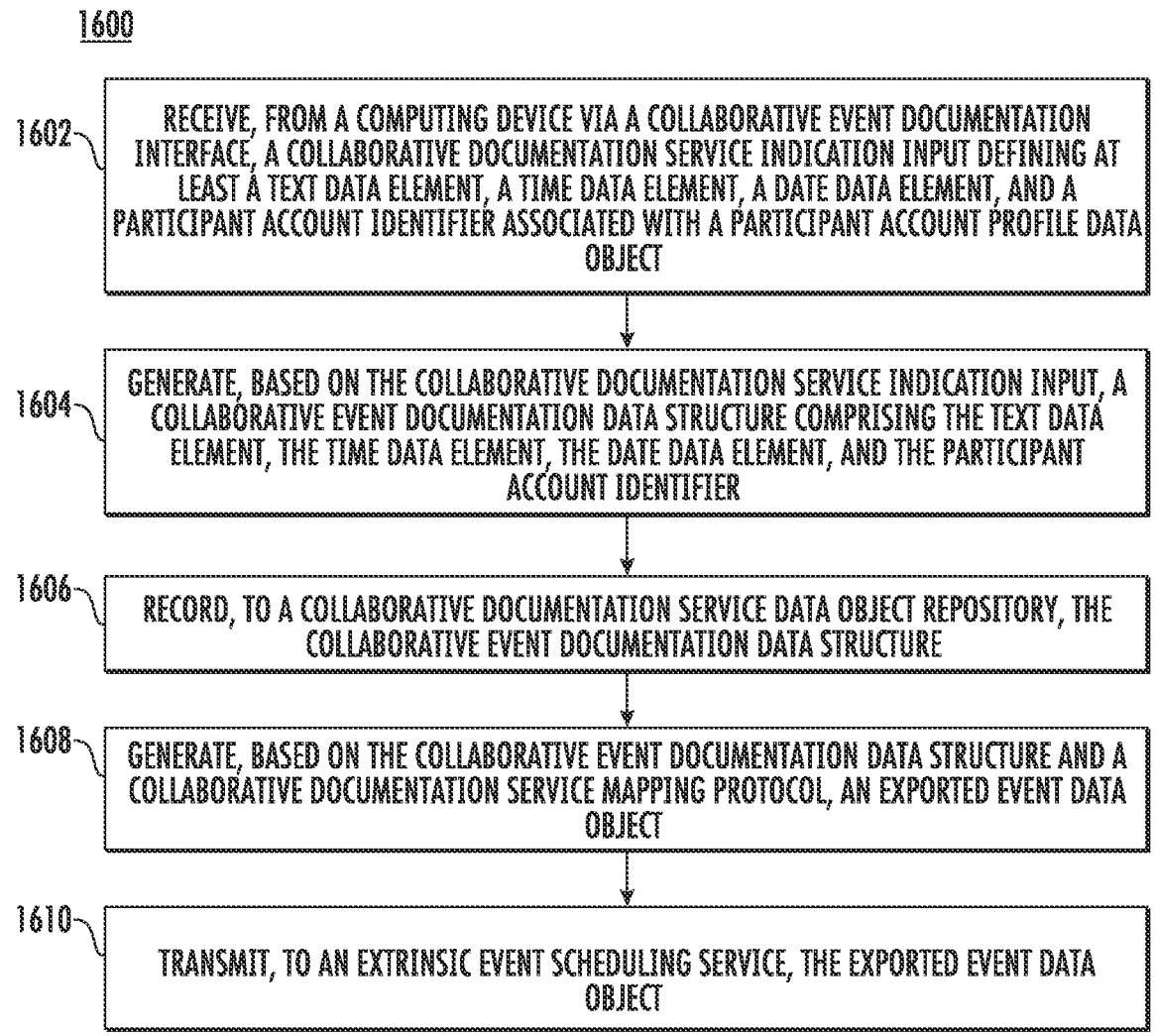
Figure 16B:
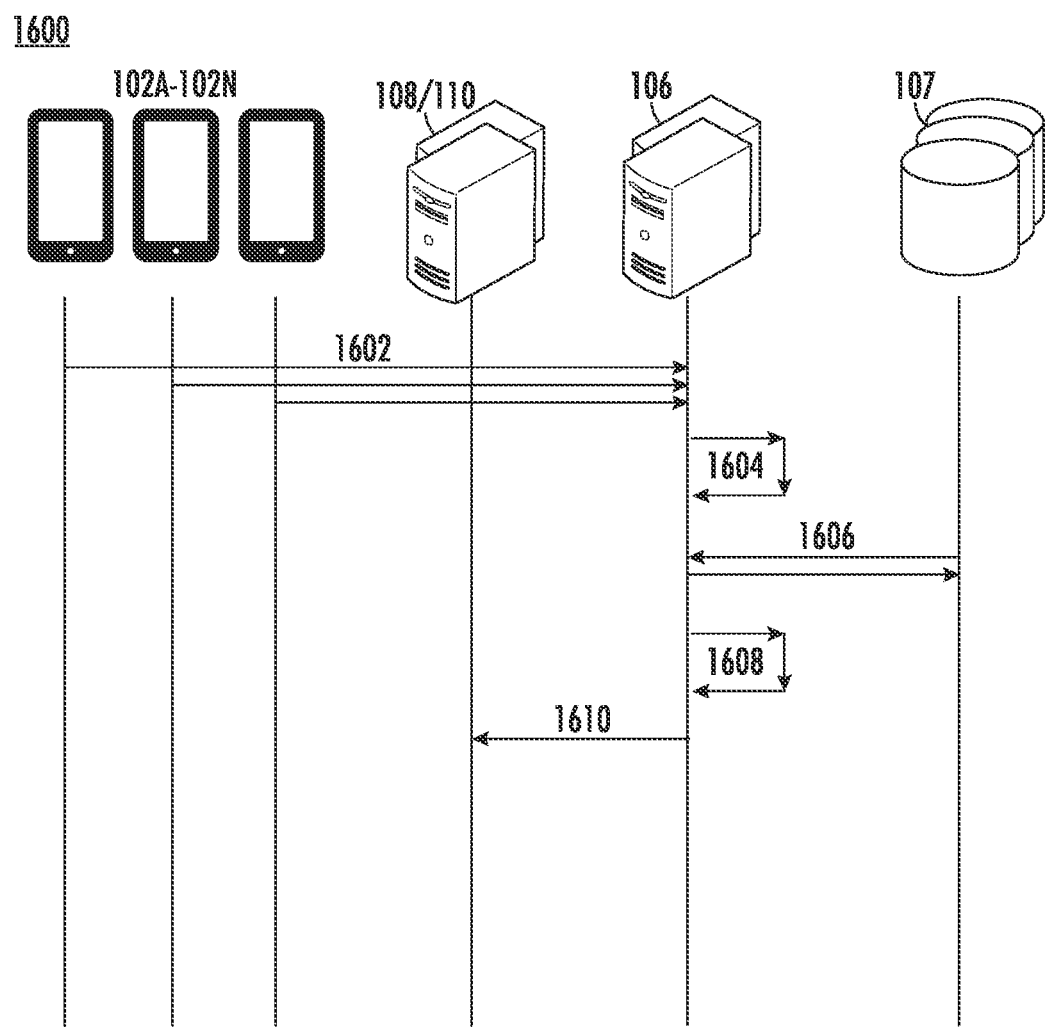

FIGS. 16A and 16B illustrate exemplary operations for the programmatic ingestion of collaborative event documentation interface inputs to provide exported event data objects to an extrinsic event scheduling service, for use with embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Any example sets, lists, and/or combinations as described herein may be used in both the alternative and conjunctive sense, unless otherwise indicated. Like numbers refer to like elements throughout.

Overview

Collaboration systems deployed over multi-layer service oriented platforms are configured to allow dispersed teams of users within and across organizations to schedule meetings and track associated details remotely by using individual computing devices (e.g., laptops, desktops, smart phones, servers, and/or the like). Collaboration systems, such as web-based audio/video conferencing services (e.g., GoToMeeting® by LogMeIn, Inc., ZOOM by Zoom Video Communications, Inc., or the like), extrinsic event scheduling services (e.g., Google Calendar® by Google LLC, Calendly® by Calendly LLC, Team Calendar in Confluence® by Atlassian, Inc., Clockwise® by Clockwise, or the like), and collaborative documentation services (e.g., Confluence® by Atlassian, Inc.) can offer enhanced user experiences and communication methods.

Collaborative documentation services provide convenience in that geographically dispersed users can communicate, work on shared documents, pull analytics and statistical data related to team projects, and/or provide a shared centralized point for organizational knowledge in a standardized format (i.e., a source of truth for an organization). Additionally, extrinsic event scheduling services, and web-based audio/video conferencing tools can be used in conjunction with collaborative documentation services to facilitate extrinsic events (e.g., real-time face-to-face meetings facilitated by external systems, or the like) across the Internet. Such extrinsic events allow users and organizations to save time and reduce incurred costs by removing the need for dispersed team members to travel to a single system or location to effectively share ideas and work through obstacles.

Information such as meeting notes, workflows, collaborative work documents, and/or the like can be stored via a collaborative documentation service from various sources (e.g., extrinsic event scheduling services) and from various formats to organize and maintain a more complete team knowledge base. By using an extrinsic event consolidation system in conjunction with a collaborative documentation service the various extrinsic event scheduling services can automatically create and/or update collaborative event documentation data structures within a central collaborative documentation service.

An extrinsic event scheduling service can generate a calendaring event, such as used with Google Calendar® or the like, and using an extrinsic event consolidation system can transmit an exported copy of the calendaring event for ingestion into a collaborative documentation service. For example, a user may input a calendaring event including participant invitations and a video conferencing link into their Google Calendar®. Further, with one-click of a graphic user interface of an extrinsic event consolidation system (e.g., configured as an extension of Google Calendar®) the user can share their calendaring event and/or automatically setup a Confluence® page within Confluence® to manage the notes and other shared details for the calendaring event (e.g., a video meeting between team members).

The extrinsic event consolidation system can be configured to map various extrinsic event scheduling services to a collaborative documentation service. By parsing exported event data objects from each respective extrinsic event scheduling service, the extrinsic event consolidation system can map the details of the exported event data objects to particular collaborative event documentation data structures by way of predefined mapping protocols and/or exported event templates. For example, a calendaring event from Calendly® may be identified by the extrinsic event consolidation system and in response the extrinsic event consolidation system can select to process the calendaring event (i.e., the associated exported event data object) using a particular mapping protocol. The particular mapping protocol being configured, for example, specifically to map Calendly® calendaring events to Confluence® page templates to generate dynamic pages associated with Confluence®.

The extrinsic event consolidation system can utilize multiple mapping protocols to bridge various extrinsic event scheduling services with a collaborative documentation service. Moreover, particular exported event templates may be used, for example, to automatically and instantly format the generated Confluence® page based on certain criteria including page layout, font, privacy settings, and/or other predefined formats for respective meeting types, such as budget meetings, social events (e.g., retirement parties, etc.), or the like. Collaborative documentation services can also be configured with the extrinsic event consolidation system to facilitate one-click exportation of data objects (e.g., generated based on a collaborative event documentation data structure, Confluence® page, and/or the like) to extrinsic event scheduling services to generate, for example, calendaring events, invitation emails, video conference links, and/or the like.

Definitions

As used herein, the terms "data," "content," "digital content," "information," and similar terms may be used interchangeably to refer to data capable of being transmitted, received, and/or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," and similar terms may be used interchangeably to refer to a computer comprising at least one processor and at least one memory. In some embodiments, the client device may further comprise one or more of: a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like.

Additionally, the term client device, or the like, may refer to computer hardware and/or software that is configured to access one or more of an application, a service, or repository made available by a server. The server is often, but not always, on another computer system, in which case the client accesses the service by way of a network. Embodiments of client devices may include, without limitation, smartphones, tablet computers, laptop computers, personal computers, desktop computers, enterprise computers, servers, the like, and any other mobile and/or portable computing devices known to one skilled in the art in light of the present disclosure. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of circuitry applies to all uses of this term herein, including in any claims. Additionally, the term circuitry may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The term "multi-layer service oriented platform" refers to a complex network computing environment associated with a multitude of computing devices, applications, services, and microservices. For example, in some embodiments, a multi-later service oriented platform includes dozens of applications that are supported by 1000+ services operating within a cloud based platform. Example multi-layer service oriented platforms may comprise a federated network of computing devices, and/or a plurality of database platforms (e.g., servers, hard-drives, etc.). Applications and services or microservices of example multi-layer service oriented platforms may be hosted by internal resources or external resources as further defined below.

Additionally, multi-layer service oriented platforms may include one or more applications that are configured to generate and update one or more repositories of collected information associated with each of the one or more applications (e.g., exported event data objects shared between a plurality of applications). Such multi-layer service oriented platforms can support an application or multiple applications that are configured for the collection of information, in the form of application data objects, to at least capture, classify, and structure such application data objects. In some embodiments, one or more applications can receive and store information collected via another application (e.g., exported event data objects) to identify information for an exported event and update a data object repository associated with the receiving applications.

The term "extrinsic event scheduling service" refers to at least a portion of a multi-layer service oriented platform comprising one or more computing devices, applications, services, and/or microservices for at least the provision of data objects for organizing extrinsic events (defined below) associated with one or more users. Non-limiting examples of an extrinsic event scheduling service may comprise one or more of a calendaring application (e.g., Google Calendar®, Calendly®, Team Calendar in Confluence®, Clockwise®, Reclaim.ai, X.ai, or the like), an appointment or booking service, an email service, or any other application, service, or software program configured for the generation of data objects associated with an extrinsic event. An extrinsic event scheduling service may be associated with one or more computing devices including, without limitation, smartphones, laptops, desktops, and/or any other mobile computing devices as described by the present disclosure.

The term "collaborative documentation service" refers to a service and/or application configured for the generation and/or storage of collaborative event documentation data structures. A collaborative documentation service may be at least a portion of a multi-layer service oriented platform. A collaborative documentation service may be associated with one or more computing devices (e.g., smartphones, laptops, desktops, and/or any other mobile computing devices as described by the present disclosure), applications, services, and/or microservices for at least the transmission, receipt, and/or storage of data objects associated with extrinsic events between a plurality of users, computing devices, applications, services, and/or microservices. Non-limiting examples of a collaborative documentation service may comprise one or more of a team collaboration application (e.g., Confluence®), a workflow application, an incident management application, or any associated internal and/or external resources as described below.

A collaborative documentation service may generate collaborative event documentation data structures (defined below), such as dynamic pages where users of the collaborative documentation service may upload data objects (e.g., images, videos, audio, emails, and/or other media types), post messages (e.g., forum posts, comments, blog posts, private messages, etc.), communicate in real-time (e.g., instant messaging, video calling, etc.), customize features of the dynamic page (e.g., format text, paste links such as Uniform Resource Locators (URLs), use markdown, code snippets, and/or other types of coding), invite/exclude system users from accessing at least a portion of the dynamic page, and/or provide for other page enhancements (e.g., adjust the layout, dimensions of a dynamic page display, or the like) as described by the present disclosure. A collaborative documentation service may generate collaborative event documentation data structures based on dynamic page templates (e.g., exported event templates as defined below) defining, for example, one or more of a date, a plurality of panels (e.g., sections of the dynamic page reserved for partial information, such as notes, errors, warnings, etc.), team project roadmaps (e.g., work assignments, completed tasks, milestone dates, etc.), page aesthetics (e.g., texts/fonts, colors, layout, dimensions, and other visual formats), or the like.

A collaborative documentation service may update and/or maintain collaborative event documentation data structures that provide for team collaborative work. For example, the collaborative documentation service may allow a plurality of system users to access, display, and/or modify/edit a dynamic page of the collaborative documentation service at the same time. Changes made by respective system users to a shared dynamic page may be automatically stores/saved and synced between all system users in real-time. For example, a first user may post a draft of a research paper and other users may be able to view the draft, make edits (e.g., correct grammar, etc.), and/or contribute their own sections to the paper. A second user, for example, may insert statistical graphs throughout the research paper, while a third user edits the paper for spelling mistakes and a fourth user provides comments as to how the concepts of the research paper may be implemented with new products.

A collaborative documentation service may update and/or maintain collaborative event documentation data structures in association with other data objects and/or collaborative event documentation data structures. For example, a dynamic page (as described above) may be stored via a repository along with one or more other dynamic pages to generate a dynamic space. The dynamic pages may be stored, linked, and/or associated with other dynamic pages based on similar context (e.g., each dynamic page is a portion of a larger project, each dynamic page is a part of a particular team or group, etc.). A plurality of associated collaborative event documentation data structures (e.g., dynamic pages) may define a dynamic space. A dynamic space may be configured as a collaborative event documentation data structure comprising at least an overview of the shared context of all dynamic pages within the dynamic space. A dynamic space may include at least links to each associated dynamic page. The collaborative documentation service may store and/or maintain (e.g., update, modify, add to, delete from, etc.), via at least a repository, a plurality of collaborative event documentation data structures organized based on a hierarchy of dynamic spaces, a hierarchy of dynamic pages, organizational hierarchy data structures, an index of data objects, and/or the like as described herein.

For example, dynamic spaces may be organized into a page tree data structure based on the departments of an organizational hierarchy data structure, and the dynamic pages within each dynamic space may be organized according to their creation date. A page tree data structure may define sorting criteria for collaborative event documentation data structures (e.g., dynamic pages, dynamic spaces, etc.) based on one or more of a date/time data element, participants, security levels/thresholds, features associated with an organizational hierarchy data structure (e.g., departments, job titles, etc.), or sorting criteria defined by a system user (e.g., page creator, system administrator, programmer, etc.).

Transmission and/or receipt of data objects between the extrinsic event scheduling service and the collaborative documentation service may take place through a firewall and/or other network security features via a network. The extrinsic event scheduling service and the collaborative documentation service may communicate via one or more intermediary applications and/or services. The extrinsic event scheduling service and the collaborative documentation service may operate on compiled code bases or repositories that are separate and distinct from each other. A collaborative documentation service may comprise, at least in part, an extrinsic event scheduling service, for example, Team Calendar in Confluence®.

The term "extrinsic event consolidation system" refers to at least a portion of a multi-layer service oriented platform comprising one or more computing devices, applications, services, and/or microservices configured to facilitate data object exchange between an extrinsic event scheduling service and a collaborative documentation service. The extrinsic event consolidation system, or a portion thereof, may be at least partially configured to operate as a portion (e.g., plug-in, add-on, extension, etc.) of an extrinsic event scheduling service and/or a portion of a collaborative documentation service. The extrinsic event consolidation system, or a portion thereof, may be configured to operate on compiled code bases or repositories that are separate and distinct (e.g., a standalone extrinsic event consolidation server or other computing device) from the extrinsic event scheduling service, the collaborative documentation service, and/or one or more client devices associated with one or more users.

Moreover, the extrinsic event consolidation system, or a portion thereof, may be configured to operate on compiled code bases or repositories that are at least partially utilized by the extrinsic event scheduling service, the collaborative documentation service, and/or one or more client devices associated with one or more users. For example, the extrinsic event consolidation system may partially be a plug-in associated with Google Calendar® and partially a plug-in associated with Confluence®, each of the plug-ins being configured to transmit and receive extrinsic event data objects associated with one or more standardized formats for ingestion by the plug-in's respective application. Additionally, each plug-in associated with the extrinsic event consolidation system may be configured to generate a data object (e.g., exported event data object, etc.), based on a user indication/input received via at least a client device, from their respective application and transmit the data object to at least another plug-in associated with the of the extrinsic event consolidation system. The extrinsic event consolidation system may be configured (e.g., with at least a collaborative documentation service mapping protocol as described below) to facilitate transmission and/or receipt of data objects via one or more application programming interfaces associated with one or more application and/or services.

The term "application" refers to a computer program or a group of computer programs designed for use by and interaction with one or more networked or remote computing devices. Non-limiting examples of an application comprise workflow engines, service desk incident management, team collaboration suites, cloud services, email clients, calendar clients, word processors, spreadsheets, accounting applications, web browsers, media players, file viewers, videogames, photo editors, audio editors, video editors, and/or web-based audio and/or video conferencing tools (e.g., configured for virtual video and/or audio conferencing, webinars, live chats, streaming services, screen-sharing, and other real-time collaborative audio and/or video capabilities). An application can be supported by one or more services either via direct communication with the service or indirectly by relying on a service that is in turn supported by one or more other services. In some embodiments, an application may be supported by an internal resource or an external resource as defined below.

The terms "application programming interface" or "API" refer to a computing interface that defines indication inputs between applications, services, computing devices, repositories, and/or the like of a multi-layer service oriented platform. An application programming interface may define formatting for one or more of a programming code call, request, function, procedure, notification, data object, data structure, or the like. Non-limiting examples of an application programming interface may include JavaScript Object Notation (JSON), Extensible Markup Language (XML), Simple Object Access Protocol (SOAP), Hypertext Markup Language (HTML), the like, or combinations thereof.

The term "service" refers to a computer program or a group of computer programs designed to provide a software functionality or a set of software functionalities via a multi-layer service oriented platform. For example, a service may be configured to retrieve specified information or to execute a set of operations aimed at a particular purpose. Applications and/or client devices may be configured to use such services to execute their respective purposes, together with the policies that control service usage, for example, based on the identity of the client (e.g., an application, another service, etc.) requesting the service. Additionally, a service may support, or be supported by, at least one other service via a service dependency relationship. For example, a calendaring application stored on a smartphone may call a service associated with an extrinsic event consolidation system at a server in order to translate a particular data object from a data structure format of the calendar application to another data structure format for use with a team collaboration suite application. In such an example, the calendaring application is dependent on the data mapping service to perform the translation task and transfer the particular data object to the team collaboration suite application. A service may be offered by one or more computing devices over a network to one or more other computing devices. Services may be, or may be supported by, internal resources or external resources as defined below.

Additionally, services may be accessed by other services via a plurality of APIs as defined above. Services may be configured to capture or utilize database information and asynchronous communications via message queues (e.g., Event Bus). Non-limiting examples of services include an email validation service, a translation service (e.g., language translation, API-to-API translation, etc.), an open source API definition format, an API logger, a network diagnostics tool, a geofencing service, a single sign-on enforcement service, an internal developer tool, web-based Hypertext Transfer Protocol (HTTP) services, database services, asynchronous message queues which facilitate service-to-service communications, or the like. In some embodiments, a service can represent an operation with a specified outcome and can further be a self-contained software program. In some embodiments, a service from the perspective of the client (e.g., another service, application, etc.) can be a black box meaning that the client need not be aware of the service's inner workings. In some embodiments, a first service may transmit a service data object to one or more second services, and/or applications, via an API supported by communications circuitry.

The term "data object" refers to a data structure, associated with a value in a computer-readable storage medium and/or a computer-readable transmission medium, that represents content that is configured for use or display by one or more software applications, services, and/or microservices. The data object can take the structural form of a vector or other appropriate data structure for representing output data. The data object may include metadata and may be stored via computer-readable storage medium (e.g., with a repository associated with a server). The data object may be transmitted by a first service or application and received by a second service or second application by way of a computer-readable transmission medium (e.g., telecommunication signals, wired/wireless electrical signals, etc.). In some embodiments, a data object may comprise a plurality of other data objects. The data object may comprise one or more of a service data object, an application data object, a vector data object, or the like. A service data object, for example, may comprise any data object generated, or at least partially configured, by one or more services. An application data object, for example, may comprise a data object generated, or at least partially configured, by one or more applications. Data objects may comprise one or more data elements including, without limitation, metadata such as data object identifiers and/or any other identifiers as discussed herein.

Additionally, data objects disclosed herein may be structured to include a data object identifier that serves as a unique identifier for the data object as further discussed below. Data objects structured as discussed herein may further include an origin identifier (defined below) that serves as a unique identifier for the service, application, repository, and/or system user that generated, stores, or manages the data object. Data objects structured as described herein may further include one or more text data elements such as, for example, company name, username, password, message text, file text, or combinations thereof, and which are further defined below. In some embodiments, a data object can be a web service output provided by a server to a plurality of other computing devices over a wired and/or wireless network and, as such, the data object can contain one or more properties associated with the web service such as an IP address, API information, the like, or combinations thereof.

Moreover, data objects may be configured to follow a predefined format, such that an application can receive, manipulate, and/or store substantially similar data objects from a plurality of sources (e.g., applications, services, etc.).

For example, an application may receive a plurality of data objects from a plurality of services and/or other applications, each service/application configured for the provision of particular functions or information. In such example embodiments, the application may be able to configure data objects in accordance with information received from a collaborative documentation service mapping protocol as defined below. For example, an application may be configured to sort data elements of a data object into a predefined order based on a collaborative documentation service mapping protocol to generate a local application copy of the data object and/or transmit the data object to another application of a multi-layer service oriented platform (e.g., across the Internet).

Additionally, a data object can be generated in accordance with instructions associated with one or more exported event compilation and/or dissemination systems of a multi-layer service oriented platform. The data object may be one or more encrypted or unencrypted files, for example, JavaScript Object Notation (JSON) files, Extensible Markup Language (XML) files, Simple Object Access Protocol (SOAP) files, Hypertext Markup Language (HTML) files, the like, or combinations thereof. Data or metadata collected from each service, application, repository, or system user (e.g., developer, end-user, administrator, etc.) to be represented by an associated data object can be collected directly from the respective entity itself or a computing device associated with the entity (e.g., a hosting server, a user's computing device, etc.). A data object may comprise a data object identifier and an attribute, the attribute comprising an array of name and value pairs with properties associated with one or more of a service, application, repository, system user (e.g., an account profile, etc.), or a client device.

The term "exported event data object" refers to a data object representing content that is associated with an extrinsic event. An exported event data object may be transmitted between applications, for example, via an extrinsic event consolidation system. At least some of the data elements of the exported event data object may be recorded by one or more of the applications (e.g., extrinsic event consolidation system, extrinsic event scheduling service, collaborative documentation service, etc.). An exported event data object may comprise one or more of an exported event data object identifier, an origin identifier, a target identifier, a plurality of text data elements, a time data element, a date data element, an exported event participant identifier, or the like. An exported event data object may comprise links (e.g., hyperlinks, etc.) to one or more external and/or internal resources as defined below. For example, exported event data objects may include a URL, web address, hyperlink, or the like for one or more web-based audio and/or video conferencing tools, such as GoToMeeting®, ZOOM, or the like. An exported event data object may be used to disseminate extrinsic event information between applications or the like. An exported event data object may be associated with non-digital extrinsic events (e.g., events corresponding to a gathering of at least some participants at a physical venue such as a wedding ceremony, a retirement party, a holiday office party, or similar in-person events). An exported event data object may be automatically generated and/or stored to a repository to reflect one or more reoccurring extrinsic events (e.g., identified via internally generated system indication inputs or via indication inputs provided via a user interface).

The term "extrinsic event" refers to one or more communication sessions facilitated at least in part by a multi-layer service oriented platform. An extrinsic event may comprise an exchange of computer-readable transmission medium between computing devices and users participating in the event. Non-limiting examples of an extrinsic event may include audio and/or video conferences, textual messages, animations, or the like. An extrinsic event may at least in part include physical proximity of one or more participants (e.g., users sharing a computing device and/or users located in the same geolocation during any extrinsic event, etc.). An extrinsic event may be reoccurring, one-time, comprise a plurality of sub-events taking place at the same time (e.g., breaking a larger video conference into smaller discussion groups for a time period).

The term "collaborative event documentation data structure" refers to a data structure representing content that is associated with a collaborative documentation service. A collaborative event documentation data structure may define a dynamic page (e.g., a webpage, application page, user interface, or the like as described herein) or a dynamic space (e.g., dynamic pages grouped based on, for example a page tree data structure or the like) within a collaborative documentation service or an application associated with one or more of an extrinsic event, an account profile, a forum, a public page, a private page, a user's settings/preferences, or the like. The collaborative event documentation data structure may be accessible to one or more system users via their client devices. A collaborative event documentation data structure may be generated automatically within a collaborative documentation service or an application (e.g., Confluence®, etc.) in response to, and based on, receipt of an exported event data object received from an extrinsic event scheduling service, another application, an external resource, and/or the like.

For example, Confluence® may automatically generate a Confluence® page comprising extrinsic event details received from one or more calendaring applications/services (e.g., Google Calendar®). A collaborative event documentation data structure may reflect details of the extrinsic event including, without limitation, a date, a time, a duration, a number of reoccurrences (e.g., weekly, monthly, annually reoccurring events such as meetings, birthdays, evaluations, etc.), a name or title, a summary of the event, meeting minutes, presentation titles, presenters, attendees, organizers, event notes, external resource links (e.g., audio/video conference resources, etc.), internal resource links (e.g., employee directory lookup, etc.), and/or the like.

A collaborative event documentation data structure may be generated based on details of the extrinsic event, such as received via an exported event data object. The exported event data object may be parsed for the details of the extrinsic event (e.g., a name or title, a summary of the event, meeting minutes, presentation titles, etc.) to populate the collaborative event documentation data structure (e.g., Confluence® page) and to determine a position within a hierarchy of dynamic spaces, a hierarchy of dynamic pages, a page tree data structure, an organizational hierarchy data structure, and/or the like. For example, a page tree data structure may include a hierarchy of projects within an organization structured according to groups within the organization. Based on an extrinsic event title, for example "Electrical Wheel Project Three", a collaborative event documentation data structure (e.g., a dynamic page, a Confluence® page, or similar data structures described herein) may be associated with the electrical department's dynamic space upon creation/generation of the respective collaborative event documentation data structure. The electrical department's dynamic space may comprise, for example, the dynamic pages for electrical projects currently and/or previously under development by the electrical department. An extrinsic event consolidation system may determine a position within a hierarchy of dynamic spaces, a hierarchy of dynamic pages, a page tree data structure, or the like during generation of a collaborative event documentation data structure, an exported event data object, or any data object associated with at least an extrinsic event.

Additionally, access to a collaborative event documentation data structure may be restricted based on one or more of a security level value, a security level threshold, an exported event participant identifier, an account profile identifier, a participant list, a role/position within an organizational hierarchy (e.g., accounting department, engineer, chief operations officer, etc.), a time period (e.g., leading up to the event, during the event, after the event, or the like. For example, a Confluence® page for a financial meeting may only be accessed by accountants registered as participants for the event and the page may remain accessible to them for a period of two fiscal years following the end date of the event. A collaborative event documentation data structure may be periodically updated automatically to include one or more reoccurring exported events.

A collaborative event documentation data structure may be automatically generated based on a trigger condition detected (e.g., detection of a reoccurring extrinsic event associated with one or more date data elements, time data elements, meeting descriptions, or similar associated data objects) by an application and indicated (e.g., via a data object transmission or request) to a collaborative documentation service. For example, if a team collaboration software detects that a particular department of an organization is over budget (e.g., for a project, for the fiscal year, etc.) then a collaborative event documentation data structure may be automatically generated and a notification may be automatically transmitted to pertinent participants (e.g., the department manager, project leader, accounting manager, etc.). Additionally, a collaborative event documentation data structure may be automatically generated and/or stored to a repository to reflect one or more reoccurring extrinsic events (e.g., identified via internally generated system indication inputs or via indication inputs provided via a user interface).

Moreover, an exported event data object may be generated based on the generation, or updating, of a collaborative event documentation data structure and transmitted (e.g., automatically, with user approval, etc.) to an external resource or application. For example, upon detection of the generation of a Confluence® page then Confluence® may automatically generate an exported event data object based on the Confluence® page and transmit the exported event data object to an external calendaring application (e.g., Google Calendar®, etc.). Exported event data objects may be generated based on changes or updates that are detected for a particular collaborative event documentation data structure and transmitted to target recipients that previously received an exported event data object associated with the updated collaborative event documentation data structure. The collaborative event documentation data structure may reflect/record historical data (defined below), such as metadata or target recipients (e.g., via target identifiers, etc.) that were previously transmitted an exported event data object based on, for example, the associated Confluence® page. The collaborative event documentation data structure may comprise data elements not visible to one or more system users with access to the associated collaboration application page (e.g., Confluence® page). A data object may at least partially comprise a collaborative event documentation data structure.

The term "vector data object" refers to a two-dimensional data structure comprising at least one row and at least one column of data elements. A vector data object may comprise a single data element representing one row with one column. In some embodiments, a vector data object may comprise a plurality of columns and each column is associated with a respective data element type. For example, a vector data object may comprise information representative of a user account profile wherein the first column is reserved for a username, the second column is reserved for a password, and the third column is reserved for an email address. In some embodiments, a vector data object may comprise a plurality of rows wherein each row represents a respective data object. For example, the first row of a vector data object may comprise information representative of a first user account profile and the second row of the vector data object comprises information representative of a second user account profile.

In some embodiments, dissimilar data objects (e.g., data objects generated from different services, applications, indication inputs, having dissimilar data structures, the like, or combinations thereof) may be converted to vector data objects that share a common data structure (e.g., for provision of data object transmissions between services and/or applications, such as via an extrinsic event consolidation system). In some embodiments, a vector data object may comprise null values for one or more data elements. For example, a vector data object representing a user account profile may have a null value (e.g., a zero, an underscore, etc.) in a data element that reflects an email address value in an instance the represented user account profile is not associated with an email address. In some embodiments, a vector data object may comprise binary code. Vector data objects as discussed herein may be mapped to one or more vector spaces. Vector data objects may be generated via a machine learning pipeline by parsing input data objects, using a machine learning model to identify/determine pertinent data elements, and then vectorize the machine learning model output into a standardize or mutually recognizable data object format for exportation and/or ingestion by one or more of a collaborative documentation service, an extrinsic event scheduling service, or similar applications/services (e.g., associated with an extrinsic event consolidation system or other applications/services discussed herein).

The term "account profile data object" refers to a data object that represents content configured for a user associated with an application and/or service. An account profile data object may comprise one or more of a username, login credential (e.g., password, security questions, etc.), email address, phone number, job title, date of birth, biometric, security level value, professional credential (e.g., education, work experience, licenses, etc.), a biographical description, or the like. An account profile data object may define one or more preferences or settings indicated by an associated application user, for example, preferred language, a home location, or the like.

The term "participant account profile data object" refers to an account profile data object associated with one or more participants of an extrinsic event. A participant account profile data object may be generated specifically for a particular extrinsic event and/or may be associated with an existing account profile data object (e.g., via an account identifier described below).

The term "account identifier" refers to one or more data elements by which an account profile data object may be uniquely identified. The account identifier may include, without limitation, a name, a date of birth, a biometric measurement, an email address, or the like. The account identifier may include, for example, one or more of Internet Protocol (IP) addresses associated with a user's client device, numerical characters, alphabetical characters, alphanumeric codes, American Standard Code for Information Interchange (ASCII) characters, encryption keys, identification certificates, the like, or combinations thereof. The account identifier may include and/or point to, at least partially, one or more applications (e.g., extrinsic event scheduling services, collaborative documentation services, etc.), extrinsic events, or the like. The account identifier may be randomly generated, pseudo randomly generated, time based (e.g., temporary login associated with a single extrinsic event), hardware based, or some combination thereof. A account identifier may be associated with a plurality of user account profile data objects across a multi-layer service oriented platform. For example, an account identifier may be used to associate one or more email addresses with a particular user.

The term "participant account identifier" refers to an account identifier associated with one or more participants of an extrinsic event. A participant account identifier may facilitate association of one or more account profile data objects for association with an exported event data object, extrinsic event, or the like.

The term "data object identifier" refers to one or more data elements by which a data object may be uniquely identified. The data object identifier may include, for example, one or more of Internet Protocol (IP) addresses, URLs, numerical characters, alphabetical characters, alphanumeric codes, American Standard Code for Information Interchange (ASCII) characters, encryption keys, identification certificates, the like, or combinations thereof. The data object identifier may include and/or point to, at least partially, one or more applications, exported events, or user accounts associated with the data object based on the contents of the data object (e.g., an event title or description, participant list, etc.). The data object identifier may be randomly generated, pseudo randomly generated, time based, hardware based, or some combination thereof. Data object identifiers may be assigned to data objects to identify a grouping of data objects (e.g., automatically grouped data objects associated with recurring extrinsic events). For example, all exported event data objects associated with a recurring extrinsic event may share a common part of their respective identifiers (e.g., a shared prefix, suffix, or the like), while also including a unique part of their respective identifiers.

Additionally, the data object identifier may be utilized to prevent duplicate data objects from being generated for an extrinsic event. For example, an exported event data object identifier may be generated for a first exported event data object based on the time, date, location, one or more participants (e.g., event organizer, attendees, speakers, etc.), and/or the like for the associated extrinsic event, and if a second exported event data object was generated (e.g., by the same or a different application/service that generated the first exported event data object), based on the same extrinsic event information, then the exported event data object identifier generated for the second exported event data object may cause/trigger detection of (e.g., a conflict with, a duplicate event notification, etc.) the exported event data object identifier for the first exported event data object. The detection may be performed via one or more of an extrinsic event scheduling service, a collaborative documentation service, a messaging application (e.g., email), an extrinsic event consolidation system, an audio and/or video application, or the like.

The term "exported event data object identifier" refers to a data object identifier by which an exported event may be uniquely identified. The exported event data object identifier may facilitate identification of a particular exported event associated with one or more data objects (e.g., exported event data objects, etc.), user account profiles (e.g., exported event participants, organizers, speakers, etc.), or other data structures (e.g., repositories, repository partitions, etc.).

The term "exported event participant identifier" refers to a data object identifier by which a participant of an exported event may be uniquely identified. Non-limiting examples of an exported event participant identifier may include one or more of an initial, a name, an email address, a date of birth, a job title, an abbreviation, or the like.

The term "origin identifier" refers to one or more data elements by which a service, external resource, application, and/or the like, which generated, transmitted, hosts, or manages an associated data object may be uniquely identified. The origin identifier may include, for example, one or more of IP addresses, URLs, numerical characters, alphabetical characters, alphanumeric codes, American Standard Code for Information Interchange (ASCII) characters, encryption keys, identification certificates, or the like. The origin identifier may be randomly generated, pseudo randomly generated, time based, hardware based, or some combination thereof.

The term "origin user identifier" refers to an origin identifier configured to uniquely identify a particular user that generated, transmitted, hosts, or manages an associated data object via at least a client device. Non-limiting examples of a origin user identifier include one or more of an account identifier, a participant account identifier, or the like.

The term "target identifier" refers to one or more data elements by which a recipient (e.g., service, external resource, application, and/or the like) for a data object or indication input transmission may be uniquely identified. The target identifier may include, for example, one or more of numerical characters, alphabetical characters, alphanumeric codes, American Standard Code for Information Interchange (ASCII) characters, encryption keys, identification certificates, IP addresses, URLs, or the like. The target recipient identified by the target identifier may include, without limitation, one or more of a network entity, a computing device, a server, a software application, a repository (e.g., service data object repository, etc.), a service (e.g., internal resource, external resource, etc.), a user account (e.g., a user account profile associated with one or more applications, etc.), an email address, or the like.

The term "target user identifier" refers to a target identifier configured to uniquely identify a particular user as a recipient of an associated data object via at least a client device. Non-limiting examples of a target user identifier include one or more of an account identifier, a participant account identifier, or the like.

The term "data element" refers to a constituent component of a data object. Data elements may be grouped together according to a hierarchy within a data object. For example, a data object may comprise a string of words (e.g., a sentence, etc.) and each word of the string of words may define a respective data element. Further, each word of the string of words may comprise one or more letters which may each define a respective data element (e.g., an ASCII character code, etc.). Moreover, each ASCII character code, for example, may comprise a plurality of additional constituent data elements, such as, one or more binary codes (e.g., 0 or 1). In such embodiments, a binary character of 0 or 1 would define the smallest divisible data element of a data object. Non-limiting examples of data elements include a text data element, a word based data element, a time data element, a vector data element, a data object identifier, an origin identifier, a target identifier all or some combination of these, as described in further detail below.

The term "text data element" or the like refers to a data element that comprises one or more symbolic characters. A symbolic character may comprise one or more of numerical characters, alphabetical characters, alphanumeric codes, American Standard Code for Information Interchange (ASCII) characters, characters/codes associated with one or more languages (e.g., Latin characters, Chinese characters, Cyrillic character, etc.), or the like. A text data element may be stored within a repository, such as by an application, as a separate data object from the data object from which it is associated. A text data element may be stored within the data structure of the data object (e.g., data object, vector data object, or the like) with which it is associated. Non-limiting examples of text data elements include a letter, a word, a sentence, a paragraph, meeting notes, a meeting summary (defined below), a title, a description, a name, combinations thereof, or the like. Text data elements may be displayed, at least partially, via a graphical user interface, for example as graphical user interface elements.

The term "word based data element" refers to a constituent component of a text data element that comprises a string of characters representative of a word associated with a written language system. For example, a word based data element can be a company name, a username, a conjunctive word, a space, a period, a comma, a sentiment, or a user password.

The term "vector data element" refers to a constituent component of a vector data object. A vector data element may be a text data element, binary code (e.g., 0 or 1) value, or the like. Vector data elements may reflect the presence or absence of a data element (e.g., word based data element, or the like) within a data object (e.g., service data object, or the like). For example, a first exported event data object comprising a title, an email address, description, and an IP address may be converted to a first vector data object comprising columns representative of the title, email address, description, and IP address. In such an example, the first vector data object representative of the first exported event data object may comprise [1101] because the exported event data object includes a title, email address, and IP address values but does not include a description (e.g., of a reason for a meeting, or the like). A vector data element may be a stop word (e.g., space, period, comma, etc.) to indicate a column and/or row separation (e.g., [1,1,0,1]). Vector data elements may be organized (e.g., by a collaborative documentation service mapping protocol, application, etc.) to provide for the transfer of a data object between one or more applications, services, computing devices, APIs, or the like.

The term "time data element" refers to a constituent component of a data object that comprises a time stamp in order to reference at least when a data object was created and/or updated. For example, a first data object may be added to a data structure (e.g., a data object repository, etc.) and tagged with a time stamp for '01:00:00 AM.' A data structure may be tracked for changes over time and, as such, the data structure can represent particular historical states for a given date and/or time based on one or more associated date/time stamps. A data object may comprise a plurality of time data elements. For example, an exported event data object may comprise a first time data element reflecting a time at which the exported event data object was generated (e.g., by an application, etc.) and a second time data element reflecting a time associated with an event (e.g., start time, end time, etc.). A time data element may define one or more of a time scale (e.g., 12 hour clock, 24 hour clock), a time zone, and/or daylight saving time.

The term "date data element" refers to a constituent component of a data object that comprises a date stamp in order to reference at least when a data object was created and/or updated. For example, a first data object may be added to a data structure (e.g., a data object repository, etc.) and tagged with a date stamp for '01/01/2021.' In such an embodiment, a data structure may be tracked for changes over time and, as such, the data structure can represent particular historical states for a given date and/or time based on one or more associated time/date stamps. A data object may comprise a plurality of date data elements. For example, an exported event data object may comprise a first date data element reflecting a time at which the exported event data object was generated (e.g., by an application, etc.) and a second date data element reflecting a date associated with an event (e.g., a single date, recurring dates, etc.). A time data element and/or a date data element may be used to identify historical data for the provision of associated data objects (e.g., retrieve, generate, transmit, store, etc.). A date data element may be used, such as by an extrinsic event scheduling service or the like, to identify reoccurring extrinsic events (e.g., reoccurring weekly meetings, etc.) and generate one or more data objects based thereon. For example, an extrinsic event scheduling service may be configured to detect that a system user schedules the same meeting every month at a similar date and/or time each month. In response to the detection of the reoccurring meeting, the extrinsic event scheduling service or the like may be configured to automatically generate one or more data objects (e.g., exported event data objects, etc.) based on the reoccurring extrinsic event (e.g., the detected monthly meeting).

The term "machine learning pipeline" refers to an automated set of operations for parsing and processing a data object to make a determination based on the contents of the data object. A machine learning pipeline may comprise a plurality of operations/functions including without limitation one or more of a machine learning model (defined below), data compilation, a verification of output data based on the model (e.g., running multiple iterations of the machine learning model with different but comparable variables, incorporating a manual user review of output data for at least some model outputs, etc.), a parameter adjustment (e.g., change threshold values, incorporate a feedback loop based on model outputs, etc.), monitoring long term model outputs, store new data (e.g., new model templates created by programmers, historical data, etc.), or the like. A machine learning pipeline can include a logical workflow between one or more operations comprising "if/then" sequences, "and/or" sequences, Boolean logic trees, the like, or combinations thereof.

For example, a machine learning pipeline configured with a natural language processing model, and/or other machine learning model, can comprise data acquisition (e.g., receipt of a data object, etc.), text cleaning (e.g., parsing the data object into individual words or characters, etc.), identification of stop words or characters, determine dependency between words (e.g., connecting adjectives to appropriate nouns, connecting previously identified nouns with later substitute pronouns (e.g., "Ball" referred to later in a sentence as "it", etc.), referencing words to a dictionary or category (e.g., London, N.Y., and Mexico may all be categorized as geographic locations, etc.), and outputting a data structure in a format that can be cross-referenced to a data object repository. A machine learning pipeline may be associated with a natural language processing model that may be configured for lemmatization and/or stemming of words. A machine learning pipeline may be associated with a natural language processing model that may be configured for converting words into numerical values (e.g., vectorization, etc.).

The term "machine learning model" refers to a data structure associated with a value in a computer-readable storage medium and/or a computer-readable transmission medium, that represents instructions that are configured for pattern recognition of data objects. A machine learning model may be incorporated in whole or in part into a machine learning pipeline (defined above) with one or more other machine learning models. Non-limiting examples of machine learning models include linear regression, logistic regression, decision trees, natural language processing, support vector machine (SVM), or the like. A machine learning model may store/record previously generated data objects as historical data, the historical data may be periodically reevaluated by one or more machine learning models to generate updated data objects. A machine learning model may retrieve or receive one or more data objects from a repository, and/or data stream, and output one or more data objects based on one or more operations or functions (e.g., of the machine learning model, of another process associated with a machine learning pipeline, etc.). A machine learning model may output instructions, based on a determined prediction, to select, generate, retrieve, transmit, and/or otherwise modify a data object. For example, a machine learning model may be configured to predict the most probable collaborative event documentation data structure, collaborative event documentation interface, and/or collaborative documentation service mapping protocol to use in association with an exported event data object and, in response, may cause automatic selection of an exported event template (defined below) to generate a collaborative event documentation data structure and/or the like.

The term "common data element" refers to a data element shared by a plurality of data objects. The common data element may occupy the same position in each of the plurality of data objects. The common data element may be a particular number, word, character, IP address, company name, phone number, email, or the like present in each of the plurality of vector data objects. For example, a common data element between an exported event data object and a collaborative event documentation data structure may be an email address stored as an exported event participant identifier in the exported event data object and as a participant account identifier in the collaborative event documentation data structure. A common data element maybe used to facilitate a detection or a determination of duplicate data objects (e.g., two collaborative event documentation data structures associated with a single exported event data object, etc.). Dissimilar data objects (e.g., exported event data object and collaborative event documentation data structure) may comprise the same common data element.

Additionally, a common data element may be used to facilitate a detection or a determination of a system user associated with multiple exported events, account profiles, organizations, job titles, hierarchies, and/or the like. For example, a system user (e.g., organization employee, etc.)

may use their company email for exported event scheduling and to create their team collaboration suite application user account profile. In such an example, the common data element is their email and can be used to dynamically or automatically attach their user account profile to any exported event data objects that are associated with team collaboration suites or similar collaborative applications/services.

The terms "indication," "indication input," or the like refer to an identifiable, non-transitory occurrence that has technical significance for system hardware and/or software. In some embodiments, an indication input may be user-generated (e.g., a user indication input, etc.) via at least a user interface associated with a computing device, such as keystrokes, mouse movements, voice commands, and/or the like. An indication input may be application-generated (i.e., automatically and/or dynamically internally generated by an application via at least computing circuitry), such as program loading, compiling a data object, errors, and/or the like. For example, an application function may be caused by, and/or a data object may be generated in response to, a user interface indication input and/or an internal confirmation indication input generated by the application or associated computing device(s). An indication input may be at least partially generated via at least one processor and at least temporarily stored via at least one memory. An indication input may define one or more of a letter, word, number, binary value, approval/acceptance (e.g., of a computer/user generated notification or suggestion, etc.), denial/cancellation (e.g., of a computer/user generated notification or suggestion, etc.), selection (e.g., of one or more data objects or elements, etc.), or the like.

The term "collaborative documentation service indication input" refers to an indication input provided via an interface of a collaborative documentation service.

The term "geolocation identifying data object" refers to a data object received from a computing device, associated with one or more applications/services for device/user tracking and location discovery, that indicates a geolocation of the computing device at a time/date interval indicated in the geolocation identifying data object and/or at a time/date interval deemed to be sufficiently close to a time/date of dispatch and/or a time/date of receipt of the geolocation identifying data object. Examples of geolocation identifying data objects include data objects that indicate global position system (GPS) coordinates of a data object, or computing device associated therewith, at a particular time/date. Other examples of geolocation identifying data objects may include data objects that indicate one or more of an IP addresses associated with an application or service host, an indication input received via a computing device with a known location (e.g., scanning an radio-frequency identification (RFID) card or using a common access card (CAC) at a scanner/computer with a known fixed location, etc.).

Additionally, a geolocation identifying data object may be restricted to a predefined level of precision (e.g., in order of decreasing precisions: GPS coordinate, town, region, time zone, etc.). Higher levels of location precision may be accessible to users based on their account permissions configuration protocol and/or associated security level value. For example, an employee with a chief officer role in an organization may be granted access to other employees exact GPS coordinates while a middle manager may be granted access to more general regional location details.

Additionally, a client device, application/service (e.g., calendaring/scheduling client, team collaboration suite, etc.), and/or the like, may automatically generate, store, and/or transmit a geolocation identifying data object in response to an indication input accepting an invitation to, and/or an indication input to join, an exported event. For example, when a user joins an exported event the user's client device, or the like, may indicate GPS coordinates, via a geolocation identifying data object, reflecting the user's current location to a Confluence® page associated with the exported event to notify one or more other user's participating in the exported event. The geolocation identifying data object associated with a particular user may be used to automatically select a language for displaying the Confluence® page of the exported event to the user.

The term "internal resource" refers to a software program, application, platform, or service that is configured by an organization (e.g., an enterprise owner of a multi-layer service oriented platform) to provide functionality to another one or more of the software programs, applications, platforms, or services operating on a multi-layer service oriented platform, either directly or indirectly, such as through one or more other services. Internal resources operate on a compiled code base and/or use data repositories that are at least partially shared by other software programs, applications, or services of the multi-layer service oriented platform. Application code bases, service code bases, and code bases that support an internal resource may be hosted on common servers and/or using computing devices operating within a common intranet and/or network.

Additionally, an application or service may be configured to communicate with internal resources within a shared architectural programming layer without external network or firewall separation. An internal resource may be used only within the application layer that utilizes the internal resources functionality. An example embodiment of an internal resource is a load balancer configured for routing and mapping API and/or service locations. Internal resources may be configured for information-based shard routing, or in other words, routing and mapping API and/or service locations based on predefined custom service requirements associated with an application. For example, an internal resource may be configured to identify where communication traffic (e.g., exported event data object, another data object, or the like) originates from (e.g., via an origin identifier, a geolocation identifying data object, etc.), and then collect information (e.g., receive, retrieve, compile, record, and/or access a data object), generate a data object based on the collected information received from the identified traffic source, and/or reply to the communications utilizing another service for reply communication.

The term "external resource" refers to a software program, application, platform, or service that is configured to communicate with applications, services, software programs, and/or devices of a multi-layer service oriented platform but which operates on a compiled code base that is separate from code bases of the multi-layer service oriented platform. Communications between an external resource and an application or service calling the external resource may take place through a firewall and/or other network security features of the multi-layer service oriented platform. The external resource operates on a compiled code base or repository that is separate and distinct from that which supports the application or service calling the external resource.

The external resources of some embodiments generate data or otherwise provide usable functionality to an application or service calling the external resource. In other embodiments, the application or service calling the external resource passes data to the external resource. An external resource may communicate with an application or service calling the external resource, and vice versa, through one or more APIs. For example, the application or service calling the external resource may subscribe to an API of the external resource that is configured to transmit data objects. An external resource may receive tokens or other authentication credentials that are used to facilitate secure communication between the external resource and an application or service calling the external resource in view of defined network security features or protocols (e.g., network firewall protocols). An example embodiment of an external resource may include cloud services (e.g., AWS®), credential management services (e.g., Okta®), web browser services (e.g., Google Chrome®), and many others that will be apparent to one of ordinary skill in the art in view of this disclosure.

The term "repository" refers to a database stored on a memory device which is accessible by one or more computing devices for retrieval and storage of one or more data objects, the like, or combinations thereof. The repository may be configured to organize data objects stored therein in accordance with one or more particular attributes attributed to the data object (e.g., a scoring metric, file size, file type, etc.). For example, a repository may be structured in accordance with one or more data objects associated with one or more services, applications, internal resources, external resources, network functions, APIs, the like, or combinations thereof. A repository may be at least partially stored on one or more of a server, remotely accessible by a computing device, or on a memory device on-board the computing device.

The term "data object repository" refers to a database stored on a memory device which is accessible by one or more computing devices for retrieval and/or storage of one or more exported event data objects, collaborative event documentation data structures, account profile data objects, the like, or combinations thereof. The data object repository may be configured to organize data objects stored therein in accordance with data object categories. For example, data object categories may comprise one or more data objects associated with one or more applications, services, network functions, APIs, geographical locations, time data elements, date data elements, the like, or combinations thereof. An application, or the like, may apply data object categories to a data object (e.g., via adding a data element to the data object, etc.) to organize the data object in one or more repositories.

Additionally, a data object repository may be stored on a server remotely accessible by a computing device or on a memory device on-board the computing device. The data object repository may store data objects collected for a particular application, service, user, or the like (e.g., all data objects associated with an origin identifier unique to a respective application). A data object repository may be a partition of a larger repository. For example, a single repository may be partitioned into one or more data object repositories. An application, for example, may store user account profile data objects in a first data object repository and collaborative event documentation data structures in a second data object repository, with the first and second data object repositories being partitions of an application data object repository or computing device repository.

The term "historical data" refers to one or more data objects associated with an application, service, computing device, repository, user, and/or the like that comprises previous iterations of one or more applications, services, data objects, account activity (e.g., user indication inputs, etc.), outage logs, usage logs, application logs, message persistence, message acknowledgements, message resend attempts, duplicate message eliminations, priority message delivery order, sender delivery status, receiver delivery status, and/or the like. Historical data may be associated with one or more users (e.g., a log of past interactions with an application/service made by a user or group of users, previous login/logout times, etc.). For example, in a team collaboration software historical data for a user may include posts to a forum made/viewed by the user and/or messages sent to and/or received from other software users. Historical data may comprise previous exported event participation activity and attendance for a user, email, collaboration team, organization, or the like.

The term "permissions configuration protocol" refers to a data structure, associated with instructions, in a computer-readable storage medium and/or a computer-readable transmission medium, that facilitates a determination of access or display of a data object to a system user, application, service, or microservice. A permissions configuration protocol may provide for a determination to use (e.g., access, update, display, receive, transmit, etc.) a data object based on a one or more rule sets, such as defined by a system administrator. For example, a permissions configuration protocol may cause an application, or associated computing device, to compare a security level value (defined below) associated with an account profile data object to a security level value threshold (defined below) associated with a collaborative event documentation data structure. In an instance the security level value associated with an account profile data object is equal to or greater than the security level value threshold, system users associated with the account profile data object may be allowed to access, update, transmit, or otherwise utilize the respective collaborative event documentation data structure or particular data elements thereof.

Additionally, a permissions configuration protocol may comprise a whitelist or a blacklist of, for example, origin identifiers, exported event participant identifiers, participant account identifiers, or the like. For example, a system user may be automatically granted access to use a collaborative event documentation data structure because their respective account identifier is associated with a whitelist of participant account identifiers. A permissions configuration protocol may provide instructions for determinations based on an organizational hierarchy data structure (defined below) or may provide instructions for generating a whitelist or a blacklist based on the organizational hierarchy data structure. A permissions configuration protocol may cause an application, or computing device associated therewith, to detect a particular credential (e.g., security level value, encrypted validation token, job title, password, or the like) associated with a data object (e.g., account profile data object, application/service call request, etc.) to facilitate use of another data object (e.g., collaborative event documentation data structure, exported event data object, etc.).

Moreover, a permissions configuration protocol may define instructions that when executed by a service or application allow access to a data object, or the like, based on processing of respective data elements of the data object. For example, a collaborative documentation service, or the like, may use a natural language processing machine learning model (e.g., via a machine learning pipeline as described below for FIG. 7 and FIG. 11) to modify permission associated with a collaborative event documentation data structure based on a detection of sensitivity data associated with a meeting agenda, notes, summary, description, or the like. For example, if sensitive data such as social security numbers, client trade secrets, or other confidential data is detected by the machine learning model the extrinsic event consolidation system, or the like, may automatically increase a security level value and/or threshold required to access the collaborative event documentation data structure when generating the collaborative event documentation data structure for transmission to a collaborative documentation service. The extrinsic event consolidation system, or an extrinsic event scheduling service, based on at least a permissions configuration protocol may increase or decrease a security level value and/or threshold associated with an exported event data object.

The term "collaboration page permissions configuration protocol" refers to a permissions configuration protocol that facilitates a determination of access or display of a collaborative event documentation data structure to a system user, application, service, or microservice. The collaboration page permissions configuration protocol may define a data object identifier or the like and/or a security level value threshold, or the like (e.g., whitelist, blacklist, validation check based on a security token, etc.), for a particular collaborative event documentation data structure.

The term "account permissions configuration protocol" refers to a permissions configuration protocol that defines security credentials for an account profile data object. The account permissions configuration protocol may comprise one or more of a security level value, an encrypted validation token, a job title, a password, or the like. For example, an account permissions configuration protocol may define a respective password, associated with an account profile data object, for access to a respective collaboration page. The account permissions configuration protocol, or the like (e.g., collaboration page permissions configuration protocol, etc.) may instruct an application (e.g., Confluence® or the like) to associate an encrypted validation token with an account profile data object to provide for future use of one or more data objects by a system user.

The term "security level value" refers to a security infrastructure metric representative of accessibility relative to a data object associated with a multi-layer service oriented platform. A security level value may be a numerical value representative of a security credential associated with a user, application, service, internal resource, external resource, or the like. A security level value may be associated with an account profile data object by a system administrator, application, or the like based on various factors associated with the employee or user represented by the account profile data object. For example, a security level scale may consist of numerical values from 0 to 10, with 0 being no access, 1 being basic read-only access, and 10 being full administrator access to an application, a respective security level value may correspond at least partially to a role or job title within an organizational hierarchy data structure (defined below), such as a junior engineer may have a security level value of 2 and a chief engineering officer may have a security level value of 8.

Additionally, the security level value may be automatically updated to reflect detected updates to, for example, an account profile data object (e.g., promotion of job title from junior to senior programmer, etc.). Multiple security level values may be associated with, for example, account profile data object based on accessibility relative to particular data objects. For example, an account profile data object (e.g., associated with the director of accounting) may have a security level value of 10 with respect to a finance department collaborative event documentation data structure and a security level value of 0 with respect to a top secret engineering project collaborative event documentation data structure.

Moreover, a prefix or suffix may be associated with a security level value to associate the security level value with a particular position(s) with the organizational hierarchy data structure (e.g., 1° F. may reflect security level value 10 with respect to financial department collaboration pages). The security level value may include, for example, one or more of Internet Protocol (IP) addresses associated with a user's client device, numerical characters, alphabetical characters, alphanumeric codes, American Standard Code for Information Interchange (ASCII) characters, encryption keys, identification certificates, the like, or combinations thereof. The security level value may be a security token (e.g., encrypted pseudo randomly generated password or other security credential) that provides access, display, or the like to one or more data objects.

The term "security level value threshold" refers to a threshold value used to measure the security level value of an associated user, application, service, or the like relative to a permissions configuration protocol or other security infrastructure of a multi-layer service oriented platform. A multi-layer service oriented platform (e.g., application, computing device, etc.) may make determinations and/or execute operations (e.g., transmit, retrieve, record/store, etc.) based on one or more security level values relationships to (e.g., equal to, less than, greater then, within a range of, etc.) a security level value threshold. A security level value threshold may be a value range (e.g., above or below a defined value, percentage, probability, or likelihood). For example, within a particular security level value scale of 0 to 10 access to a particular collaborative event documentation data structure may be approved/granted for all account profile data objects associated with security level values from 3 to 5. Additionally, a negative determination (e.g., access denial, etc.) may be made for all account profile data objects associated with security level values less than 2, and all account profile data objects associated with security level values less equal to 2 may prompt a further review and approval (e.g., based on another permissions configuration protocol, via a truth interface (defined below) output to an administrator via their computing device, etc.).

The term "organizational hierarchy data structure" refers to data structures defining organizational relationships between employees. A organizational hierarchy data structure may define particular status, authority, groupings, positions, job titles, or the like to users (e.g., employees of an organization, exported event participants, etc.). For example, organizational hierarchy data structures may comprise columns and rows of data objects (e.g., account profile data objects associated with user and/or employees, etc.), each column representing a particular department (e.g., accounting, engineering, marketing, etc.) within an organization (e.g., company, etc.) and each row representing an authority level (e.g., junior worker, senior worker, supervisor, assistant manager, general manager, regional director, chief officer, chief executive officer, president, etc.). An organizational hierarchy data structure may be generated for an exported event data object, collaborative event documentation data structure, or the like defining particular roles for the associated exported event (e.g., event organizer, Confluence® page administrator, participant, presenter, etc.).

The term "collaborative event documentation interface" refers to a user interface configured to render, at least partially, a collaborative event documentation data structure to a user via one or more graphical user interface elements.

The term "truth interface" refers to a user interface configured to render information to a user and receive one or more truth selection indications associated with a determination made by the user based on the rendered information. For example, an application executing one or more permissions configuration protocols may determine one or more account profile data objects are associated with a security credential that requires further review (e.g., a security level value within a predefined value range of a threshold value, etc.), the one or more account profile data objects may be displayed to a user (e.g., an administrator, manager, executive officer, security officer, etc.), via the truth interface, as individual graphical interface elements. The user may then click using a mouse or touch interface (i.e., provide an indication input) to select the one or more account profile data objects (i.e., the associated graphical interface elements) to grant or deny access to, for example, a collaborative event documentation data structure or the like. A selection made via a truth interface may be stored as historical data associated with one or more data objects (e.g., account profile data objects, collaborative event documentation data structures, etc.).

Additionally, each data object presented via a truth interface can be associated with a binary set of truth selection indications (e.g., a 'confirm' and 'deny' graphical interface element, etc.). For example, a programmer may confirm a first account profile data object's assignment to a collaborative event documentation data structure and then deny a second account profile data object's assignment to the same collaborative event documentation data structure via a single truth interface. Each data object presented via a truth interface can be associated with a plurality of truth selection indication options (e.g., accept request, deny request, look-up an alternative data object, forward to another user via another truth interface, save for later review, etc.). Each data object may be rendered via a respective truth interface. A truth interface may suggest one or more data objects or determinations (e.g., "Should be denied" based on a permission configuration protocol, etc.).

The term "truth selection indication" refers to an indication input generated by a client device in response to user interaction with a truth interface. The truth selection indication may provide indication or user confirmation of one or more of an acceptance/rejection of a requested determination.

The term "permission interface" refers to a user interface configured to render a restricted usage notification to a user and receive one or more permission selection indications associated therewith. The permission interface may facilitate granting and/or denying access to one or more of a user, application, service, computing device, or the like to one or more of a data object, repository, application, service, computing device, or the like.

The term "permission selection indication" refers to an indication input received via a permission interface.

The term "suggested participant account interface" refers to a truth interface configured to suggest or recommend account profile data objects to a user for association with an exported event. A participant account profile data object may be displayed to a user via a suggested participant account interface based on a relationship to other participant account profile data objects associated with an exported event data object, a collaborative event documentation data structure, or the like. For example, an application (e.g., Confluence®, a calendaring application, etc.) may generate an exported event data object or the like and detect that all of the associated participant account identifiers are associated with a respective participant account profile data object listed in the marketing department of an organizational hierarchy data structure. Based upon such a detection, the application, for example, may generate and output a suggested participant account interface listing one or more suggested participant account identifiers for marketing department employees defined by the organizational hierarchy data structure and not already detected as participant account identifiers of the exported event data object.

The term "suggested participant account selection indication" refers to a truth selection indication generated by a client device in response to user interactions with a suggested participant account interface. A suggested participant account selection indication may comprise a user indication input associated with a participant account identifier not suggested by the suggested participant account interface. For example, a user via their computing device may identify one or more participant account identifiers by typing them via one or more keystrokes or by searching a repository (e.g., associated with an organizational hierarchy data structure or the like).

The term "undefined participant error notification interface" refers to a truth interface configured to display an error notification and/or receive an indication input via a client device. An undefined participant error notification interface may be generated by a multi-layer service oriented platform, or portion thereof (e.g., an application, service, client device, etc.), based on a detection or determination that an exported event participant identifier associated with an exported event data object or exported event data object identifier cannot be cross-referenced to a participant account identifier associated with a participant account profile data object. For example, a user via a client device may receive an undefined participant error notification interface reflecting at least an exported event participant identifier defining an email address that is associated with a calendaring application that generated and transmitted an exported event data object to a collaborative documentation service, the collaborative documentation service being unable to associate the defined email address with a participant account identifier.

Additionally, the undefined participant error notification interface may suggest participant account identifiers and/or exported event participant identifiers based on at least a detected email address. For example, if an exported event participant identifier defines an email address, such as "Typo.Arorr@email.com" then a participant account identifier defining a similar email address of "Typo.Error@email.com" may be suggested via an undefined participant error notification interface. The undefined participant error notification interface may facilitate entry of one or more data object identifiers, or the like, such as via keystrokes. The undefined participant error notification interface may facilitate a look-up function of one or more data object identifiers, or the like, such as via a repository search function.

The term "undefined participant account selection indication" refers to a truth selection indication generated by a client device in response to user interactions with a undefined participant error notification interface.

The term "exported event template" refers to a data object defining a data structure for display, storage, or transmission of a data object. The exported event template may define without limitation the order of data elements, encryption requirements (e.g., particular template fields may be marked as requiring encryption, etc.), template field titles, template field character limits, metadata (e.g., template field metadata tags that describe the data of the field, location tags to provision the automatic population of one or more template fields with data objects from a repository, etc.), event specific formats, or the like. An exported event template may be automatically suggested/recommended to a system user based on one or more indication inputs provided by the system user. For example, a user may provide a meeting description (or similar descriptive inputs) to a collaborative documentation service (or an extrinsic event scheduling service) and based on the indication inputs defining the meeting description, the collaborative documentation service can recommend at least an exported event template to the user. Upon selection of the exported event template, such as via a user indication input, then the collaborative documentation service may automatically populate, at least partially, the exported event template with data elements extracted from the meeting description.

Additionally, non-limiting examples of an exported event template may include a planning exported event template (e.g., for financial budget planning, etc.), a brainstorming exported event template (e.g., for engineering project outset brainstorming, etc.), a team retrospective exported event template (e.g., for annual group end-of-year performance, etc.), a human resources exported event template (e.g., for new hire or employee evaluation meetings, etc.), a celebration exported event template (e.g., for retirement celebrations, etc.), or the like. An exported event template may be dynamically or automatically selected, generated, and/or populated, such as by an application, at least to generate an exported event data object and/or a collaborative event documentation data structure. An exported event template may be determined for an exported event data object and, in response, the same exported event template may be selected to generate a collaborative event documentation data structure associated with the same extrinsic event as the exported event data object. An exported event template determined for a collaborative event documentation data structure may be used to generate a corresponding exported event data object.

The term "suggested exported event template interface" refers to a truth interface configured to suggest or recommend an exported event template to a user for association with a data object. A suggested exported event template interface may be output to a client device in response to generation, receipt, retrieve, or the like, of a data object. For example, a brainstorming exported event template may be suggested to a user via a suggested exported event template interface upon receipt by a client device of an indication input associated with the creation of a collaborative event documentation data structure associated with a word based data element (e.g., "new project," "brainstorming session," etc.).

The term "exported event template selection indication" refers to a truth selection indication generated by a client device in response to user interactions with a suggested exported event template interface. A exported event template selection indication may comprise a user indication input associated with a participant account identifier not suggested by the suggested exported event template interface. For example, a user via their computing device may identify one or more exported event templates via one or more of keystrokes, mouse clicks, by searching a repository, or the like.

The term "exported event notification" refers to a data object defining content for output to a user via a client device. Non-limiting examples of an exported event notification may include one or more of an email message, a text message (e.g., Short Message Service (SMS), Multimedia Messaging Service (MMS), or the like), a recorded message (e.g., a voicemail, etc.), an image, a facsimile, a truth interface, or the like. The exported event notification may include information (e.g., text data elements, word based data elements, etc.) parsed from an exported event data object, a collaborative event documentation data structure, or the like. An exported event notification may be generated dynamically upon the creation of, or detection of a change to, a collaborative event documentation data structure or the like. An exported event notification may be output to a user based on a preferred language associated with an account profile data object attribute (e.g., a user selected display language, a user home geolocation, etc.).

The term "meeting summary" refers to a description detailing an extrinsic event. The meeting summary may be automatically generated and applied to a collaborative event documentation data structure (e.g., as a meeting summary data object). For example, upon detection of a termination of an extrinsic event (e.g., detection of an end time associated with the exported event data object, receipt of a user indication, etc.), a collaborative event documentation data structure may be parsed and processed via a machine learning pipeline configured with one or more machine learning models to generate a meeting summary and update the collaborative event documentation data structure with the meeting summary. The meeting summary may be generated based on notes from a timekeeper or secretary, meeting minutes, a transcript of the extrinsic event (e.g., transcribed from an audio/video recording associated with the extrinsic event, etc.), forum style posted to the collaborative event documentation data structure, or the like. The meeting summary may be added to the collaborative event documentation data structure after generation to provide an overview of the associated extrinsic event to system users (e.g., via a graphical user interface element, see for example extrinsic event consolidation exported event description interface element 916 described below with respect to FIG. 9).

Additionally, the meeting summary may be generated based on administrator defined settings, for example, a 250 word limit, a 1000 character limit, data elements of the collaborative event documentation data structure associated with a particular permissions configuration protocol (e.g., publicly accessible data elements only), or the like. The meeting summary may be automatically generated or initiated based on a user indication input. The meeting summary may be automatically applied to a collaborative event documentation data structure or may be posted upon a user's review and approval (e.g., approval provided via a user indication input, etc.). A meeting summary, or a text data element (as defined above), may be processed, such as via a machine learning pipeline, to determine a security level for a collaborative event documentation data structure, or data objects, based on a level of sensitivity associated with the meeting summary contents (e.g., if the meeting summary describes personal information, non-publicly accessible information, or provides an indication thereof with the collaborative event documentation data structure or data object then the permission requirements to access the collaborative event documentation data structure or data object may be increased according to a permissions configuration protocol).

The term "refresh command" refers to a input which is configured to cause one or more services, applications, portions of computer program code, the like, or combinations thereof executed by, or run on, a computing device to re-run at least a portion of their program code. Additionally, the refresh command may be received by one or more computing devices via a communication interface, a user interface, application programming interface, the like, or combinations thereof. Additionally, the refresh command may be executed as a portion of computer program code in conjunction with a countdown timer such that the refresh command is automatically executed at least once. Additionally, the countdown timer portion of the computer program code may automatically reset after each iteration such that the refresh command is executed periodically. For example, a first application may be configured to dynamically and/or periodically fetch data objects associated with one or more second applications and/or services based on a push message or a pull notification. In some embodiments, a push/pull message may comprise data objects taken from (e.g., generated by, transmitted by, received from, etc.) one or more applications and/or services.

The term "collaborative documentation service mapping protocol" refers to a data object that defines one or more instructions for translation and/or transmission of data objects between APIs. A collaborative documentation service mapping protocol may define one or more of a point of origination (e.g., an application, service, and/or computing device that generated the data object, etc.), a point of termination (e.g., an application, service, and/or computing device targeted for receipt of the data object, etc.), an intermediary point (e.g., system plug-in, application, service, and/or computing device that at least temporarily stored the data object during transmission, etc.), and/or one or more APIs associated with any point or node within a communication network. The collaborative documentation service mapping protocol may define a respective function, call, request, and/or the like associated with a first API and a respective associated function, call, request, and/or the like associated with a second API.

Thus, use of any such terms, as defined herein, should not be taken to limit the spirit and scope of embodiments of the present disclosure.

Example System Architecture

Methods, apparatuses, and computer program products of the present disclosure may be embodied by any of a variety of devices or combinations thereof. For example, the method, apparatus, and computer program product of an example embodiment may be embodied by a networked device (e.g., an enterprise platform, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

FIG. 1 illustrates an example system architecture 100 within which embodiments of the present disclosure may operate. The example system architecture 100 includes a extrinsic event consolidation system 105 configured to interact with one or more client devices, such as client device 102A, client device 102B, and/or client device 102C. The extrinsic event consolidation system 105 may be configured to receive data objects and/or indication inputs from one or more sources (e.g., an application, service, computing device, etc.) or requests for data objects from one or more computing devices (e.g., client device 102A, application server 108, etc.). The extrinsic event consolidation system 105 may be configured to store or retrieve data objects comprising a data object identifier in association with a data object repository (e.g., data object repository 107, etc.). The extrinsic event consolidation system 105 may process the requests for data objects directly from a client device and associated interface, or by way of an intermediary application or service, to generate, retrieve, modify, and/or transmit one or more of a collaborative event documentation data structure, a user/machine interface (e.g., a truth interface, or other interface as described herein), a suggestion or prediction to a system user, an alerts or notifications to a system user, or an exported event data object.

The extrinsic event consolidation system 105 may be communicably connected to one or more applications, services, servers, computing devices, or remote repositories either directly or indirectly. For example, extrinsic event consolidation system 105 may be hosted on a computing device (e.g., extrinsic event consolidation server 106) which further includes or can at least access data object repository 107, as shown in FIG. 1. The extrinsic event consolidation server 106 may comprise one or more data object repositories (e.g., data object repository 107, or other repositories described herein). The extrinsic event consolidation server 106 may be a plurality of servers or other types of computing devices in communication via a local network or intranet such that they are internal resource relatives to each other.

Additionally, the extrinsic event consolidation server 106 may be a plurality of servers in communication via network 104 such that they are external resources relative to each other. The data object repository 107 may be hosted on a separate server and accessible to the extrinsic event consolidation server 106 and/or extrinsic event consolidation system 105 via a connection facilitated by network 104 (e.g., a local area network, virtual private network, the Internet, etc.). Moreover, the extrinsic event consolidation system 105 may transmit or receive data objects, and other communication or interaction inputs, from an application server 108 or from a service server 110. The application server 108 and/or the service server 110 may be associated with one or more applications or services (e.g., team collaboration system, cloud storage software, email service, audio/video conferencing service, or other applications and services as described herein) for which the extrinsic event consolidation system 105 is specifically configured to provide streamlined inter/intra-system data object transmission operations. The extrinsic event consolidation system 105 may be, at least partially, hosted on application server 108 and/or service server 110. As illustrated, application server 108 and/or service server 110 may each comprise one or more servers and/or other computing devices in communication via network 104 (e.g., a local network, intranet, Internet, or other type of communication network as one skilled in the art would find convenient in light of the present disclosure).

The extrinsic event consolidation system 105 may be, at least partially, integrated into an application or a service (e.g., such as via a plug-in, extension, and/or add-on software configured into the application or service compiled code base) and configured with at least a machine learning model trained for data objects pertinent to the particular application or service. Further, the extrinsic event consolidation system 105 may be configured with at least a collaborative documentation service mapping protocol to facilitate translation/transmission of data objects between the respective integrated application or service and at least another application or service (e.g., an external resource, extrinsic event scheduling service, collaborative documentation service, or the like).

For example, an extrinsic event scheduling service comprising, at least in part, the extrinsic event consolidation system 105 may comprise a collaborative documentation service mapping protocol configured to facilitate generating an exported event data object based on a collaborative event documentation data structure utilized by one or more other extrinsic event scheduling service and/or collaborative documentation service. The extrinsic event consolidation system 105 may further comprise a machine learning model that, through machine learning natural language processing operations, has been trained to recognize patterns (e.g., recurring times for particular meeting types, common participants between events, language used for discussing the extrinsic event, etc.) within the collaborative event documentation data structure to automatically generate an extrinsic event summary for participants that is automatically included in notifications to participants (e.g., emails, text messages, etc.). The extrinsic event consolidation system 105 may further provide predictions (e.g., which exported event template to select, etc.) or suggestions (e.g., which language to use to generate/transmit the exported event data object) via a user interface to a user.

For example, the extrinsic event consolidation system 105 may receive, via an indication input from a client device, a data object identifying a reoccurring extrinsic event and an associated meeting description. Upon receipt, and based on at least, the received data object, the extrinsic event consolidation system 105 may automatically process the meeting description for data elements and then generate a plurality of collaborative event documentation data structures and/or exported event data objects (e.g., for use with one or more applications and/or services as described herein) reflecting the reoccurring extrinsic event. The extrinsic event consolidation system 105 may suggest to a user via one or more interfaces a number of reoccurrences, based on historical data (e.g., similar past events) that a user may increase or decrease via one or more indication inputs, when generating the plurality of collaborative event documentation data structures and/or exported event data objects.

The extrinsic event consolidation system 105 may be configured to merge a plurality of exported event data objects into a collaborative event documentation data structure. For example, an extrinsic event scheduling service (as described herein) may generate a plurality of exported event data objects, each associated with a meeting of a series of reoccurring meetings. The extrinsic event consolidation system 105 may ingest the plurality of exported event data objects, identify that each data object is associated with the same reoccurring group of meetings, and automatically group the data objects under a collaborative event documentation data structure associated with a collaboration documentation service (as described herein). Further, as one or more users provide meeting notes to the extrinsic event scheduling service for each scheduled extrinsic event, the extrinsic event consolidation system 105 may automatically ingest and transmit these notes to the associated collaborative event documentation data structure.

Moreover, if meeting notes are entered into the collaborative event documentation data structure in association with one or more of the reoccurring meetings, the collaboration documentation service may transmit associated data objects to the extrinsic event scheduling service via at least the extrinsic event consolidation system 105. Upon detection that a respective extrinsic event has expired, passed a predefined time period, and/or any associated data objects have not been view by or received an indication input from one or more users during an elapsed time period, the extrinsic event consolidation system 105 or the like (e.g., extrinsic event scheduling service, collaboration documentation service, or another service) may automatically archive the respective extrinsic event (i.e., one or more scheduling service data objects, collaborative event documentation data structures, or the like associated with the respective extrinsic event).

For example, a collaboration documentation service may be configured, such as by a system administrator, to automatically archive collaborative event documentation data structures after 12 months (or any time period defined by the system administrator). A user may be provided a notification or interface indicating that a collaborative event documentation data structure will be archived automatically, or pending receipt of an indication input from the user. Data objects, and/or respective data elements, of a collaborative event documentation data structure may be similarly archived based on one or more similar trigger conditions as discussed above or as described elsewhere herein. Archived data objects and/or collaborative event documentation data structures may be stored in a repository and/or partition (e.g., via backup service, etc.) to allocate memory to more recently generated and/or modified data objects. Archived data objects may be protected to preserve the historical data therein from future manipulation or retroactive changes, such as by encryption, read-only access, and/or the like.

The extrinsic event consolidation system 105 may be, at least partially, hosted on extrinsic event consolidation server 106 (e.g., portions of the extrinsic event consolidation system 105 not regularly required or accessed by a locally hosted version of the extrinsic event consolidation system 105) and accessible to the application server 108 and/or service server 110 (e.g., including at least their locally hosted version, plug-in, extension, or add-on of extrinsic event consolidation system 105) via a connection facilitated by network 104. For example, a particular extrinsic event scheduling service may regularly generate and transmit exported event data objects to a particular collaborative documentation service and therefore may only retain that respective collaborative documentation service mapping protocol locally.

Additionally, upon detection of another target collaborative documentation service, the extrinsic event scheduling service may request the necessary collaborative documentation service mapping protocol from the extrinsic event consolidation server 106 via at least network 104. Further, the extrinsic event scheduling service may suggest (e.g., via an interface) that a respective system user request (e.g., from the extrinsic event consolidation server 106) the necessary collaborative documentation service mapping protocol for future use with the local version of extrinsic event consolidation system 105. The extrinsic event consolidation system 105 may automatically request and/or retrieve one or more collaborative documentation service mapping protocols, or the like (e.g., data objects stored in data object repository 107, exported event templates, machine learning models, and/or other types of instructions for execution in conjunction with the extrinsic event consolidation system 105), based on detection of a trigger condition (e.g., requesting/retrieving the same data object, or the like, from the extrinsic event consolidation server 106 a predefined number of times).

The extrinsic event consolidation system 105, or another network entity (e.g., client device 102B, application server 108, etc.) may be configured to detect the current geolocation of one or more computing devices, data objects (e.g., the hosting device, etc.), system users (e.g., event participants, etc.), or the like. A computing device may transmit or receive location data via geolocation identifying data objects either as independent data objects or as an element within another data object (e.g., the data object requested from a service or generated by a user via a client device, etc.). The geolocation identifying data objects may be requested and/or used to suggest one or more of a date, time, language, or the like to a user (e.g., an extrinsic event organizer) when providing user indication inputs to generate data objects associated with a particular extrinsic event via a user interface.

Moreover, geolocation identifying data objects may be requested from and provided by a client device when accessing the extrinsic event consolidation system 105, or an extrinsic event therethrough (e.g., accessing a link to a web-based audio/video conferencing tool via the extrinsic event consolidation system 105), in order to regulate security. For example, if an unauthorized individual gains access to a participant account identifier that is authorized to access an extrinsic event the unauthorized individual's client device may be blocked from accessing the extrinsic event with the authorized participant account identifier because the geolocation identifying data object provided does not match the authorized participant account identifier or the geolocation identifying data object provided is outside of a particular geographic region (e.g., the geolocation identifying data object indicates the unauthorized individual's client device is in a blacklisted country or region).

The extrinsic event consolidation system 105 may communicate with the client device 102A, client device 102B, client device 102C, or other network entities (e.g., computing devices, servers, etc.), using a network 104. The network 104 may include any wired or wireless communication network including, for example, a wired or wireless local area network (LAN), personal area network (PAN), metropolitan area network (MAN), wide area network (WAN), the like, or combinations thereof, as well as any hardware, software and/or firmware required to implement the network 104 (e.g., network routers, switches, etc.). For example, the network 104 may include a cellular telephone, an 802.11, 802.16, 802.20, and/or WiMAX network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. In some embodiments, the protocol is a custom protocol of JavaScript Object Notation (JSON) objects sent via a WebSocket channel. The network 104 may include a global positioning system network comprising one or more of a satellite, antenna, dish, tower, base station, or the like.

The extrinsic event consolidation system 105 may include an extrinsic event consolidation server 106 and a data object repository 107. The extrinsic event consolidation server 106 may be configured to generate, detect, determine, retrieve, output, transmit, and/or receive one or more of a data object, data element, value metric (e.g., security level value, etc.), threshold metric (e.g., security level value threshold, etc.), amount of commonality (e.g., between two data objects, between application programming interfaces, a common data element set, etc.), template (e.g., exported event templates, etc.), indication input, user interface (e.g., a graphical user interface, sounds, vibrations, etc.), or the like.

The extrinsic event consolidation server 106 may be configured to generate automatic and dynamic push notification user interfaces (e.g., truth interfaces, permission interfaces, etc.) for one or more computing devices based on one or more data object attributes (e.g., date elements, associated identifiers as defined herein, etc.) comprising information related to the particular data object and the one or more set criteria which may be predefined by one or more computing devices (e.g., client device associated with a system administrator and/or extrinsic event organizer, etc.).

The data object repository 107 may store data associated with one or more data objects associated with the extrinsic event consolidation system 105. For example, the data object repository 107 may store data associated with one or more data objects, data object identifiers, the like, or combinations thereof. The data object repository 107 may include one or more storage units, such as multiple distributed storage units that are connected through a computer network. Each storage unit in the data object repository 107 may store at least one of one or more data assets (e.g., data objects and any data associated therewith) and/or one or more data elements associated with the computed properties of one or more data assets (e.g., metadata, time, date, locations, etc.). Moreover, each storage unit in the data object repository 107 may include one or more non-volatile storage or memory media including but not limited to hard disks, ROM, PROM, EPROM, EEPROM, flash memory, MMCs, SD memory cards, memory sticks, CBRAM, PRAM, FeRAM, NVRAM, MRAM, RRAM, SONOS, FJG RAM, Millipede memory, racetrack memory, the like, or combinations thereof.

The extrinsic event consolidation server 106 may be embodied by one or more computing systems, such as apparatus 200 shown in FIG. 2. The apparatus 200 may include processor 202, memory 204, input/output circuitry 206, communications circuitry 208, extrinsic event consolidation circuitry 210, and data object retrieval circuitry 212. The apparatus 200 may be configured to execute the operations described herein. Although these components (e.g., processor 202, memory 204, etc.) are described with respect to functional limitations, it should be understood that the particular implementations necessarily include the use of particular hardware, software, and/or firmware. It should also be understood that certain of these components (e.g., processor 202, memory 204, etc.) may include similar or common hardware. For example, two or more sets of circuitry may both leverage use of the same processor, network interface, storage medium, video card, motherboard, or the like to perform their associated functions, such that duplicate hardware is not required for each individual set of circuitry.

The processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently.

The processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

The processor 202 may be configured to execute instructions stored in the memory 204 or otherwise accessible to the processor 202. The processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, an accessible repository, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The extrinsic event consolidation circuitry 210 may be any means such as a device or circuitry embodied in either hardware or a combination of hardware and software that is configured to receive an exported event data object ingestion request and identify data objects associated therewith and/or associated with one or more services, applications, client devices, or the like, each represented by their own respective data object identifier. The extrinsic event consolidation circuitry 210 may be configured to determine/identify one or more of a data element, exported event template, extrinsic event scheduling service, collaborative documentation service, exported event data object identifier, origin user identifier, target user identifier, exported event description text element, time data element, date data element, exported event participant identifier, security level value/threshold, or the like. The extrinsic event consolidation circuitry 210 may make such determination/identifications based on one or more of a exported event data object (e.g., received from another computing device), collaborative event documentation data structure, collaborative event documentation interface inputs received via a user interface, or similar data objects and/or indication inputs as described herein.

The extrinsic event consolidation circuitry 210 may be configured to determine one or more of data elements, attributes, or metrics as described herein associated with a data object and/or indication input as described herein. For example, the extrinsic event consolidation circuitry 210 may determine an email address associated with a participant account profile data object that was detected from an exported event data object retrieved, by the data object retrieval circuitry 212 from the data object repository 107. The extrinsic event consolidation circuitry 210 may be configured to generate one or more data objects, data structures, user interfaces (e.g., truth interfaces, permission interfaces, etc.), the like, or combinations thereof. The extrinsic event consolidation circuitry 210 may be configured to generate automatic and dynamic push notification user interfaces (e.g., truth interfaces, permission interfaces, etc.) for one or more computing devices based on one or more data object attributes comprising information related to the particular data object and the one or more set criteria which may be predefined by one or more computing devices (e.g., client device associated with a system administrator, etc.). To obtain (e.g., request, retrieve, access, etc.) data objects, or associated data (e.g., identifiers, etc.) from one or more computing devices associated with one or more users, services, and/or applications, the extrinsic event consolidation circuitry 210 may utilize the communications circuitry 208 to transmit application programming interface (API) calls to one or more API servers associated with the noted computing devices (e.g., via network 104).

The data object retrieval circuitry 212 may be any means such as a device or circuitry embodied in either hardware or a combination of hardware and software that is configured to generate data object requests, data object ingestion request (e.g., retrieve and process a data object), or data object retrieval requests (e.g., retrieval from a data object repository or data stream). The data object retrieval circuitry 212 may be configured to ping (e.g., transmit an interaction input to) one or more computing devices associated with one or more users, applications, and/or services, such as via an internet control message protocol, to receive information related to one or more of a data object, user, application, service, computing device, or the like (e.g., extrinsic event data, collaborative event documentation data structure, geolocation data, APIs, IP addresses, security credentials, encryption keys, etc.). In some embodiments the data object retrieval circuitry 212 is configured to store received information in the data object repository 107 or the like.

It is also noted that all or some of the information discussed herein can be based on data that is received, generated, and/or maintained (e.g., monitored by, stored in, transformed by, etc.) by one or more components of apparatus 200. In some embodiments, one or more external systems (e.g., a remote cloud computing and/or data storage system) may also be leveraged to provide, at least partially some of, the functionality discussed herein.

Referring now to FIG. 3, the client devices (e.g., client device 102A, client device 102B, client device 102C, etc.), application server 108, and service server 110, or the like, may be embodied by one or more computing systems, such as apparatus 300 shown in FIG. 3. The apparatus 300 may include processor 302, memory 304, input/output circuitry 306, communications circuitry 308, and geolocation circuitry 310. Although these components (e.g., processor 302, memory 304, etc.) are described with respect to functional limitations, it should be understood that the particular implementations necessarily include the use of particular hardware, software, and/or firmware. It should also be understood that certain of these components (e.g., processor 302, memory 304, etc.) may include similar or common hardware. For example, multiple sets of circuitry may both leverage use of the same processor, network interface, storage medium, or the like to perform their associated functions, such that duplicate hardware is not required for each set of circuitry. Apparatus 300 may also be configured to leverage, at least partially, one or more hardware components described above with respect to apparatus 200. For example, apparatus 300 may further comprise one or more of processor 202, memory 204, or any other hardware components attributed to apparatus 200.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, services, or the like for enabling the apparatus 300 to carry out various functions in accordance with example embodiments of the present disclosure.

The processor 302 may be embodied in a number of different ways and may, for example, include one or more processing devices configured to perform independently. The processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

The processor 302 may be configured to execute instructions stored in the memory 304 or otherwise accessible to the processor 302. The processor 302 may be configured to execute hard-coded functionalities. As such, whether configured by hardware or software methods, or by a combination thereof, the processor 302 may represent an entity (e.g., physically embodied in circuitry, etc.) capable of performing operations according to an embodiment of the present disclosure while configured accordingly. Alternatively, as another example, when the processor 302 is embodied as an executor of software instructions (e.g., computer program instructions, etc.), the instructions may specifically configure the processor 302 to perform the algorithms and/or operations described herein when the instructions are executed.

The apparatus 300 may include input/output circuitry 306 that may, in turn, be in communication with processor 302 to provide output to the user and, in some embodiments, to receive an indication input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, a camera, and/or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, universal serial bus (USB) ports, and supporting hardware and/or software, or any other device suitable for enabling communications between a plurality of computing devices (e.g., a network). Additionally or alternatively, the communications circuitry 308 may include the circuitry for interacting with the antenna/antennae to cause transmission of signals via the antenna/antennae or to handle receipt of signals received via the antenna/antennae. In some embodiments, the antenna/antennae may be, at least partially, replaced by a wired connection comprising a plurality of cables, wires, or circuitry pathways defining a physical connection between a plurality of computing devices.

The geolocation circuitry 310 may be any means such as a device or circuitry embodied in either hardware or a combination of hardware and software that is configured to report a current geolocation of the apparatus 300. In some embodiments, the geolocation circuitry 310 may be configured to communicate with a satellite-based radio-navigation system such as the global position satellite (GPS), similar global navigation satellite systems (GNSS), or combinations thereof, via one or more transmitters, receivers, the like, or combinations thereof. The geolocation circuitry 310 may be configured to infer an indoor geolocation and/or a substructure geolocation of the apparatus 300 using signal acquisition and tracking and navigation data decoding, where the signal acquisition and tracking and the navigation data decoding is performed using GPS signals and/or communication signals (e.g., cellular signals, 4G LTE, 5G, etc.) that may be used to infer a position relative to one or more network access nodes (e.g., cell, antenna, signal extender, etc.) either indoors or outdoors. Other examples of geolocation determination include Wi-Fi triangulation and ultra-wideband radio technology.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein. In some embodiments, a plurality of computing devices (e.g., apparatus 300, 200, or the like) may be interconnected to provide at least some of the functionality discussed herein.

Additional Example System Architecture Configurations

FIG. 4 illustrates an example system architecture 400 within which embodiments of the present disclosure may operate. The example system architecture 400 may include one or more components and/or configurations as described above with respect to example system architecture 100. The example system architecture 400 includes a extrinsic event consolidation system 105 configured to facilitate data object transmission and receipt between extrinsic event scheduling service 402 and collaborative documentation service 408. The example system architecture 400 may facilitate receipt and/or transmission of data objects or indication inputs between extrinsic event scheduling service 402, extrinsic event consolidation system 105, collaborative documentation service 408, and one or more of client device 102A, client device 102B, and/or client device 102C. For example, extrinsic event consolidation system 105 may receive a data object ingestion request from client device 102A and in response the extrinsic event consolidation system 105 may request or retrieve at least a, exported event data object from extrinsic event scheduling service 402 in order to generate and transmit a collaborative event documentation data structure, or the like (e.g., collaborative event documentation interface, etc.), to the collaborative documentation service 408. The collaborative documentation service 408 can use the collaborative event documentation data structure to output a collaborative event documentation interface to one or more client devices.

The extrinsic event scheduling service 402 may be communicably connected to one or more applications, services, servers, computing devices, or remote repositories either directly or indirectly (e.g., via network 104 or the like). For example, extrinsic event scheduling service 402 may be hosted on a computing device as depicted by a extrinsic event scheduling service server 404 which further includes or can at least access data object repository 107A. The extrinsic event scheduling service server 404 may comprise one or more data object repositories (e.g., data object repository 107A, or other repositories described herein). The extrinsic event scheduling service server 404 may be configured in accordance with one or more hardware configurations such as those discussed herein with respect to apparatus 200 and/or apparatus 300.

The extrinsic event scheduling service 402 may provide one or more user interfaces via a client device (e.g., client device 102A) for the purpose of scheduling extrinsic events and providing (e.g., generating, transmitting, outputting, etc.) exported event data objects based on the extrinsic events data input by a user associated with the client device. For example, a user via client device 102A may transmit one or more indication inputs to the extrinsic event scheduling service 402 to define at least a text data element, a time data element, a date data element, and a participant account identifier, the user may then transmit at least another indication input to provide an exported event data object to the collaborative documentation service 408 via at least extrinsic event consolidation system 105.

The collaborative documentation service 408 may be communicably connected to one or more applications, services, servers, computing devices, or remote repositories either directly or indirectly (e.g., via network 104 or the like). For example, collaborative documentation service 408 may be hosted on a computing device as depicted by a collaborative documentation service server 410 which further includes or can at least access data object repository 107B. The collaborative documentation service server 410 may comprise one or more data object repositories as described herein. The collaborative documentation service server 410 may be configured in accordance with one or more hardware configurations such as those discussed herein with respect to apparatus 200 and/or apparatus 300. Additionally, data object repository 107A and/or data object repository 107B may be configured in accordance with one or more hardware configurations such as those discussed herein with respect to data object repository 107.

The collaborative documentation service 408 may provide one or more user interfaces via a client device (e.g., client device 102B, client device 102C) for the purpose of recording information related to the extrinsic event associated with a collaborative event documentation data structure. The collaborative event documentation data structure may be generated via at least indication inputs provided by (e.g., received from) the client devices. The collaborative event documentation data structure may be generated from data received or retrieved via at least the extrinsic event consolidation system 105 (e.g., from processed, parsed, vectorized, standardized, or the like exported event data objects). The collaborative documentation service 408, extrinsic event scheduling service 402, and/or extrinsic event consolidation system 105 may at least partially be configured as an application hosted on one or more client devices.

FIG. 5 illustrates an example system architecture 500 within which embodiments of the present disclosure may operate. The example system architecture 500 may include one or more components and/or configurations as described above with respect to example system architecture 100 and/or example system architecture 400. The example system architecture 500 includes a extrinsic event consolidation system 105 configured to receive and/or transmit data objects between an extrinsic event scheduling service 402 and a collaborative documentation service 408. The extrinsic event consolidation system 105 may further receive data objects from and/or transmit data objects to an audio video conferencing service 502. For example, the extrinsic event consolidation system 105 may receive an exported event data object from the extrinsic event scheduling service 402 and, upon processing the exported event data object (e.g., via a machine learning pipeline or other predefined operations as described herein), the extrinsic event consolidation system 105 may request an audio video conferencing event be created via the audio video conferencing service 502.

Additionally, the creation of the audio video conferencing event via the audio video conferencing service 502 may comprise generating a communication channel via network 104 at a predefined date and time while also providing a data object to the extrinsic event consolidation system 105 that defines at least a token (e.g., URL, hyperlink, security credential, etc.) for accessing the communication channel (e.g., by one or more users via a client device) during the predefined date and time or substantially thereabout. The data object provided to the extrinsic event consolidation system 105 may comprise instructions that automatically generate the communication channel on-demand outside of the predefined date and time based on one or more user indication inputs provided via a client device (e.g., to the extrinsic event scheduling service 402, the collaborative documentation service 408, or the like).

Moreover, the extrinsic event scheduling service 402 and/or the collaborative documentation service 408 may request, receive, and/or transmit data objects from/to the audio video conferencing service 502. For example, the extrinsic event scheduling service 402 may transmit a data object to the audio video conferencing service 502 requesting a communication channel. Upon receipt of the data object associated with the communication channel the extrinsic event scheduling service 402 may provide this data object to the extrinsic event consolidation system 105 via the exported event data object. The collaborative documentation service 408 may request a communication channel data object from the audio video conferencing service 502 upon receipt of a collaborative event documentation data structure from the extrinsic event consolidation system 105 or in response to indication inputs provided by a user in association with an internally generated collaborative event documentation data structure.

As an extrinsic event, or a data object associated therewith, is modified (e.g., a time data element is changed, the extrinsic event is canceled, etc.) one or more of the extrinsic event scheduling service 402, the collaborative documentation service 408, or the extrinsic event consolidation system 105 may transmit an updated data object (e.g., requesting the communication channel data object be modified accordingly, requesting the communication channel data object be deleted, etc.) to the audio video conferencing service 502. The audio video conferencing service 502 may include an audio video conferencing service server (not shown) that is configured in accordance with one or more of apparatus 200, apparatus 300, service server 110, or the like (e.g., the extrinsic event scheduling service server 404, the collaborative documentation service server 410, etc.).

The extrinsic event consolidation system 105 may associate (e.g., link, connect, interface, identify, etc.) one or more data objects associated with the extrinsic event scheduling service 402 with one or more data objects associated with the collaborative documentation service 408. For example, a plurality of extrinsic event scheduling data objects (e.g., associated with one or more extrinsic event scheduling services) may be linked to one or more collaborative event documentation data structures (e.g., associated with one or more collaborative documentation services). The extrinsic event consolidation system 105 may associate (e.g., link, connect, interface, identify, etc.) one or more data objects associated with the extrinsic event scheduling service 402 with one or more data objects associated with another extrinsic event scheduling service. For example, a first calendar event in Google Calendar® may be linked to a second calendar event in Team Calendars in Confluence® and a third calendar event in Calendly® via at least the extrinsic event consolidation system 105, such that an update (e.g., change, modification, cancelation, etc.) to a respective calendar event in one system will apply the same update to the other two systems. Further, each of the calendar events (e.g., first, second, third) reflect the same extrinsic event and may be further linked to a Confluence® page, such that an update (e.g., change, modification, cancelation, etc.) to the Confluence® page will further update the three calendaring applications.

The extrinsic event consolidation system 105 may facilitate communications (e.g., transfer data objects, etc.) between one or more extrinsic event scheduling services and/or one or more collaborative documentation services. The extrinsic event consolidation system 105 may communicably couple a plurality of extrinsic event scheduling services, such as Google Calendar®, Calendly®, Team Calendar in Confluence®, Clockwise®, Reclaim.ai, X.ai, or the like. For example, Clockwise®, via at least the extrinsic event consolidation system 105, may transmit a data object comprising meeting notes (as discussed above) to Team Calendar in Confluence®. The extrinsic event consolidation system 105 may transmit a data object comprising meeting notes from Clockwise® and/or Team Calendar (or the like) to an associated Confluence® page. Additionally, Clockwise®, or the like, may generate a Confluence® page directly from an exported event data object (e.g., comprising meeting notes, etc.), via the extrinsic event consolidation system 105 (see for example the extrinsic event consolidation system workflow 700 described below with respect to FIG. 7).

FIG. 6 illustrates an example system architecture 600 within which embodiments of the present disclosure may operate. The example system architecture 600 may include one or more components and/or configurations as described above with respect to one or more of example system architecture 100, example system architecture 400, or example system architecture 500. The example system architecture 400 includes a extrinsic event consolidation system 105 configured as locally hosted versions. The extrinsic event consolidation system 105A is locally hosted via the extrinsic event scheduling service server 404 of the extrinsic event scheduling service 402.

Additionally, the extrinsic event consolidation system 105B is locally hosted via the collaborative documentation service server 410 of the collaborative documentation service 408. The extrinsic event consolidation system 105A and/or the extrinsic event consolidation system 105B may be configured as extensions, add-ons or plug-ins of their respective host service's compiled code base. The extrinsic event scheduling service 402 and/or the collaborative documentation service 408 may be further communicably connected (e.g., via network 104, etc.) to an extrinsic event consolidation server 106 that may be configured to update, instruct, or provide additional functionality (e.g., provide additional collaborative documentation service mapping protocols or other data objects stored via data object repository 107) to the locally hosted versions of the extrinsic event consolidation system 105.

Exemplary Service Configuration Details

FIG. 7 is a flowchart of an extrinsic event consolidation system workflow 700 in accordance with at least some embodiments of the present disclosure. The extrinsic event consolidation system workflow 700 depicts an example embodiment of exported event data object transmission between an extrinsic event scheduling service 402 and a collaborative documentation service 408 via the extrinsic event consolidation system 105. The extrinsic event consolidation system workflow 700 as shown begins at client device 102A, or similar computing device as discussed above. The client device is transmitted a user interface via at least the extrinsic event scheduling service 402. The user interface output by the extrinsic event scheduling service 402 may provide graphical user interface elements such as described below with respect to at least FIG. 8. The user of client device 102A provides one or more indication inputs defining at least an exported event data object ingestion request 702 via the user interface output by the extrinsic event scheduling service 402. In response to at least the exported event data object ingestion request 702, the extrinsic event scheduling service 402 transmits an exported event data object to the extrinsic event consolidation system 105.

The extrinsic event consolidation system 105 may be configured as described above with respect to one or more of the example system architectures (e.g., example system architecture 100, example system architecture 600, etc.).

The exported event data object is received by the extrinsic event consolidation system 105 and the exported event data object is processed via a data ingestion module 704. The data ingestion module 704 may comprise one or more processes such as scanning for viruses, confirming credentials, storing the exported event data object (e.g., to a repository), accessing/reading the exported event data object, determining the associated data structure, determining an associated API, determining one or more data elements of the exported event data object, or other processes/operations as described herein. After the exported event data object is processed via data ingestion module 704 the exported event data object may be sent to a machine learning pipeline 703.

The machine learning pipeline 703 may execute one or more processes such as data parsing 706, data element extraction (e.g., identifier extraction 708, event detail extraction 710), inputting the extracted data elements into a machine learning model 712, and generating, via the machine learning model 712, a data object. For example, via the event detail extraction 710 a title, or other details of the extrinsic event described above (e.g., a name or title, a summary of the event, meeting minutes, presentation titles, presenters, attendees, organizers, event notes, etc.), may be parsed and/or process to determine a position/location within a hierarchy of dynamic spaces of a page tree data structure for the one or more generated data objects. The data object generated by the machine learning model 712 may comprise one or more of an output data object (e.g., for use in generating the collaborative event documentation data structure), a suggestion data object (e.g., for use in generating a suggested participant account interface, and/or a suggested exported event template interface, or a similar user interface as discussed herein). The one or more data objects generated by the machine learning model 712 may be compiled into a single data object and/or stored to data object repository 107, or the like, via process(es) of output/suggestion compilation 714. The machine learning model 712 may utilize a collaborative documentation service mapping protocol, natural language processing techniques, or any other technique or method herein to process the ingested exported event data object.

The machine learning pipeline 703 may maintain a training data set for training one or more machine learning models (e.g., machine learning models configured to process specific types of data or to function with specific applications/services). The machine learning pipeline 703 may archive data objects to data object repository 107 (e.g., to generate a backup copy prior to and/or after processing, between iterative cycles, etc.). The machine learning pipeline 703, upon detection of a recurring extrinsic event based on at least the ingested data, may generated a plurality of output data objects, or the like (as discussed above), by iteratively processing the ingested data object. Each data object of the plurality of output data objects, or the like, may be associated with a respective instance of the recurring extrinsic event.

The collaborative event documentation data structure generation module 716 receives/retrieves the data object output by the machine learning pipeline 703 and outputs a user interface to the client device 102A. The user interface may comprise one or more of a suggested participant account interface and/or a suggested exported event template interface as applicable based on the data object output by the machine learning pipeline 703. The user interface may also require at least one indication input from the client device 102A to confirm that the data extrapolated from the exported event data object (e.g., titles, participants, a position/location within at least a hierarchy of dynamic spaces, and/or other extrinsic event details as described herein) reflects the associated extrinsic event accurately and/or sufficiently for the user. The user review output/suggestion module 718 may be configured to generate and transmit the user interface to client device 102A and in response receive and/or request one or more corresponding indication inputs (e.g., suggested participant account selection indication, exported event template selection indication, or the like).

Additionally, the user review output/suggestion module 718, upon receipt of the one or more indication inputs, may cause the collaborative event documentation data structure generation module 716 to generate a collaborative event documentation data structure from the data object output by the machine learning pipeline 703. The user review output/suggestion module 718 may also cause the machine learning pipeline 703 to perform one or more secondary processes (e.g., re-process the ingested exported event data object with another machine learning model) if the user provides an indication input defining a negative result associated with the data object output by the machine learning pipeline 703. Moreover, the user may cancel the current data object output by the machine learning pipeline 703 and may further repeat the exported event data object ingestion request 702 at the extrinsic event scheduling service 402 with additional or updated data.

The collaborative event documentation data structure generation module 716 generates and then stores the collaborative event documentation data structure at the data object repository 107 upon positive confirmation from the user review output/suggestion module 718. The collaborative event documentation data structure generation module 716 may also access and retrieve one or more data objects (e.g., exported event templates, data object identifiers, or any other data objects required) from the data object repository 107 to generate the collaborative event documentation data structure comprising at least a collaborative event documentation interface. The collaborative event documentation data structure retrieval module 720 then retrieves the generated collaborative event documentation data structure from the data object repository 107 for transmission by the collaborative event documentation interface transmission module 722. The collaborative event documentation interface transmission module 722 then transmits the collaborative event documentation data structure comprising at least a collaborative event documentation interface to the collaborative documentation service 408. The collaborative documentation service 408 may output the collaborative event documentation interface (as described below with respect to at least FIG. 10) to one or more system users or generate one or more internal collaborative event documentation data structures from the received collaborative event documentation data structure.

FIG. 8 illustrates an exemplary extrinsic event scheduling service interface 800 configured in accordance with at least some embodiments of the present disclosure. The exemplary extrinsic event scheduling service interface 800 may be associated with the extrinsic event scheduling service 402. The exemplary extrinsic event scheduling service interface 800 as shown comprises an extrinsic event data interface pane 802 and an extrinsic event consolidation system pane 804. The extrinsic event data interface pane 802 may receive extrinsic event data via one or more indication inputs received from a client device. For example, a user via a client device may provide one or more indication inputs defining at least one or more of an extrinsic event title element, an exported event description text element, a time data element, a date data element, a participant identifier (e.g., email address, phone number, user credential, or other identifier element as discussed herein), an image data element (e.g., a thumbnail, organization logo, mascot, etc.), a countdown timer element (e.g., to automatically generate a reminder to participants such as emails, push/pull notifications, text messages, etc.), or other data objects and/or data elements as described herein. The extrinsic event data interface pane 802 may comprise one or more graphical user interface elements (e.g., a button, slider, interactive icon, or the like) configured to receive one or more indication inputs.

The extrinsic event consolidation system pane 804 of the exemplary extrinsic event scheduling service interface 800 may reflect at least a portion of the extrinsic event consolidation system 105. For example, the extrinsic event consolidation system pane 804 may be associated with a plug-in or add-on of the extrinsic event scheduling service 402. The extrinsic event consolidation system pane 804 is at least configured to receive an exported event data object ingestion request indication input for the generation of at least an exported event data object (e.g., in accordance with the exported event data object ingestion request 702). The extrinsic event consolidation system pane 804 may comprise one or more graphical user interface elements (e.g., a button, slider, interactive icon, or the like) configured to receive one or more indication inputs. For example, add meeting notes graphical user interface element 806 may receive an indication input (e.g., a mouse click, etc.) and in response the title, date, time, and description depicted in the extrinsic event consolidation system pane 804 will be update and/or be added to the extrinsic event data interface pane 802.

FIG. 9 illustrates an exemplary extrinsic event consolidation interface 900 configured in accordance with at least some embodiments of the present disclosure. The exemplary extrinsic event consolidation interface 900 may be generated, formatted, and/or output to a user based on one or more templates associated with a collaborative documentation service 408 and via at least the extrinsic event consolidation system 105 (e.g., via the user review output/suggestion module 718 or the like). The exemplary extrinsic event consolidation interface 900 may be generated, at least partially, from an exported event data object via the extrinsic event consolidation system 105. The exemplary extrinsic event consolidation interface 900 may be generated, at least partially, from one or more indication inputs received by the collaborative documentation service 408. The exemplary extrinsic event consolidation interface 900 as shown comprises a plurality of graphical user interface elements. The graphical user interface elements as shown include at least various extrinsic event consolidation title interface elements (e.g., an extrinsic event consolidation title interface element 902, extrinsic event consolidation date title interface element 904, extrinsic event consolidation participants title interface element 908, extrinsic event consolidation goals title interface element 914, etc.), extrinsic event consolidation date interface element 906, extrinsic event consolidation participant interface element set 910, extrinsic event consolidation exported event description interface element 916, and extrinsic event consolidation topic interface element 918.

As shown the exemplary extrinsic event consolidation interface 900 further comprises an example configuration of a extrinsic event consolidation suggested participant account interface 912. The extrinsic event consolidation suggested participant account interface 912 may be accessed by transmitting an indication input (e.g., a mouse click, etc.) to one or more of the extrinsic event consolidation participant interface elements of the extrinsic event consolidation participant interface element set 910. For example, a user may click on extrinsic event consolidation participant interface element 910A of the extrinsic event consolidation participant interface element set 910 to access the extrinsic event consolidation suggested participant account interface 912 as depicted. The extrinsic event consolidation suggested participant account interface 912 as shown comprises two extrinsic event consolidation participant account identifier interface elements 912A and a extrinsic event consolidation graphical user interface element set 912B. The extrinsic event consolidation graphical user interface elements of the extrinsic event consolidation graphical user interface element set 912B include an 'ADD' interface element, an 'EDIT' interface element, and a 'DELETE' interface element.

The extrinsic event consolidation graphical user interface elements of the extrinsic event consolidation graphical user interface element set 912B may each be configured to receive an indication input (e.g., a mouse click, etc.) to facilitate a respective operation. For example, a user may click on the 'ADD' interface element and then type via a keyboard an additional participant account identifier associated with the selected participant reflected by the extrinsic event consolidation participant interface element 910A. Additionally, the user may select one or more of the two extrinsic event consolidation participant account identifier interface elements 912A (e.g., via a mouse click, etc.) and then click on the 'EDIT' interface element and type via a keyboard to modify one or more of the two extrinsic event consolidation participant account identifier interface elements 912A. Moreover, the user may select one or more of the two extrinsic event consolidation participant account identifier interface elements 912A (e.g., via a mouse click, etc.) and then click on the 'DELETE' interface element to remove one or more of the two extrinsic event consolidation participant account identifier interface elements 912A. The exemplary extrinsic event consolidation interface 900 may be at least partially configured such that at least one of the plurality of graphical user interface elements (discussed above) may be selected (e.g., mouse clicked on, etc.) and edited (e.g., via typing on a keyboard, etc.). Indication inputs received via exemplary extrinsic event consolidation interface 900 as described above (or any other interface described herein) may cause execution of one or more compiled code base instructions (e.g., stored in memory 204, a repository, or the like) to cause a processor (e.g., processor 202 or the like) to generate, modify, delete, store, transmit, retrieve, and/or request one or more of the data objects associated with one or more of the interface elements and/or data structures described above.

FIG. 10 illustrates an exemplary collaborative documentation interface 1000 configured in accordance with at least some embodiments of the present disclosure. The exemplary collaborative documentation interface 1000 may be associated with a collaborative documentation service 408 and may be populated by the collaborative documentation service 408 based on at least a collaborative event documentation data structure (e.g., received from at least extrinsic event consolidation system 105). The exemplary collaborative documentation interface 1000 may be directly generated, populated, created, and/or otherwise modified by the extrinsic event consolidation system 105. The exemplary collaborative documentation interface 1000 as shown in FIG. 10 comprises a collaborative event documentation pane 1022 and a collaborative event documentation pane 1024 each comprising a plurality of graphical user interface elements as shown. The collaborative event documentation interface further comprises a collaborative documentation permission interface element 1026 which reflects that the collaborative documentation page interface 1028 is unlocked (e.g., corresponding to a public collaborative event documentation data structure that may be at least partially accessible to at least some users of the collaborative documentation service based on at least an associated permissions configuration protocol or the like). The collaborative documentation permission interface element 1026 may be configured to receive one or more indication inputs to toggle the collaborative documentation page interface 1028 between a public and private state within the collaborative documentation service. For example, a system user (e.g., extrinsic event coordinator, system administrator, or the like) may transmit an indication input via at least collaborative documentation permission interface element 1026 to automatically lock the associated collaborative event documentation data structure from being accessed by system users other than those listed as participants and/or those receiving an invitation (as discussed below for FIG. 14). A whitelist may automatically be generated for the collaborative event documentation data structure base on the participant list and/or the invitation list and stored via at least an associated permissions configuration protocol.

The exemplary collaborative documentation interface 1000 is configured with a page tree data structure interface element 1032. The page tree data structure interface element 1032 reflects the position of the collaborative event documentation data structure (e.g., dynamic page) of which the exemplary collaborative documentation interface 1000 is at least partially reflective. Additionally, the position of the collaborative event documentation data structure (e.g., dynamic page) is shown as a nested hierarchy of dynamic spaces and/or dynamic pages via hierarchy data structure interface element 1030 of the collaborative event documentation pane 2024. The page tree data structure interface element 1032 and/or the hierarchy data structure interface element 1030 may comprise one or more positions within a hierarchy of dynamic spaces, a hierarchy of dynamic pages, a page tree data structure, an organizational hierarchy data structure, and/or the like as described above. The page tree data structure interface element 1032 and/or the hierarchy data structure interface element 1030 may be at least partially generated based on extrinsic event details reflected in, for example collaborative documentation title interface element 1002, collaborative documentation exported event description interface element 1016, and/or the like as described herein.

The collaborative documentation page interface 1028 of the exemplary collaborative documentation interface 1000 as shown comprises various interface elements. The graphical user interface elements as shown include at least various collaborative documentation title interface elements (e.g., collaborative documentation title interface element 1002, collaborative documentation date title interface element 1004, collaborative documentation participants title interface element 1008, collaborative documentation goals title interface element 1014, etc.), collaborative documentation date interface element 1006, collaborative documentation participant interface element set 1010, collaborative documentation exported event description interface element 1016, and collaborative documentation topic interface element 1018. Additionally, the collaborative documentation page interface 1028 further comprises an origin user identifier interface element set 1011 comprising an origin user interface element, an image interface element, a last updated interface element, and a create meeting interface element. Upon reviewing the data reflected in the collaborative documentation page interface 1028, a user may provide an indication input (e.g., mouse click, etc.) via the create meeting interface element to generate, store, and/or update a collaborative event documentation data structure based on the reflected data. The data reflected in the collaborative documentation page interface 1028 may have been received, at least partially, from the extrinsic event consolidation system 105.

The collaborative documentation page interface 1028 further comprises a discussion topics title interface element 1012 and a meeting minute notes interface element 1020. The meeting minute notes interface element 1020 may be, at least partially, dynamically populated during the extrinsic event (e.g., hosted via the audio video conferencing service 502, etc.) based on one or more of voice/speech recognition, presentation slides, text messages (e.g., a chat room, etc.), natural language processing, machine learning models, or other data object extraction techniques as described herein. For example, an audio video conferencing service 502 may generate a transcript data object of the extrinsic event via speech recognition and recording taken during the extrinsic event. The transcript data object may then be processed via a machine learning pipeline associated with one or more of the services and/or applications described herein to generate and/or populate at least some of the meeting minute notes interface element 1020.

The meeting minute notes interface element 1020, or a data object associated therewith (e.g., generated based thereon, etc.), may be ingested such as by the extrinsic event consolidation system 105 (or similar services described herein) and cause the output of a truth interface or the like requesting a user indication input to automatically generate one or more data objects. For example, the extrinsic event consolidation system 105, based on text data elements associated with a meeting minute notes interface element 1020, may output a truth interface (e.g., via user review output/suggestion module 718, or the like, as described with respect to FIG. 7) suggesting one or more follow-up meetings based on identified tasks (e.g., new tasks to be completed, unfinished task previously discussed, etc.), notes, identification of a recurring meeting, and/or any other data extracted from at least the meeting minute notes interface element 1020. The extrinsic event consolidation system 105 may suggest a plurality of follow-up meetings and generation of respective data objects, each associated with a respective task, note, and/or automatic recurring meeting.

Upon receipt of a user indication input to accept the suggested meeting via the output truth interface, the extrinsic event consolidation system 105 may transmit one or more data objects to one or more services or applications (e.g., extrinsic event scheduling service 402, collaborative documentation service 408, etc.) to cause the generation of one or more of an extrinsic event scheduling data object, exported event data object, collaborative event documentation data structure, and/or the like. For example, see at least the collaborative event documentation data structure retrieval module 720, or the like, and the collaborative event documentation interface transmission module 722, or the like, as described above with respect to FIG. 7.

Upon receipt of an indication input defining one or more text data elements associated with a meeting minute notes interface element 1020, at least the extrinsic event consolidation system 105 may automatically generate and transmit a data object defining a request for the generation of a extrinsic event scheduling data object, to an extrinsic event scheduling service 402. For example, a user may be taking notes via a Confluence® page during a meeting and the extrinsic event consolidation system 105 (e.g., installed as a Confluence® plug-in, or the like) may detect a term "Follow-up meeting for budgeting" indicated via at least a meeting minute notes interface element 1020, in response the extrinsic event consolidation system 105 may automatically request that Google Calendar® generate a calendar event for the follow-up meeting. The extrinsic event consolidation system 105 may automatically define a participants list for the follow-up meeting based on the current meeting or another method as described by the present disclosure (e.g., suggested participant account interface described above). Moreover, the extrinsic event consolidation system 105 may request from one or more services or applications (e.g., audio video conferencing service 502, etc.) one or more data objects, such as a request associated with a communication channel as described above. For example, see audio video conferencing service 502, or the like, as described above with respect to FIG. 5.

Additionally, the transcript data object may be processed via a machine learning pipeline, machine learning model, or the like (e.g., natural learning processes, etc.) to generate a meeting summary data object reflecting a general summary of the extrinsic event (e.g., topics discussed, presenters, meeting title, date, time, etc.). The meeting summary data object may be associated with the corresponding collaborative event documentation data structure (e.g., stored with the collaborative event documentation data structure in a data object repository, contain a link to the collaborative event documentation data structure in the collaborative documentation service 408, etc.). The meeting minute notes interface element 1020 may be, at least partially, updated and/or generated before, after, and/or during the extrinsic event via one or more indication inputs received from one or more users, services, and/or applications.

FIG. 11 is a flowchart of an extrinsic event consolidation system workflow 1100 in accordance with at least some embodiments of the present disclosure. The extrinsic event consolidation system workflow 1100 depicts an example embodiment of exported event data object generation and transmission from a collaborative documentation service 408 to an extrinsic event scheduling service 402 via at least the extrinsic event consolidation system 105. The extrinsic event consolidation system workflow 1100 as shown begins at client device 102A, or similar computing device as discussed above. The client device is transmitted a user interface via at least the collaborative documentation service 408. The user interface output by the collaborative documentation service 408 may provide one or more graphical user interface elements such as described herein with respect to at least FIGS. 8-10.

The combination of the one or more graphical user interface elements may be configured as one skilled in the art would find convenient in light of the present disclosure. The user of client device 102A then provides one or more indication inputs defining at least a collaborative documentation service indication input 1102 via the user interface output by the collaborative documentation service 408. In response to at least the collaborative documentation service indication input 1102, the collaborative documentation service 408 transmits a collaborative event documentation data structure, or a data object associated therewith, to the extrinsic event consolidation system 105. The extrinsic event consolidation system 105 may be configured as described above with respect to one or more of the example system architectures (e.g., example system architecture 100, example system architecture 600, etc.).

The collaborative event documentation data structure is received by the extrinsic event consolidation system 105 and the collaborative event documentation data structure is processed via a data ingestion module 1104. The data ingestion module 1104 may comprise one or more processes, operations, and/or attributes as described above for the data ingestion module 704. The data ingestion module 1104 processes and then transmits to the processed data object to the machine learning pipeline 1103. The machine learning pipeline 1103 may comprise one or more processes, operations, and/or attributes as described above for the machine learning pipeline 703.

The machine learning pipeline 1103 may execute one or more processes such as data parsing 1106, data element extraction (e.g., identifier extraction 1108, event detail extraction 1110), inputting the extracted data elements into a machine learning model 1112, and generating, via the machine learning model 1112, a data object. The data object generated by the machine learning model 1112 may comprise one or more of an output data object (e.g., for use in generating the exported event data object), a suggestion data object (e.g., for use in generating a suggested participant account interface, and/or a suggested exported event template interface, or similar use interface as discussed herein). The one or more data objects generated by the machine learning model 1112 may be compiled into a single data object and/or stored to data object repository 107, or the like, via process(es) of output/suggestion compilation 1114. The machine learning model 1112 may utilize a collaborative documentation service mapping protocol, natural language processing techniques, or any other technique or method herein to process the ingested exported event data object. The machine learning pipeline 1103 may maintain a training data set for training one or more machine learning models (e.g., machine learning models configured to process specific types of data or to function with specific applications/services).

The exported event data object generation module 1116 receives/retrieves the data object output by the machine learning pipeline 1103 and outputs a user interface to the client device 102A. The user interface may comprise one or more of a suggested participant account interface and/or a suggested exported event template interface as applicable based on the data object output by the machine learning pipeline 1103. The user interface may also require at least one indication input from the client device 102A to confirm that the data extrapolated from the ingested collaborative event documentation data structure, or the like, reflects the associated extrinsic event accurately and/or sufficiently for the user. The user review output/suggestion module 1118 may be configured to generate and transmit the user interface to client device 102A and in response may be configured to receive and/or request one or more corresponding indication inputs (e.g., suggested participant account selection indication, exported event template selection indication, or the like).

Additionally, the user review output/suggestion module 1118, upon receipt of the one or more indication inputs, may cause the exported event data object generation module 1116 to generate a exported event data object from the data object output by the machine learning pipeline 1103. The user review output/suggestion module 1118 may also cause the machine learning pipeline 1103 to perform one or more secondary processes (e.g., re-process the ingested collaborative event documentation data structure with another machine learning model) if the user provides an indication input defining a negative result associated with the data object output by the machine learning pipeline 1103. Moreover, the user may cancel the current data object output by the machine learning pipeline 1103 and may further repeat the collaborative documentation service indication input 1102 at the collaborative documentation service 408 with additional or updated data provided, for example, via the client device 102A or a repository.

The exported event data object generation module 1116 generates and then stores the exported event data object at the data object repository 107 upon positive confirmation from the user review output/suggestion module 1118. The exported event data object generation module 1116 may also access and retrieve one or more data objects (e.g., exported event templates, data object identifiers, previously generated exported event data objects, previously generated collaborative event documentation data structures, or any other data objects required) from the data object repository 107 to generate the exported event data object. The exported event data object retrieval module 1120 then retrieves the generated exported event data object from the data object repository 107 for transmission by the exported event data object transmission module 1122. The exported event data object transmission module 1122 then transmits the exported event data object to the extrinsic event scheduling service 402.

The extrinsic event scheduling service 402 may output the exported event data object via at least a user interface (as described below with respect to at least FIGS. 13-14) and/or a message (e.g., email, text message, voicemail, etc.) generated based on the exported event data object. The user interface and/or message (e.g., email, text message, voicemail, etc.) may be transmitted to one or more system users via one or more client devices and networks as discussed above. Moreover, the extrinsic event scheduling service 402 may generate a calendaring application/service data object from the exported event data object and automatically associate the calendaring application data object with one or more user account profile data objects associated with the extrinsic event scheduling service 402 and/or a calendaring application/service. For example, the extrinsic event scheduling service 402 may automatically add data to an electronic calendar associated with a participant identified via at least the exported event data object for the respective extrinsic event.

FIG. 12 illustrates an exemplary collaborative documentation interface 1200 configured in accordance with at least some embodiments of the present disclosure. The exemplary collaborative documentation interface 1000 may be associated with a collaborative documentation service 408 and may be at least partially populated via at least one or more user indication inputs received via a collaborative documentation interface. The exemplary collaborative documentation interface 1200 as shown in FIG. 12 comprises a collaborative event documentation pane 1022 and a collaborative event documentation pane 1024 each comprising a plurality of graphical user interface elements as shown. The exemplary collaborative documentation interface 1200 further comprises a collaborative documentation permission interface element 1026 as described above. The exemplary collaborative documentation interface 1200 further comprises at least in part the collaborative documentation page interface 1028 as described above. As shown in FIG. 12 the collaborative documentation page interface 1028 further comprises a create meeting interface element 1202 that is configured to receive an indication input and in response output a date data element selection interface 1204. The exemplary collaborative documentation interface 1200 as shown may be configured to receive indication inputs to generate, populate, create, retrieve, and/or otherwise modify a collaborative event documentation data structure to facilitate the generation of an exported event data object as described above with respect to FIG. 11 and/or facilitate provision of a dynamic page (e.g., Confluence® page) within the collaborative documentation service 408.

FIG. 13 illustrates an exemplary user review extrinsic event consolidation interface 1300 configured in accordance with at least some embodiments of the present disclosure. The exemplary user review extrinsic event consolidation interface 1300 may be associated with the extrinsic event consolidation system 105 and be at least partially generated, for example, by the user review output/suggestion module 1118, or the like, as described above. The user review collaborative event documentation interface comprises a graphical user interface pane 1302, a data and time interface pane 1304, an event details interface pane 1306, a participant element set interface pane 1308, and a participant permissions interface pane 1310. When a user clicks (e.g., via a mouse or other device) on the graphical interface element 1312, the exemplary user review extrinsic event consolidation interface 1300 and/or the associated computing device may be configured to provide a positive indication input (e.g., reflecting that the user accepts/approves the data reflected in the interface) to the user review output/suggestion module 1118 which may then execute one or more processes as discuss above with respect to at least FIG. 11.

Additionally, the exemplary user review extrinsic event consolidation interface 1300 may be further configured to receive one or more indication inputs via one or more of the graphical user interface pane 1302, the data and time interface pane 1304, the event details interface pane 1306, the participant element set interface pane 1308, the participant permissions interface pane 1310, or any graphical interface elements associated therewith in order to modify and/or update the data object associated with the extrinsic event reflected by exemplary user review extrinsic event consolidation interface 1300 prior to providing the positive indication input. Upon receipt of the positive indication input the collaborative documentation service 408 and/or the user review output/suggestion module 1118 may generate and output an additional interface, for example, as shown in FIG. 14 and described below.

FIG. 14 illustrates the exemplary user review extrinsic event consolidation interface 1300 of FIG. 13 as described above and further illustrates an additional confirmation interface 1402. The additional confirmation interface 1402 requests that the user provide an indication input with respect to transmitting one or more messages (e.g., emails, or the like) to the respective participants identified in the participant element set interface pane 1308. The user may provide indication inputs via the three graphical user interface elements illustrated. To 'Dismiss' the additional confirmation interface a user may provide an indication input to the graphical user interface element 1402A and return to the exemplary user review extrinsic event consolidation interface 1300. To save without sending invitation messages a user may provide an indication input to the graphical user interface element 1402B labeled 'Don't send', and to transmit an invitation message to each of the participants identified (e.g., see the participant element set interface pane 1308 of FIG. 13) a user may provide an indication input to the graphical user interface element 1402C labeled 'Send'.

For example, a user may provide an indication input (e.g., a mouse click, etc.) to the graphical user interface element 1402C and, in response, at least the extrinsic event consolidation system 105 generates and transmits at least one data object (e.g., an exported event data object comprising an email comprising the event data from a Confluence® page) to at least one computing device associated with one or more participant account identifiers (e.g., email addresses associated with each Confluence® user of the participant element set interface pane 1308). Further, the at least one data object may cause an extrinsic event scheduling service (e.g., Google Calendar® or the like), upon receipt of the at least one data object, to generate and store at least a calendaring event. In some embodiments, the additional confirmation interface may comprise one or more of the additional confirmation interface 1402, a suggested participant account interface, a suggested exported event template interface, or any other user interface as described herein.

Exemplary Implementation Operations and Signal Diagrams

FIGS. 15A and 15B illustrate exemplary operations for the programmatic ingestion of exported event data objects into a collaborative documentation service, for use with embodiments of the present disclosure. FIG. 15A is a flowchart diagram of an example process 1500, for generating at least a collaborative event documentation data structure and collaborative event documentation interface, in accordance with a extrinsic event consolidation system 105. FIG. 15B illustrates a signal diagram for example process 1500 described with regards to FIG. 15A. Via the various operations of process 1500, the extrinsic event consolidation server 106 or the like (e.g., one or more computing devices described herein, apparatus 200, apparatus 300, or the like), of the extrinsic event consolidation system 105 can enhance efficiency and effectiveness of transmitting extrinsic event data between disparate services and associated systems (e.g., hardware, software, etc.).

The operations of process 1500 may be, at least partially, executed by a dedicated extrinsic event consolidation server, for example see the extrinsic event consolidation server 106 as illustrated in FIG. 1, FIG. 4, and/or FIG. 5 and described above. The operations of process 1500 may be, at least partially, executed by an apparatus configured with a locally hosted instance of the extrinsic event consolidation system 105 (e.g., 105A, 105B), for example see the extrinsic event scheduling service server 404 and/or the collaborative documentation service server 410 as illustrated in FIG. 6 and described above. The operations of process 1500 may be, at least partially, executed by one or more applications servers, service servers, and/or client devices configured to locally host an instance of the extrinsic event consolidation system 105 (e.g., 105A, 105B) and/or configured to directly and/or indirectly (e.g., via network 104, etc.) to receive and/or transmit data objects in association with the extrinsic event consolidation server 106.

The flowchart diagram, illustrated in FIG. 15A, showing the example process 1500 may be performed by, for example, the apparatus 200 or the like (e.g., apparatus 300, a combination of multiple apparatus discussed above, etc.) which, in some embodiments, may be embodied by extrinsic event consolidation server 106 or the like. The apparatus, in turn, may include a computer program product, associated with a extrinsic event consolidation system 105, comprising a non-transitory computer readable medium storing computer program code executed by at least one or more of processor 202, extrinsic event consolidation circuitry 210, and/or data object retrieval circuitry 212. In some embodiments, the apparatus may comprise one or more apparatuses of a plurality of apparatuses (e.g., extrinsic event consolidation server 106, application server 108, service server 110, client device 102A, etc.) associated with one or more multi-layer service oriented platforms and/or system architectures (e.g., example system architecture 100, etc.).

Various other processes, operations, and/or steps as described herein may be, at least partially, combined with the example process 1500 as described below and shown in FIG. 15A and FIG. 15B. For example, the example process 1500 may be combined with one or more processes, operations, and/or steps as described above with respect to the extrinsic event consolidation system workflow 700 of FIG. 7 and/or the extrinsic event consolidation system workflow 1100 of FIG. 11. Further, the example process 1500 may be combined with one or more processes, operations, and/or steps as described below with respect to the example process 1600 of FIG. 16A and FIG. 16B and/or any other example embodiments as described herein.

The example process 1500 begins at block 1502 where the data ingestion module (e.g., 704, 1104), or the like, associated with the extrinsic event consolidation system 105, receives an exported event data object from an extrinsic event scheduling service, the exported event data object comprising an exported event data object identifier, an origin user identifier, a target user identifier, an exported event description text element, a time data element, a date data element, and an exported event participant identifier set. The extrinsic event consolidation system 105, via means such as at least a processor, generates a collaborative event documentation data structure configured for the collaborative documentation service, wherein the collaborative event documentation data structure is associated with the exported event data object, see block 1504. At block 1506, the extrinsic event consolidation system 105 is configured with means, such as a processor, memory, and other circuitry as described above, for applying a collaborative documentation service mapping protocol for mapping the exported event data object identifier, the origin user identifier, the target user identifier, the exported event description text element, the time data element, the date data element, and the exported event participant identifier set to the collaborative event documentation data structure. The collaborative documentation service mapping protocol may be retrieved by the processor from the memory prior to the operations of block 1506.

At block 1508, the extrinsic event consolidation system 105 is configured to generate a collaborative event documentation interface based on the collaborative event documentation data structure, the collaborative event documentation interface comprising a graphical user interface element set comprising a header interface element, a date interface element, an exported event participant interface element, and an exported event description text interface element. The extrinsic event consolidation system 105 may be configured to transmit the collaborative event documentation interface comprising the collaborative event documentation data structure to one or more participant accounts associated with at least the one or more exported event participant identifiers or one or more participant account identifiers, see block 1510. Moreover, the extrinsic event consolidation system 105 may be configured to execute one or more additional processes, operations, and/or steps, for example, between block 1508 and block 1510 such as accessing a collaborative documentation service data object repository, determining one or more identifiers, storing/recording the collaborative event documentation data structure to a memory device, and/or other processes described herein with respect to at least the extrinsic event consolidation system 105.

FIGS. 16A and 16B illustrate exemplary operations for the programmatic ingestion of exported event data objects into a collaborative documentation service, for use with embodiments of the present disclosure. FIG. 16A is a flowchart diagram of an example process 1600, for generating at least a collaborative event documentation data structure and collaborative event documentation interface, in accordance with a extrinsic event consolidation system 105. FIG. 16B illustrates a signal diagram for example process 1600 described with regards to FIG. 16A. Via the various operations of process 1600, the extrinsic event consolidation server 106 or the like (e.g., one or more computing devices described herein, apparatus 200, apparatus 300, or the like), of the extrinsic event consolidation system 105 can enhance efficiency and effectiveness of transmitting extrinsic event data between disparate services and associated systems (e.g., hardware, software, etc.).

The operations of process 1600 may be, at least partially, executed by a dedicated extrinsic event consolidation server, for example see the extrinsic event consolidation server 106 as illustrated in FIG. 1, FIG. 4, and/or FIG. 5 and described above. The operations of process 1600 may be, at least partially, executed by an apparatus configured with a locally hosted instance of the extrinsic event consolidation system 105 (e.g., 105A, 105B), for example see the extrinsic event scheduling service server 404 and/or the collaborative documentation service server 410 as illustrated in FIG. 6 and described above. The operations of process 1600 may be, at least partially, executed by one or more applications servers, service servers, and/or client devices configured to locally host an instance of the extrinsic event consolidation system 105 (e.g., 105A, 105B) and/or configured to directly and/or indirectly (e.g., via network 104, etc.) to receive and/or transmit data objects in association with the extrinsic event consolidation server 106.

The flowchart diagram, illustrated in FIG. 16A, showing the example process 1600 may be performed by, for example, the apparatus 200 or the like (e.g., apparatus 300, a combination of multiple apparatus discussed above, etc.) which, in some embodiments, may be embodied by extrinsic event consolidation server 106 or the like. The apparatus, in turn, may include a computer program product, associated with a extrinsic event consolidation system 105, comprising a non-transitory computer readable medium storing computer program code executed by at least one or more of processor 202, extrinsic event consolidation circuitry 210, and/or data object retrieval circuitry 212. In some embodiments, the apparatus may comprise one or more apparatuses of a plurality of apparatuses (e.g., extrinsic event consolidation server 106, application server 108, service server 110, client device 102A, etc.) associated with one or more multi-layer service oriented platforms and/or system architectures (e.g., example system architecture 100, etc.).

Various other processes, operations, and/or steps as described herein may be, at least partially, combined with the example process 1600 as described below and shown in FIG. 16A and FIG. 16B. For example, the example process 1600 may be combined with one or more processes, operations, and/or steps as described above with respect to the extrinsic event consolidation system workflow 700 of FIG. 7 and/or the extrinsic event consolidation system workflow 1100 of FIG. 11. Further, the example process 1600 may be combined with one or more processes, operations, and/or steps as described above with respect to the example process 1500 of FIG. 15A and FIG. 15B and/or any other example embodiments as described herein.

The example process 1600 begins at block 1602 with the extrinsic event consolidation system 105 configured, such as with a data ingestion module (e.g., 704, 1104) or similar computer program code and hardware combination, for receiving, from a computing device via a collaborative event documentation interface, a collaborative documentation service indication input defining at least a text data element, a time data element, a date data element, and a participant account identifier associated with a participant account profile data object. The extrinsic event consolidation system 105, via means such as at least a processor, generates, based on the collaborative documentation service indication input, a collaborative event documentation data structure comprising the text data element, the time data element, the date data element, and the participant account identifier, see block 1604. At block 1606, the extrinsic event consolidation system 105 is configured with means, such as a processor, memory, and other circuitry (e.g., communications circuitry) as described above, for recording, to a collaborative documentation service data object repository, the collaborative event documentation data structure At block 1608, the extrinsic event consolidation system 105 is configured to generate, based on the collaborative event documentation data structure and a collaborative documentation service mapping protocol, an exported event data object. The extrinsic event consolidation system 105 is further configured to transmit, to an extrinsic event scheduling service, the exported event data object, see block 1610. Moreover, the extrinsic event consolidation system 105 may be configured to execute one or more additional processes, operations, and/or steps.

Additional Exemplary Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, application, script, code, service, or the like) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for programmatically ingesting exported event data objects into a collaborative documentation service, the apparatus comprising at least one processor and at least one memory including program code that, with the at least one processor, cause the apparatus to:
   receive an exported event data object from an extrinsic event scheduling service, the exported event data object comprising an exported event data object identifier, an origin user identifier, a target user identifier, an exported event description text element, a time data element, a date data element, and an exported event participant identifier set;
   generate a collaborative event documentation data structure configured for the collaborative documentation service, wherein the collaborative event documentation data structure is associated with the exported event data object;
   apply a collaborative documentation service mapping protocol for mapping the exported event data object identifier, the origin user identifier, the target user identifier, the exported event description text element, the time data element, the date data element, and the exported event participant identifier set to the collaborative event documentation data structure; and
   generate a collaborative event documentation interface based on the collaborative event documentation data structure, the collaborative event documentation interface comprising a graphical user interface element set comprising a header interface element, a date interface element, an exported event participant interface element, and an exported event description text interface element.

2. The apparatus according to claim 1, wherein the at least one memory including the program code that with the at least one processor, further cause the apparatus to:
   receive, via a collaborative documentation service interface, a collaborative documentation service indication input from a client device;
   generate, based on the collaborative documentation service indication input, an exported event data object ingestion request; and
   transmit, via an extrinsic event scheduling service application programming interface, the exported event data object ingestion request to the extrinsic event scheduling service.

3. The apparatus according to claim 1, wherein the graphical user interface element set further comprises one or more of a discussion interface element, a time interface element, an origin user interface element, or an interactive interface element.

4. The apparatus according to claim 1, wherein the at least one memory including the program code that with the at least one processor, further cause the apparatus to:
   access, via a collaborative documentation service application programming interface, a collaborative documentation service data object repository associated with the collaborative documentation service, the collaborative documentation service data object repository comprising one or more participant account profile data objects;
   determine, based on at least one or more exported event participant identifiers and the one or more participant account profile data objects, one or more participant account identifiers associated with the one or more exported event participant identifiers;
   record, to the collaborative documentation service data object repository, the collaborative event documentation data structure, wherein the collaborative event documentation data structure is associated with the exported event data object identifier of the exported event data object; and
   transmit the collaborative event documentation interface comprising the collaborative event documentation data structure to one or more participant accounts associated with at least the one or more exported event participant identifiers or the one or more participant account identifiers.

5. The apparatus according to claim 4, wherein the collaborative event documentation data structure is generated based on the exported event data object, and wherein the collaborative event documentation data structure comprises one or more exported event description text elements of a plurality of exported event description text elements, the time data element, the date data element, and the one or more participant account identifiers.

6. The apparatus according to claim 5, wherein the at least one memory including the program code that with the at least one processor, further cause the apparatus to:
   determine, from the collaborative documentation service data object repository, an account permissions configuration protocol that is common to each of the one or more participant accounts, wherein the account permissions configuration protocol is associated with a security level value;
generate, based on the account permissions configuration protocol, a collaboration page permissions configuration protocol, wherein the collaboration page permissions configuration protocol is associated with the security level value; and
apply the collaboration page permissions configuration protocol to the collaborative event documentation data structure,
wherein the collaboration page permissions configuration protocol allows at least the one or more participant accounts associated with the account permissions configuration protocol to access the collaborative event documentation data structure.

7. The apparatus according to claim 5, wherein the at least one memory including the program code that with the at least one processor, further cause the apparatus to:
parse the plurality of exported event description text elements into one or more word based data elements;
determine, based on at least the one or more word based data elements and a machine learning model, a collaboration page permissions configuration protocol associated with a security level value threshold;
apply the collaboration page permissions configuration protocol to the collaborative event documentation data structure;
determine a respective security level value for each of the one or more participant accounts;
detect that one or more respective security level values associated with a respective participant account is less than the security level value threshold; and
update the respective security level value of the respective participant account by at least increasing the respective security level value to be equal to the security level value threshold.

8. The apparatus according to claim 7, wherein the at least one memory including the program code that with the at least one processor, further cause the apparatus to:
generate, based on the one or more participant account identifiers, an account list collaboration page permissions configuration protocol; and
apply the account list collaboration page permissions configuration protocol to the collaborative event documentation data structure,
wherein the account list collaboration page permissions configuration protocol allows the one or more participant accounts associated with the one or more participant account identifiers to access the collaborative event documentation data structure.

9. The apparatus according to claim 5, wherein the at least one memory including the program code that with the at least one processor, further cause the apparatus to:
parse the plurality of exported event description text elements into one or more word based data elements;
determine, based on the one or more word based data elements and the one or more participant account profile data objects, one or more suggested participant account identifiers,
wherein the one or more participant account profile data objects are each associated with a respective position data element associated with an organizational hierarchy data structure;
output, via a display device and based on the one or more suggested participant account identifiers, a suggested participant account interface defining the one or more suggested participant account identifiers; and
receive, via the suggested participant account interface, a suggested participant account selection indication.

10. The apparatus according to claim 9, wherein the at least one memory including the program code that with the at least one processor, further cause the apparatus to:
detect a preferred language for each of the one or more participant account profile data objects defining at least a preferred language identifier;
generate a preferred language collaborative event documentation interface based on the collaborative event documentation interface and the preferred language detected for each of the one or more participant account profile data objects; and
transmit the preferred language collaborative event documentation interface instead of the collaborative event documentation interface for each of the one or more participant account profile data objects defining at least the preferred language identifier,
wherein the preferred language collaborative event documentation interface comprises the collaborative event documentation interface output in the preferred language of each respective participant account profile data object.

11. The apparatus according to claim 5, wherein the at least one memory including the program code that with the at least one processor, further cause the apparatus to:
parse the plurality of exported event description text elements into one or more word based data elements;
determine, based on at least the one or more word based data elements and a machine learning model, at least one suggested exported event template defining an exported event data structure,
wherein the at least one suggested exported event template is automatically selected from one or more of a planning exported event template, a brainstorming exported event template, a team retrospective exported event template, a human resources exported event template, or a celebration exported event template;
output, via a display device, a suggested exported event template interface; and
receive, via the suggested exported event template interface, an exported event template selection indication defining an exported event template identifier.

12. The apparatus according to claim 11, wherein the at least one memory including the program code that with the at least one processor, further cause the apparatus to:
detect a language based on at least the one or more word based data elements; and
format the collaborative event documentation interface based on at least the language and the exported event template selection indication.

13. The apparatus according to claim 5, wherein the at least one memory including the program code that with the at least one processor, further cause the apparatus to:
parse the plurality of exported event description text elements into one or more word based data elements; and
generate, based on at least the one or more word based data elements and a machine learning model, a meeting summary,
wherein the meeting summary is associated with the collaborative event documentation interface.

14. The apparatus according to claim 1, wherein a respective exported event participant identifier of the extrinsic event scheduling service is associated with at least a respective participant account identifier of the collaborative documentation service.

15. The apparatus according to claim 1, wherein the at least one memory including the program code that with the at least one processor, further cause the apparatus to:
   detect that at least one exported event participant identifier is not associated with at least one participant account profile data object;
   in response, generate an undefined participant error notification interface defining the at least one exported event participant identifier;
   output, via a display device, the undefined participant error notification interface; and
   receive, via the undefined participant error notification interface, a participant account selection indication defining the at least one exported event participant identifier and at least one associated participant account identifier.

16. A non-transitory computer readable storage medium for programmatically ingesting exported event data objects into a collaborative documentation service, the non-transitory computer readable storage medium having program code portions stored thereon with the program code portions comprising instructions being configured, upon execution, by at least a processor, to cause an apparatus comprising at least one processor and at least one memory to:
   receive an exported event data object from an extrinsic event scheduling service, the exported event data object comprising an exported event data object identifier, an origin user identifier, a target user identifier, an exported event description text element, a time data element, a date data element, and an exported event participant identifier set;
   generate a collaborative event documentation data structure configured for the collaborative documentation service, wherein the collaborative event documentation data structure is associated with the exported event data object;
   apply a collaborative documentation service mapping protocol for mapping the exported event data object identifier, the origin user identifier, the target user identifier, the exported event description text element, the time data element, the date data element, and the exported event participant identifier set to the collaborative event documentation data structure; and
   generate a collaborative event documentation interface based on the collaborative event documentation data structure, the collaborative event documentation interface comprising a graphical user interface element set comprising a header interface element, a date interface element, an exported event participant interface element, and an exported event description text interface element.

17. The non-transitory computer readable storage medium according to claim 16, wherein when executed by the processor, further causes the apparatus comprising the at least one processor and the at least one memory to:
   receive, via a collaborative documentation service interface, a collaborative documentation service indication input from a client device;
   generate, based on the collaborative documentation service indication input, an exported event data object ingestion request; and
   transmit, via an extrinsic event scheduling service application programming interface, the exported event data object ingestion request to the extrinsic event scheduling service.

18. The non-transitory computer readable storage medium according to claim 16, wherein the graphical user interface element set further comprises one or more of a discussion interface element, a time interface element, an origin user interface element, or an interactive interface element.

19. The non-transitory computer readable storage medium according to claim 16, wherein when executed by the processor, further causes the apparatus comprising the at least one processor and the at least one memory to:
   access, via a collaborative documentation service application programming interface, a collaborative documentation service data object repository associated with the collaborative documentation service, the collaborative documentation service data object repository comprising one or more participant account profile data objects;
   determine, based on at least one or more exported event participant identifiers and the one or more participant account profile data objects, one or more participant account identifiers associated with the one or more exported event participant identifiers;
   record, to the collaborative documentation service data object repository, the collaborative event documentation data structure, wherein the collaborative event documentation data structure is associated with the exported event data object identifier of the exported event data object; and
   transmit the collaborative event documentation interface comprising the collaborative event documentation data structure to one or more participant accounts associated with at least the one or more exported event participant identifiers or the one or more participant account identifiers.

20. The non-transitory computer readable storage medium according to claim 19, wherein the collaborative event documentation data structure is generated based on the exported event data object, and wherein the collaborative event documentation data structure comprises one or more exported event description text elements of a plurality of exported event description text elements, the time data element, the date data element, and the one or more participant account identifiers.

21. The non-transitory computer readable storage medium according to claim 20, wherein when executed by the processor, further causes the apparatus comprising the at least one processor and the at least one memory to:
   determine, from the collaborative documentation service data object repository, an account permissions configuration protocol that is common to each of the one or more participant accounts, wherein the account permissions configuration protocol is associated with a security level value;
   generate, based on the account permissions configuration protocol, a collaboration page permissions configuration protocol, wherein the collaboration page permissions configuration protocol is associated with the security level value; and
   apply the collaboration page permissions configuration protocol to the collaborative event documentation data structure,
   wherein the collaboration page permissions configuration protocol allows at least the one or more participant accounts associated with the account permissions configuration protocol to access the collaborative event documentation data structure.

22. The non-transitory computer readable storage medium according to claim 20, wherein when executed by the processor, further causes the apparatus comprising the at least one processor and the at least one memory to:
  parse the plurality of exported event description text elements into one or more word based data elements;
  determine, based on at least the one or more word based data elements and a machine learning model, a collaboration page permissions configuration protocol associated with a security level value threshold;
  apply the collaboration page permissions configuration protocol to the collaborative event documentation data structure;
  determine a respective security level value for each of the one or more participant accounts;
  detect that one or more respective security level values associated with a respective participant account is less than the security level value threshold; and
  update the respective security level value of the respective participant account by at least increasing the respective security level value to be equal to the security level value threshold.

23. The non-transitory computer readable storage medium according to claim 22, wherein when executed by the processor, further causes the apparatus comprising the at least one processor and the at least one memory to:
  generate, based on the one or more participant account identifiers, an account list collaboration page permissions configuration protocol; and
  apply the account list collaboration page permissions configuration protocol to the collaborative event documentation data structure,
  wherein the account list collaboration page permissions configuration protocol allows the one or more participant accounts associated with the one or more participant account identifiers to access the collaborative event documentation data structure.

24. The non-transitory computer readable storage medium according to claim 20, wherein when executed by the processor, further causes the apparatus comprising the at least one processor and the at least one memory to:
  parse the plurality of exported event description text elements into one or more word based data elements;
  determine, based on the one or more word based data elements and the one or more participant account profile data objects, one or more suggested participant account identifiers,
  wherein the one or more participant account profile data objects are each associated with a respective position data element associated with an organizational hierarchy data structure;
  output, via a display device and based on the one or more suggested participant account identifiers, a suggested participant account interface defining the one or more suggested participant account identifiers; and
  receive, via the suggested participant account interface, a suggested participant account selection indication.

25. The non-transitory computer readable storage medium according to claim 20, wherein when executed by the processor, further causes the apparatus comprising the at least one processor and the at least one memory to:
  parse the plurality of exported event description text elements into one or more word based data elements;
  determine, based on at least the one or more word based data elements and a machine learning model, at least one suggested exported event template defining an exported event data structure,
  wherein the at least one suggested exported event template is automatically selected from one or more of a planning exported event template, a brainstorming exported event template, a team retrospective exported event template, a human resources exported event template, or a celebration exported event template;
  output, via a display device, a suggested exported event template interface; and
  receive, via the suggested exported event template interface, an exported event template selection indication defining an exported event template identifier.

26. The non-transitory computer readable storage medium according to claim 25, wherein when executed by the processor, further causes the apparatus comprising the at least one processor and the at least one memory to:
  detect a language based on at least the one or more word based data elements; and
  format the collaborative event documentation interface based on at least the language and the exported event template selection indication.

27. The non-transitory computer readable storage medium according to claim 16, wherein a respective exported event participant identifier of the extrinsic event scheduling service is associated with at least a respective participant account identifier of the collaborative documentation service.

28. The non-transitory computer readable storage medium according to claim 16, wherein when executed by the processor, further causes the apparatus comprising the at least one processor and the at least one memory to:
  detect that at least one exported event participant identifier is not associated with at least one participant account profile data object;
  in response, generate an undefined participant error notification interface defining the at least one exported event participant identifier;
  output, via a display device, the undefined participant error notification interface; and
  receive, via the undefined participant error notification interface, a participant account selection indication defining the at least one exported event participant identifier and at least one associated participant account identifier.

29. A computer implemented method for programmatically ingesting exported event data objects into a collaborative documentation service, the computer implemented method comprising:
  receiving an exported event data object from an extrinsic event scheduling service, the exported event data object comprising an exported event data object identifier, an origin user identifier, a target user identifier, an exported event description text element, a time data element, a date data element, and an exported event participant identifier set;
  generating a collaborative event documentation data structure configured for the collaborative documentation service, wherein the collaborative event documentation data structure is associated with the exported event data object;
  applying a collaborative documentation service mapping protocol for mapping the exported event data object identifier, the origin user identifier, the target user identifier, the exported event description text element, the time data element, the date data element, and the exported event participant identifier set to the collaborative event documentation data structure; and generating a collaborative event documentation interface based on the collaborative event documentation data structure, the collaborative event documentation interface comprising a graphical user interface element set comprising a header interface element, a date interface element, an exported event participant interface element, and an exported event description text interface element.

30. An apparatus for programmatically ingesting collaborative event documentation interface inputs to provide exported event data objects to an extrinsic event scheduling service, the apparatus comprising at least one processor and at least one memory including program code that, with the at least one processor, cause the apparatus to:

receive, from a computing device via a collaborative event documentation interface, a collaborative documentation service indication input defining at least a text data element, a time data element, a date data element, and a participant account identifier associated with a participant account profile data object;

generate, based on the collaborative documentation service indication input, a collaborative event documentation data structure comprising the text data element, the time data element, the date data element, and the participant account identifier;

record, to a collaborative documentation service data object repository, the collaborative event documentation data structure;

generate, based on the collaborative event documentation data structure and a collaborative documentation service mapping protocol, an exported event data object; and transmit, to the extrinsic event scheduling service, the exported event data object.

\* \* \* \* \*